US010968685B2

(12) United States Patent
Trpkovski

(10) Patent No.: US 10,968,685 B2
(45) Date of Patent: Apr. 6, 2021

(54) GAS FILLING OF AN INSULATING GLASS UNIT

(71) Applicant: PDS IG Holding LLC, Prairie Du Sac, WI (US)

(72) Inventor: Paul Trpkovski, Kailua Kona, HI (US)

(73) Assignee: PDS IG Holding LLC, Prairie Du Sac, WI (US)

( * ) Notice: Subject to any disclaimer, the term of this patent is extended or adjusted under 35 U.S.C. 154(b) by 280 days.

(21) Appl. No.: 15/640,512

(22) Filed: Jul. 1, 2017

(65) Prior Publication Data

US 2017/0299121 A1     Oct. 19, 2017

Related U.S. Application Data

(63) Continuation-in-part of application No. 15/398,459, filed on Jan. 4, 2017, now abandoned.
(Continued)

(51) Int. Cl.
*E06B 3/677*     (2006.01)
*E06B 3/673*     (2006.01)
(Continued)

(52) U.S. Cl.
CPC ........ *E06B 3/6775* (2013.01); *E06B 3/67386* (2013.01); *C03C 27/06* (2013.01);
(Continued)

(58) Field of Classification Search
CPC .................................................. E06B 3/6775
See application file for complete search history.

(56) References Cited

U.S. PATENT DOCUMENTS 2,756,467 A    7/1956   Etling et al.
4,780,164 A   10/1988   Rueckheim et al.
(Continued)

FOREIGN PATENT DOCUMENTS

CA     2909224     10/2014
EP     0056762     7/1982
(Continued)

OTHER PUBLICATIONS

File History for Parent U.S. Appl. No. 15/398,459 downloaded Jul. 31, 2017 (132 pages).
(Continued)

*Primary Examiner* — Philip C Tucker
*Assistant Examiner* — John Blades
(74) *Attorney, Agent, or Firm* — Pauly, DeVries Smith & Deffner LLC

(57) ABSTRACT

Embodiments include a method for replacing air with an interpane gas during manufacture of a sealed insulating glass unit (IGU). The method includes forming an unsealed IGU assembly defining an IGU passage for fluid communication between an interpane space and an ambient environment; positioning the unsealed IGU assembly within an enclosure and sealing the enclosure around the unsealed IGU assembly; evacuating air from the enclosure; introducing a first gas into the interpane space through the IGU passage; introducing a second gas into the enclosure, wherein the second gas has a different composition than the first gas; and closing the IGU passage to seal the interpane space. Other embodiments are also included herein.

10 Claims, 34 Drawing Sheets

Related U.S. Application Data

(60) Provisional application No. 62/274,676, filed on Jan. 4, 2016.

(51) Int. Cl.
*F17C 5/06* (2006.01)
*F17C 5/00* (2006.01)
*F17C 13/02* (2006.01)
*C03C 27/06* (2006.01)

(52) U.S. Cl.
CPC .............. *F17C 5/007* (2013.01); *F17C 5/06* (2013.01); *F17C 13/025* (2013.01)

(56) References Cited

U.S. PATENT DOCUMENTS

| | | | |
|---|---|---|---|
| 4,886,095 A | 12/1989 | Lisec | |
| 4,909,874 A | 3/1990 | Rueckheim et al. | |
| 5,017,252 A | 5/1991 | Aldrich et al. | |
| 5,080,146 A | 1/1992 | Arasteh | |
| 5,110,337 A | 5/1992 | Lisec et al. | |
| 5,139,595 A | 8/1992 | Taylor | |
| 5,149,799 A | 9/1992 | Rubens et al. | |
| 5,366,574 A * | 11/1994 | Lenhardt | E06B 3/6775 156/102 |
| 5,413,156 A | 5/1995 | Lisec | |
| 5,454,893 A | 10/1995 | Dietz et al. | |
| 5,573,618 A | 11/1996 | Rueckheim | |
| 5,626,712 A | 5/1997 | Lisec | |
| 5,753,069 A | 5/1998 | Rueckheim | |
| 5,957,169 A | 9/1999 | Trpkovski et al. | |
| 6,068,720 A | 5/2000 | Mchugh et al. | |
| 6,158,483 A | 12/2000 | Trpkovski et al. | |
| 6,216,751 B1 | 4/2001 | Trpkovski | |
| 6,916,392 B2 | 7/2005 | Trpkovski et al. | |
| 8,381,382 B2 | 2/2013 | Wunnicke et al. | |
| 8,627,856 B2 | 1/2014 | Mchugh et al. | |
| 8,821,662 B2 | 9/2014 | Mader | |
| 8,905,085 B2 | 12/2014 | Donohue | |
| 2002/0197422 A1 | 12/2002 | Trpkovski et al. | |
| 2012/0151857 A1 | 6/2012 | Heikkila et al. | |
| 2014/0109499 A1 | 4/2014 | Nieminen et al. | |
| 2014/0290156 A1 | 10/2014 | Bruce et al. | |
| 2015/0184447 A1 | 7/2015 | Queck et al. | |
| 2017/0191305 A1 | 7/2017 | Trpkovski | |
| 2019/0003244 A1 | 1/2019 | Trpkovski | |
| 2019/0003245 A1 | 1/2019 | Trpkovski | |
| 2019/0003246 A1 | 1/2019 | Trpkovski | |
| 2020/0392781 A1 | 12/2020 | Trpkovski | |

FOREIGN PATENT DOCUMENTS

| | | |
|---|---|---|
| WO | 2014169253 | 10/2014 |
| WO | 2017120236 | 7/2017 |

OTHER PUBLICATIONS

"International Search Report and Written Opinion," for PCT Application No. PCT/US2017/012188 dated Mar. 16, 2017 (12 pages).
"Understanding Insulating Glass Units," Vitro Architectural Glass accessed online at URL <vitrowindowglass.com/window_glass/understanding_IGU.aspx> on Dec. 23, 2015 (1 page).
"Response to Communication Pursuant to Rules 161(2) and 162 EPC," for European Patent Application No. 17736260.5 filed Feb. 14, 2019 (10 pages).
"Insulated Glazing," retrieved from Wikipedia.com on Aug. 13, 2018 (4 pages). URL <https://en.wikipedia.org/w/index.php?title=Insulated_glazing&oldid=853408716>.
"International Preliminary Report on Patentability," for PCT Application No. PCT/US2017/012188 dated Jul. 19, 2018 (10 pages).
"European Search Report," for European Patent Application No. 17736260.5 dated Sep. 3, 2019 (8 pages).
"Non-Final Office Action," for U.S. Appl. No. 15/398,459 dated Sep. 3, 2019 (20 pages).
"Response to Non Final Office Action," for U.S. Appl. No. 15/398,459, filed Dec. 2, 2019 (9 pages).
"Final Office Action," for U.S. Appl. No. 15/398,459 dated Jan. 6, 2020 (9 pages).
"Response to European Search Report," for European Patent Application No. 17736260.5 filed Mar. 17, 2020 (17 pages).
Non-Final Office Action for U.S. Appl. No. 16/024,786 dated Sep. 4, 2020 (23 pages).
"Non-Final Office Action," for U.S. Appl. No. 16/024,780 dated Oct. 1, 2020 (23 pages).
"Non-Final Office Action," for U.S. Appl. No. dated Sep. 24, 2020 (24 pages).
"Response to Non Final Office Action," for U.S. Appl. No. 16/024,778, filed Dec. 4, 2020 (10 pages).
"Response to Non Final Office Action," for U.S. Appl. No. 16/024,780, filed Dec. 4, 2020 (8 pages).
"Response to Non Final Office Action," for U.S. Appl. No. 16/024,786, filed Dec. 4, 2020 (9 pages).

* cited by examiner

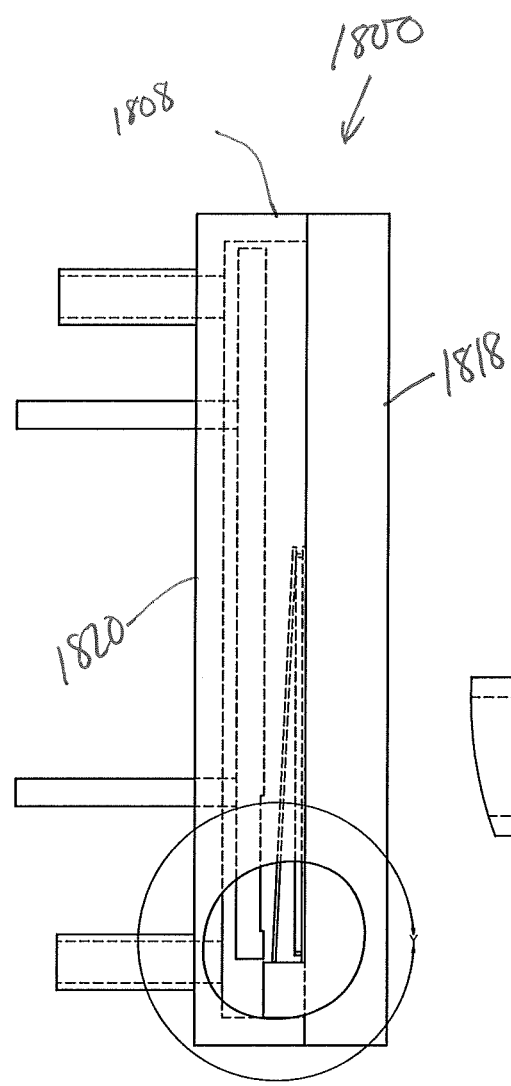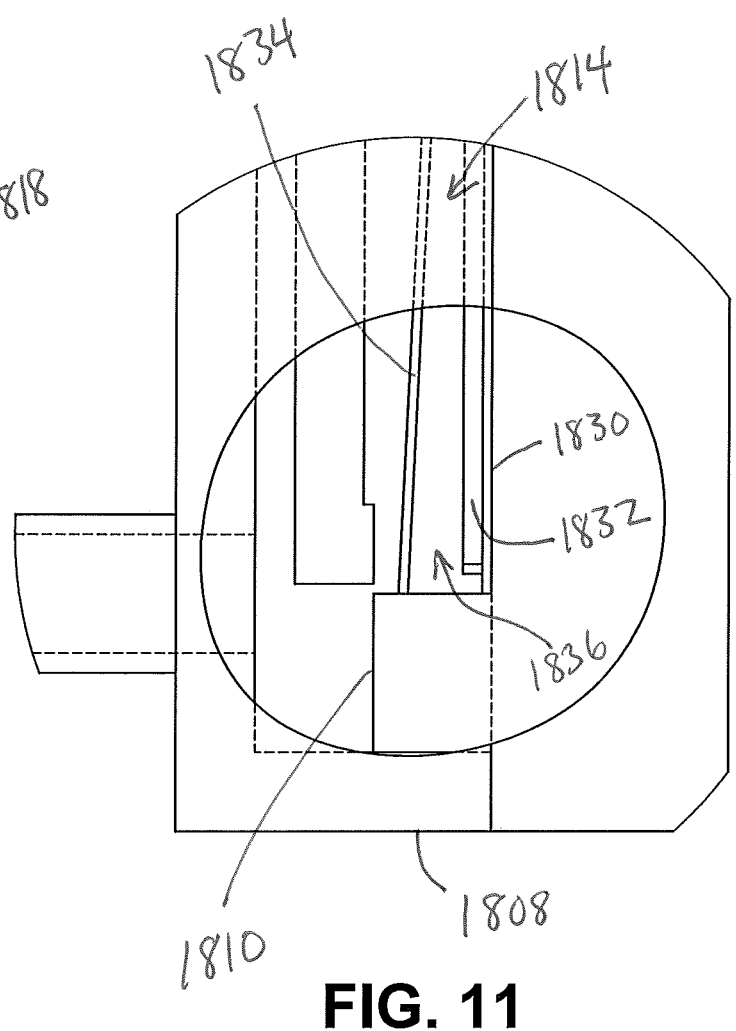
FIG. 10    FIG. 11

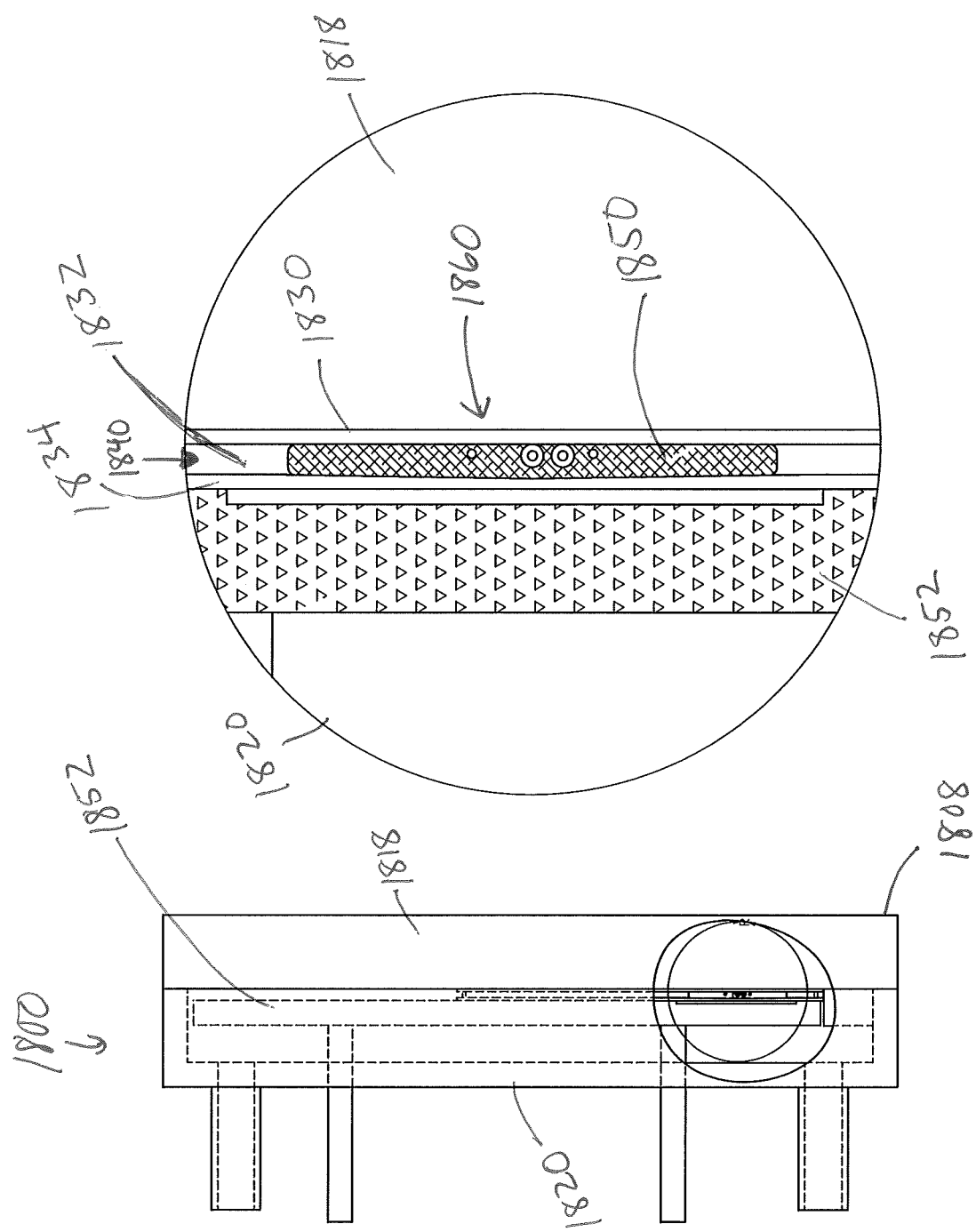

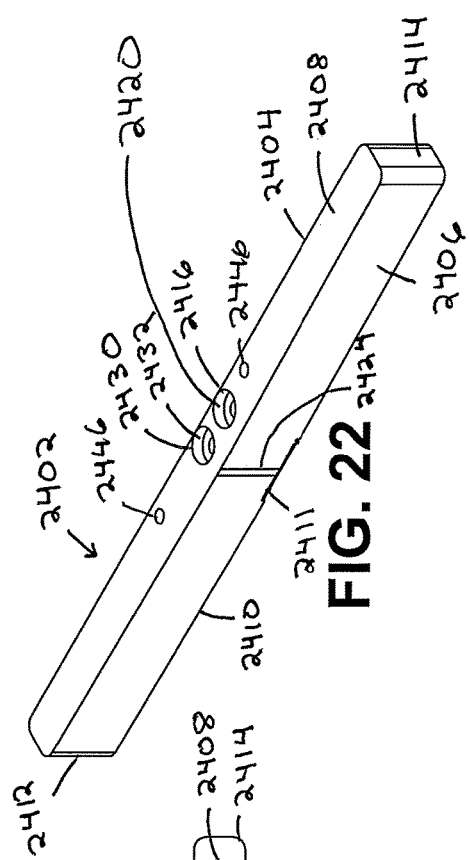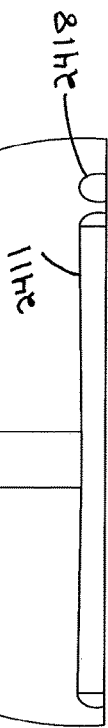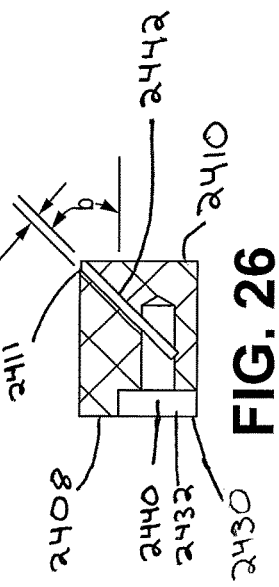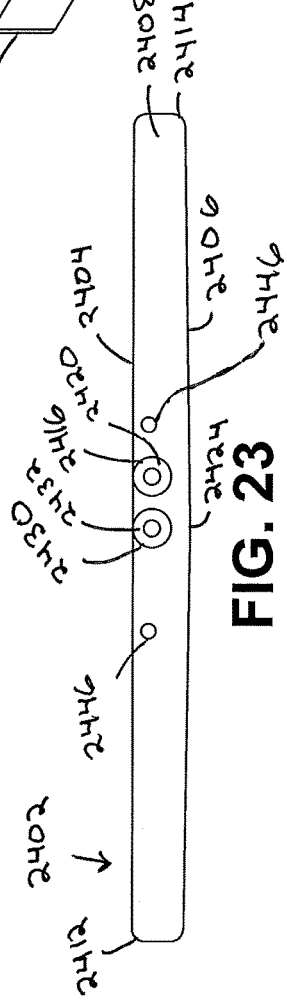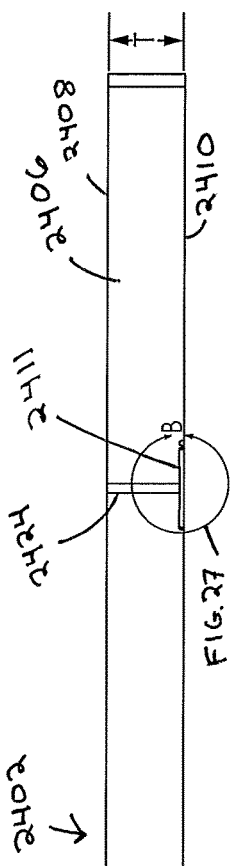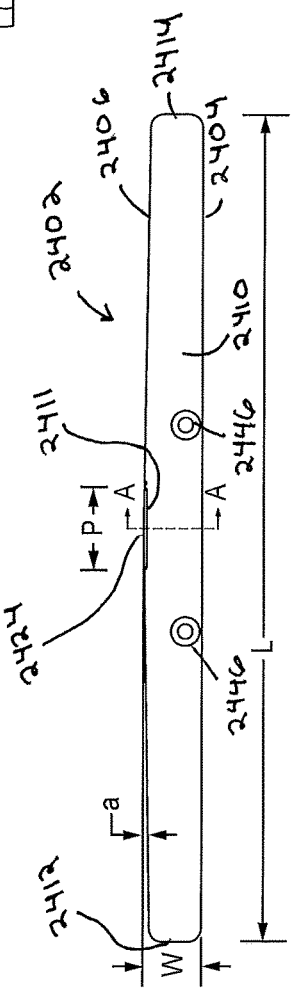

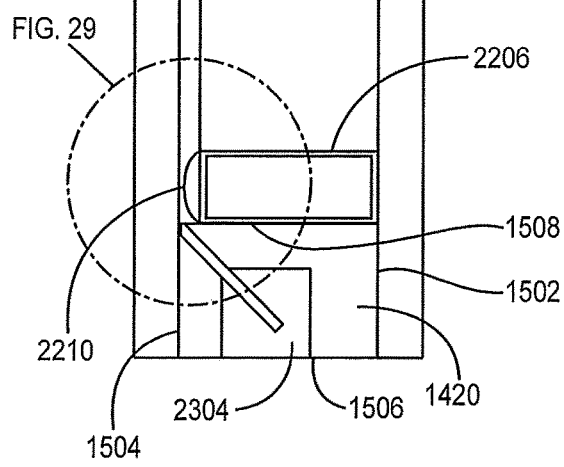
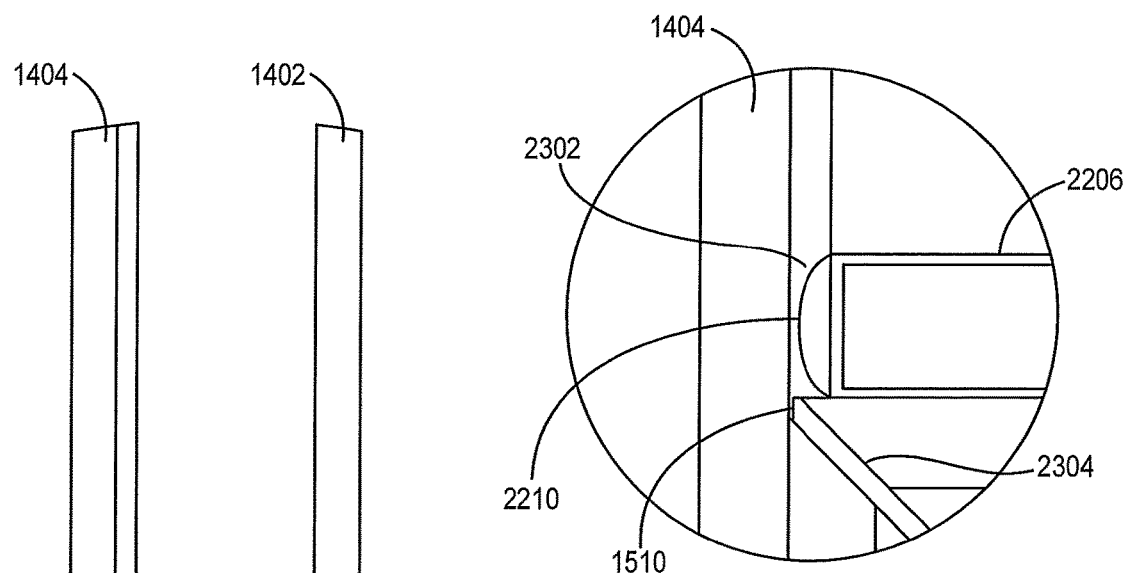
FIG. 29
FIG. 28

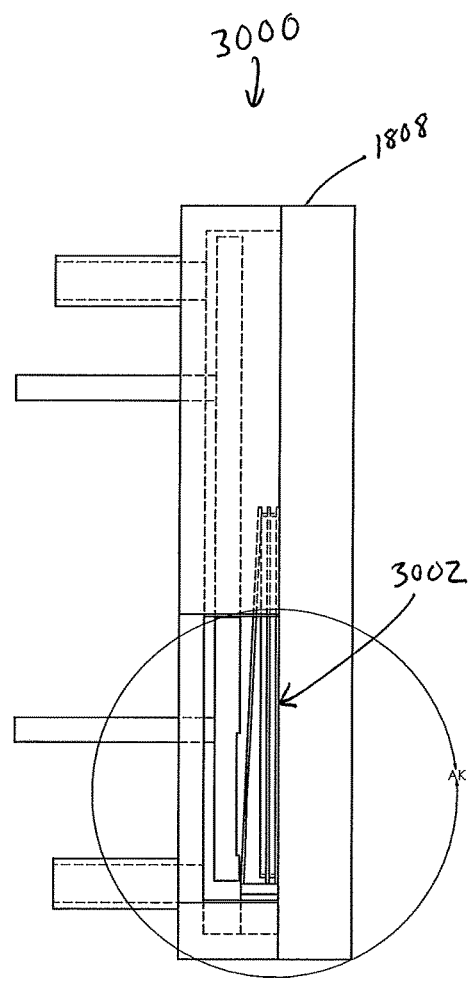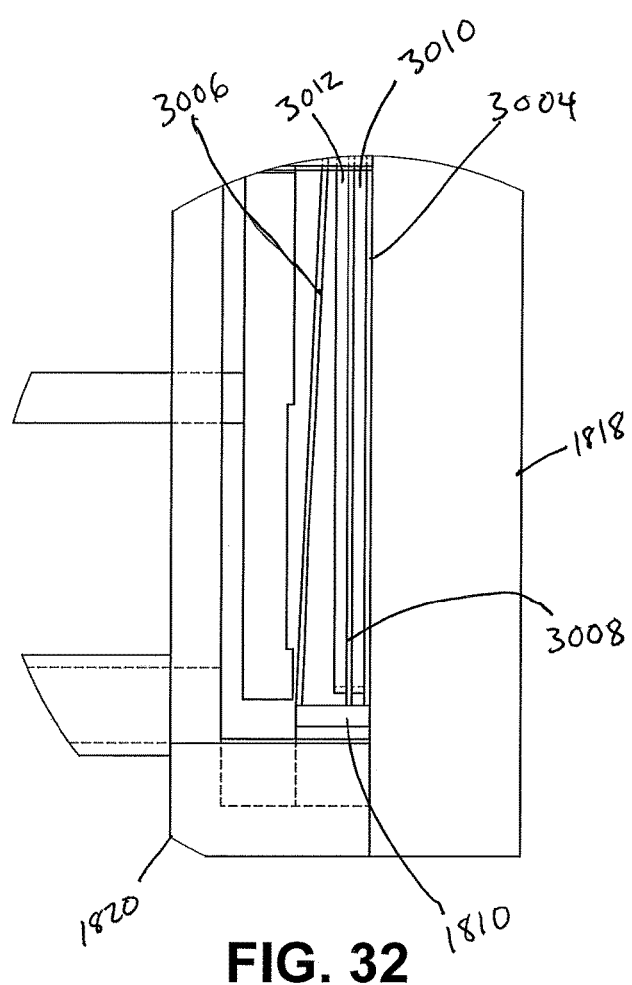
FIG. 31  FIG. 32

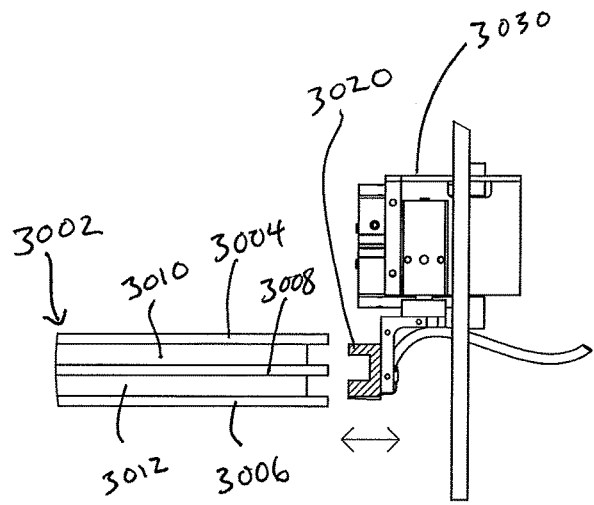
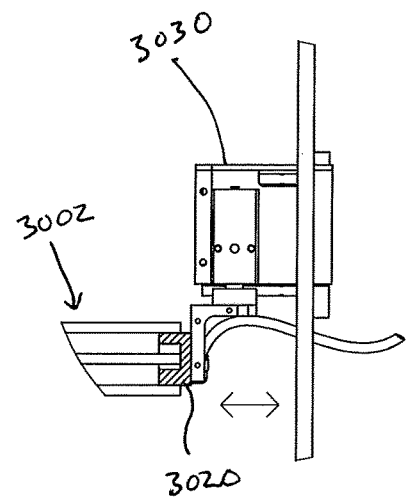
FIG. 36  FIG. 38
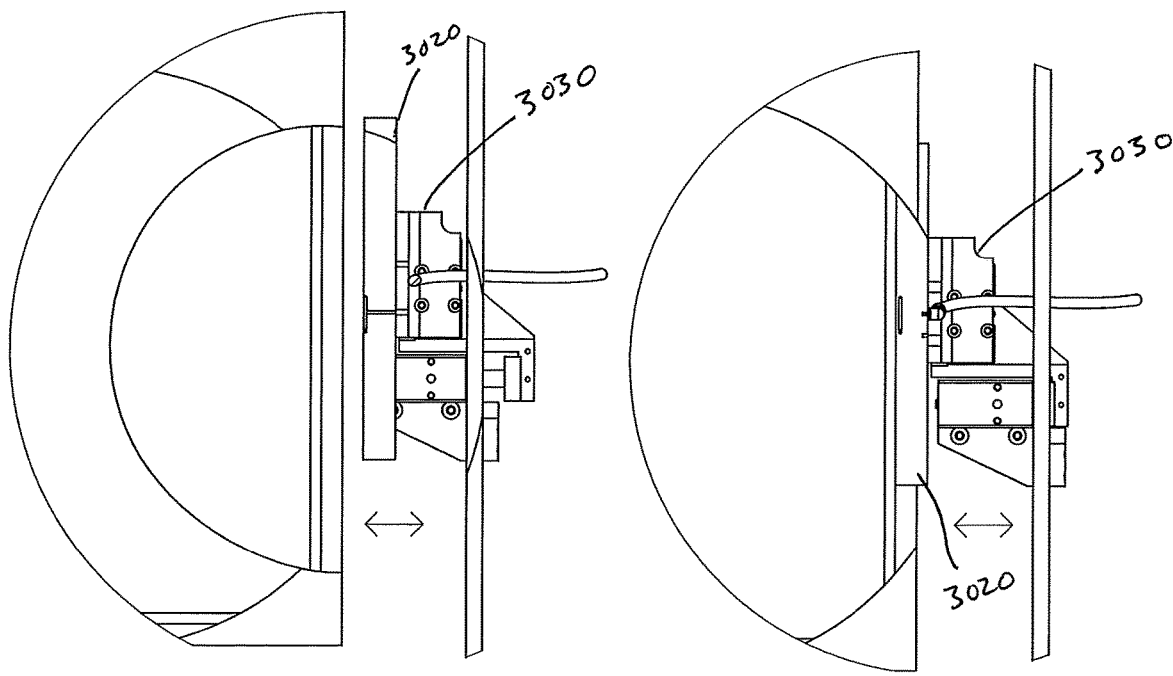
FIG. 35  FIG. 37

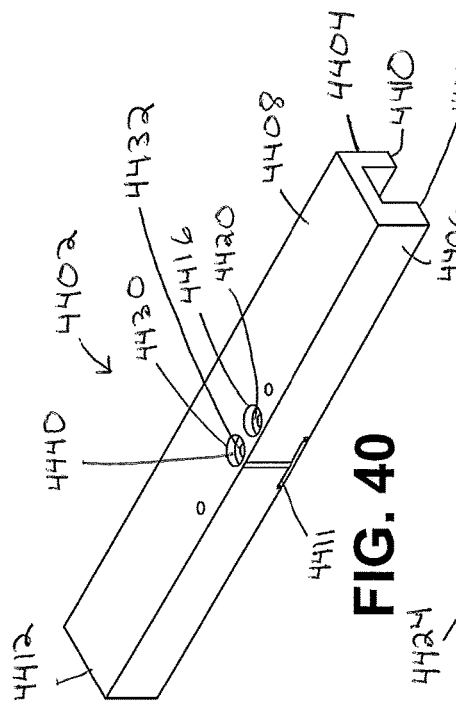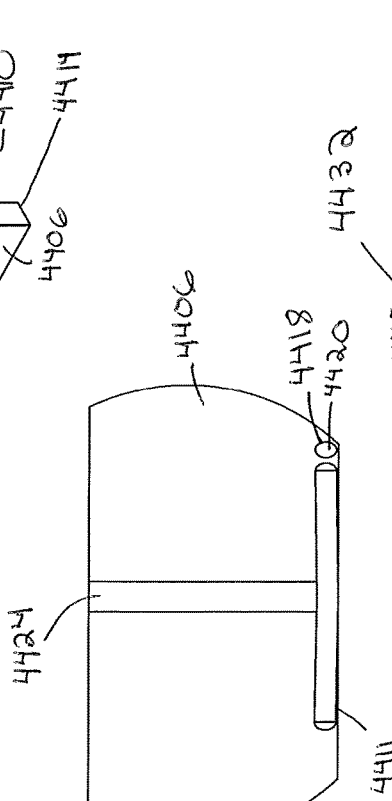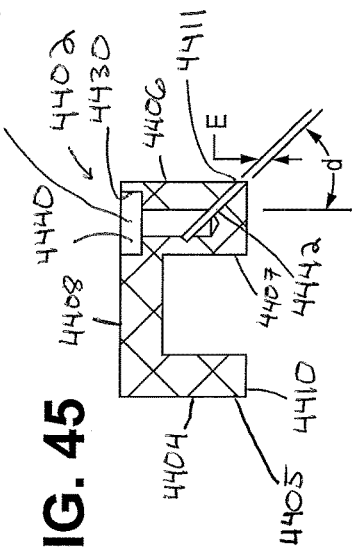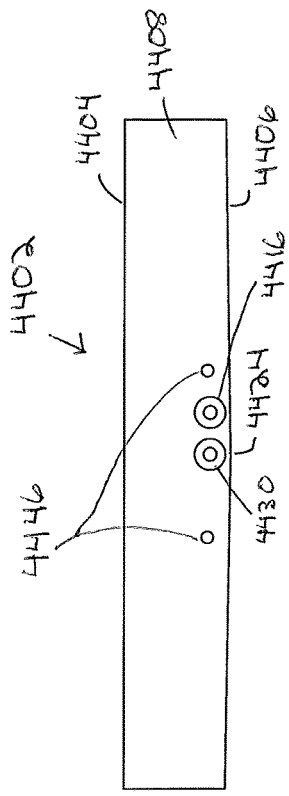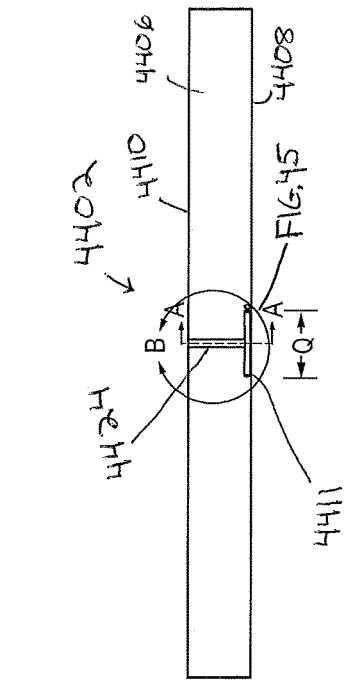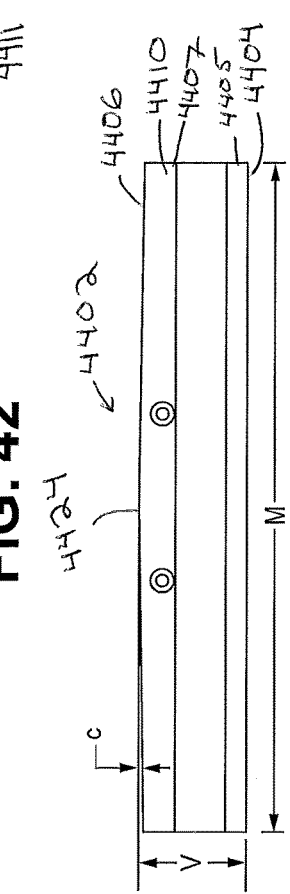

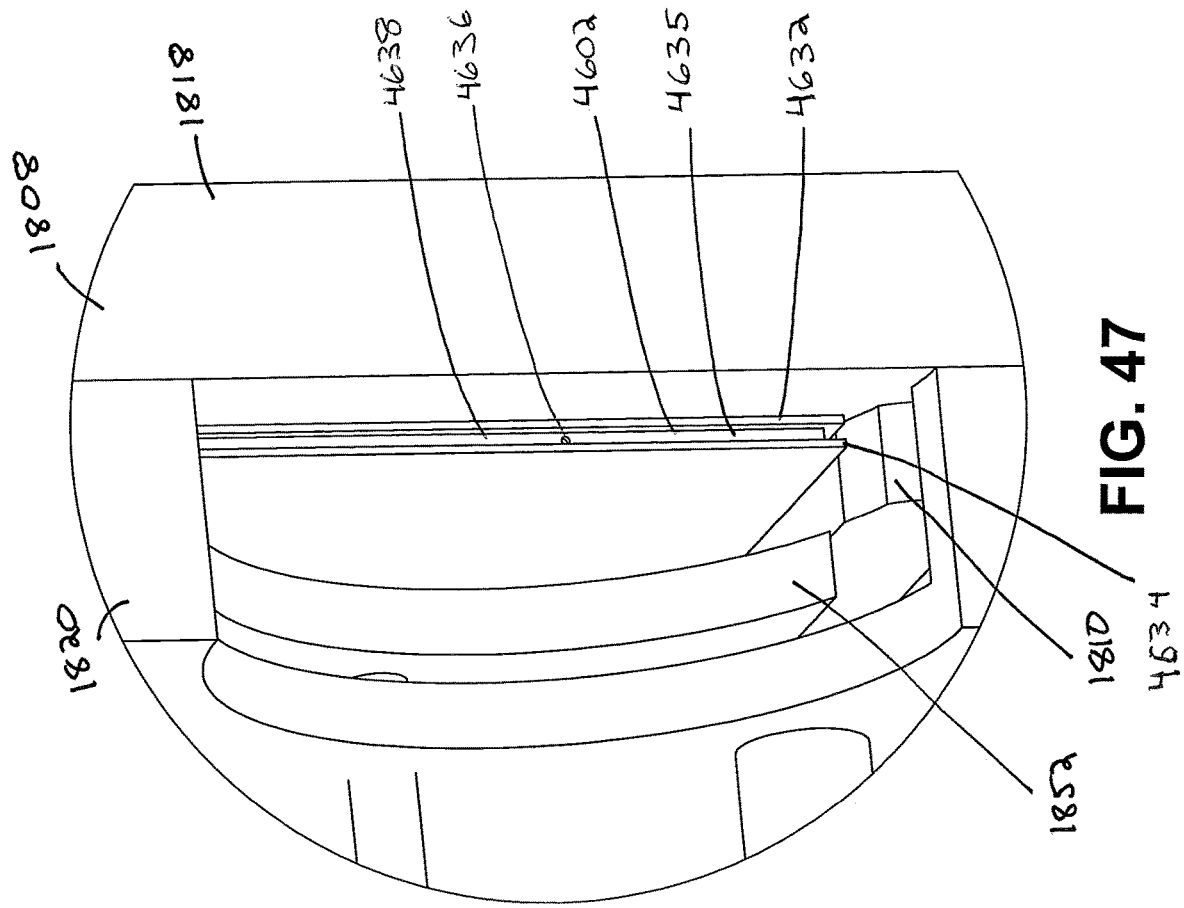
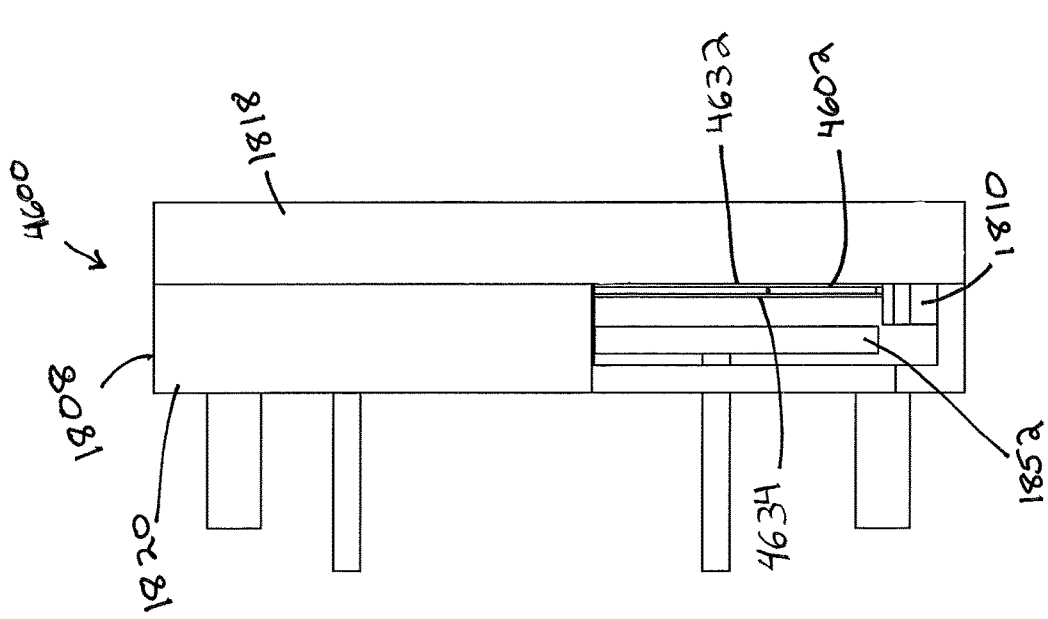

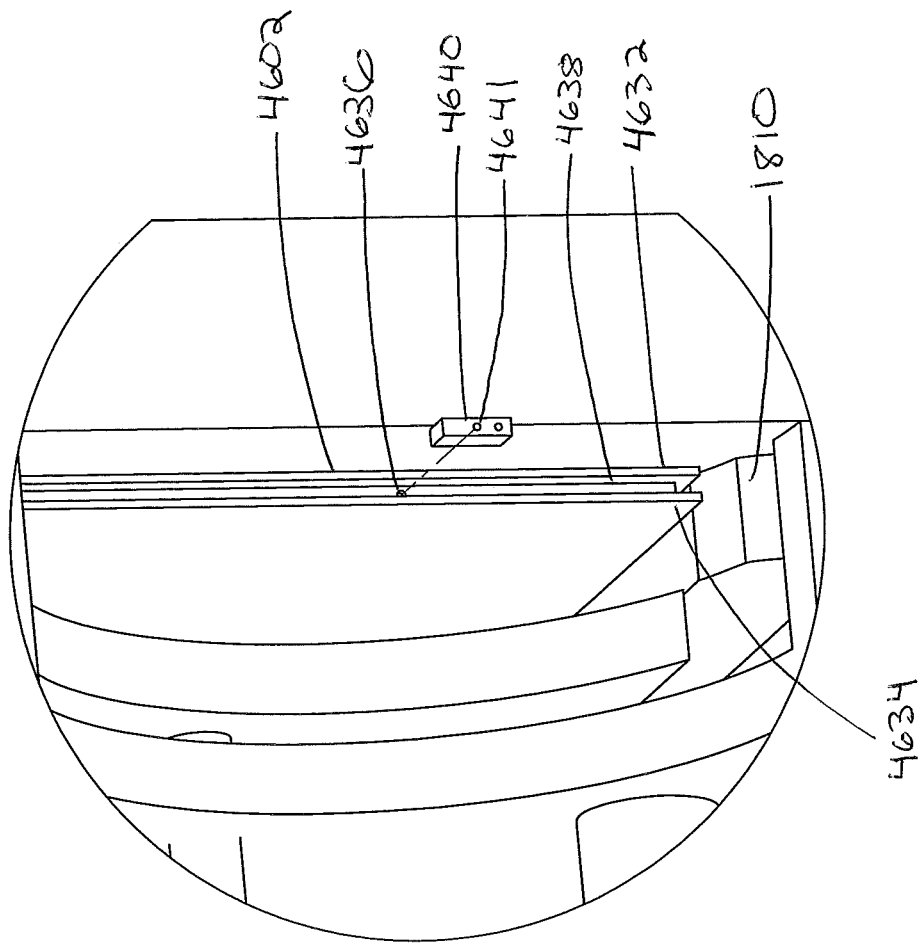
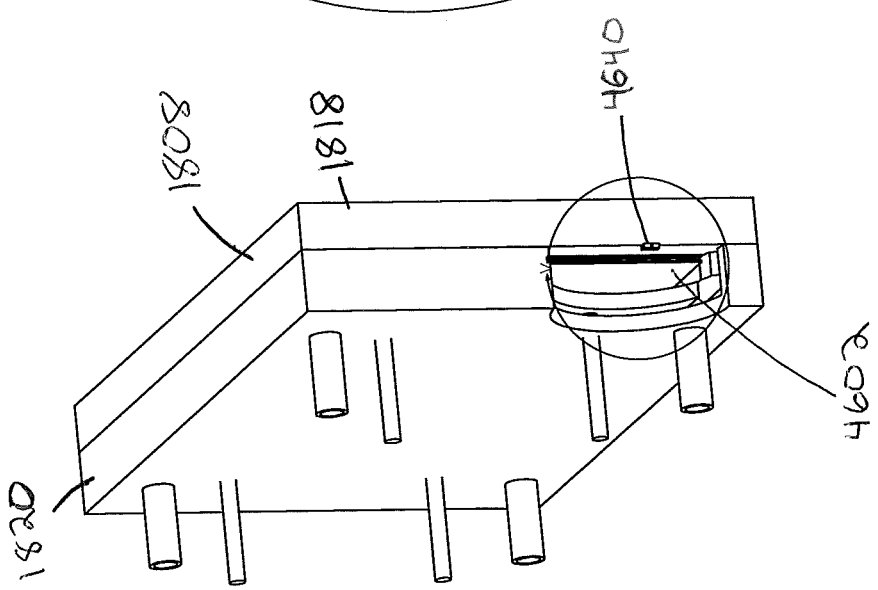
FIG. 49
FIG. 48

GAS FILLING OF AN INSULATING GLASS UNIT

CROSS-REFERENCE TO RELATED APPLICATIONS

This application is a continuation-in-part of prior U.S. application Ser. No. 15/398,459, filed Jan. 4, 2017, which claims the benefit of U.S. Provisional Application No. 62/274,676, filed Jan. 4, 2016, the contents both of which are herein incorporated by reference in their entireties.

FIELD OF THE TECHNOLOGY

The present application relates to filling an insulating glass unit. More specifically, the present application relates to filling an insulating glass unit with a gas within an enclosure.

BACKGROUND

In recent years, there has been an increased awareness on energy usage and conservation. As a result many governing bodies have released energy standards and regulations for buildings and construction materials. These standards and regulations frequently require more energy efficient systems and components.

One specific area of focus includes more efficient windows and doors. Many governing bodies have passed regulations that require windows and doors to have a minimum insulating value to limit the amount of energy lost through windows and doors. As a result, window and door manufacturers have needed to find ways to increase the insulating properties of their products. The materials and techniques used to produce more insulated windows and doors have resulted in an increased cost to manufacture the windows and doors.

Some techniques and systems have been developed to fill glass units with one or more insulating gases. For example, U.S. Pat. No. 8,627,856 discloses a method and apparatus wherein the insulating gases are supplied to gas filling tubes that are inserted into one or more interpane spaces of the insulating glass units. Each interpane space may be filled with more than one insulating gas. A control unit controls the injection of the insulating gases in accordance with gas filling data received by the control unit.

SUMMARY

Embodiments disclosed herein include methods, machines, and systems for replacing air with an interpane gas during manufacture of a sealed insulating glass unit (IGU) is described herein.

According to an embodiment, a method of filling with an interpane gas during manufacture of a sealed insulating glass unit (IGU) is provided. In the method, a sealed IGU includes first and second sheets of glass material and at least one spacer frame between the first and second sheets. The sealed IGU defines an interpane space filled with an interpane gas. The method includes automatically actuating a filling device within a vacuum enclosure to be in fluid communication with an unsealed interpane space of an unsealed IGU assembly through an IGU passage of the unsealed IGU assembly and introducing a first gas through the filling device into the unsealed interpane space through the IGU passage and through a filling passage of the filling device.

According to some implementations, the method can also include one or more of the following:
automatically actuating the filling device comprises bringing the filling device next to a structure of the unsealed IGU assembly that defines the IGU passage;
evacuating air from the vacuum enclosure and substantially simultaneously evacuating air from the unsealed IGU assembly while the unsealed IGU assembly is positioned within the vacuum enclosure (evacuating the air can occur before actuating a filling device to be in fluid communication with an unsealed interpane space);
the filling device being further configured to evacuate the interpane space when it is in fluid communication with the interpane space, the method further including after actuating the filling device to be in fluid communication with the interpane space, evacuating air from the vacuum enclosure and substantially simultaneously evacuating air from the unsealed IGU assembly using the filling device while the unsealed IGU assembly is positioned within the vacuum enclosure;
after introducing the first gas, automatically actuating the filling device within the vacuum enclosure to move away from the IGU passage;
sealing the IGU passage while the unsealed IGU assembly is within the vacuum chamber and while the vacuum chamber is evacuated
sealing the IGU passage after vacuum chamber is brought up to atmosphere; and
where the sealed IGU further includes an intermediate pane of transparent or translucent material located between the first and second sheets, wherein the intermediate pane defines an opening to permit fluid communication between a first portion of the interpane space adjacent to the first sheet and a second portion of the interpane space adjacent to the second sheet.

According to another embodiment, a system for filling with an interpane gas during manufacture of a sealed insulating glass unit (IGU) is provided. A sealed IGU includes first and second sheets of glass material and at least one spacer frame between the first and second sheets, and the sealed IGU defines a sealed interpane space filled with an interpane gas. The system also includes a vacuum enclosure and a filling device. The vacuum enclosure is configured for receiving and sealing around an unsealed IGU assembly that defines an IGU passage for fluid communication between an unsealed interpane space and an ambient environment. The filling device is configured for automatically actuating within the vacuum enclosure to be in fluid communication with the unsealed interpane space of the unsealed IGU assembly through at least a portion of the IGU passage and for filling the interpane space with a first gas.

According to another embodiment, a system for filling with an interpane gas during manufacture of a sealed insulating glass unit (IGU) is provided. A sealed IGU includes first and second sheets of glass material and at least one spacer frame between the first and second sheets. The sealed IGU defines a sealed interpane space filled with an interpane gas. The system also includes a support structure, a vacuum enclosure, a first gas supply, and a second gas supply. The support structure is for supporting and translating an unsealed IGU assembly. The unsealed IGU assembly defines an IGU passage for fluid communication between an unsealed interpane space and an ambient environment. The vacuum enclosure is configured for receiving the unsealed IGU assembly, sealing the enclosure around the unsealed IGU assembly and evacuating air from the enclosure. The first gas supply is in selective fluid communication with the unsealed interpane space through at least a portion of the IGU passage. The second gas supply is in selective fluid communication with the vacuum enclosure, and has a different composition than the first gas.

According to some implementations, the system can include one or more of the following:

wherein the support structure includes a conveyor belt;

wherein the vacuum enclosure is configured to seal around a portion of the support structure while the portion supports the unsealed IGU assembly;

wherein the vacuum enclosure includes a fixed portion and a moveable portion, wherein at least a portion of the support structure is attached to the fixed portion;

a pressing device configured for moving the second sheet into a sealed position with the at least one spacer frame;

wherein the first gas supply includes a filling device defining a filling passage and an actuator configured to automatically move the filling device into a first position where the filling passage is in fluid communication with the at least a portion of the IGU passage of the IGU assembly and provide the unsealed interpane space with the first gas;

wherein the filling device further defines a sensor passage and includes a pressure transducer positioned in the sensor passage and in fluid communication with the interpane space when the filling device is in the first position;

wherein in the first position, the filling device is positioned between the first and second sheets of the unsealed IGU at a location outside of an external perimeter of the at least one spacer frame, the system further including a pressing device configured to press the unsealed IGU assembly, wherein the actuator is further configured to retract the filling device from between the first and second sheets after the first gas is provided to the interpane space;

wherein the sealed IGU further includes an intermediate pane of transparent or translucent material located between the first and second sheets, wherein the intermediate pane defines an opening to permit fluid communication between a first portion of the interpane space adjacent to the first sheet and a second portion of the interpane space adjacent to the second sheet; and wherein the unsealed IGU assembly defines an open passage between a portion of the at least one spacer frame and the second sheet, and the system further includes a filling device defining a filling passage and having a first position in which the filling passage is in fluid communication with the open passage and wherein at least a portion of the filling device is positioned between the second sheet and the intermediate pane of the partially assembled IGU.

According to another embodiment, a method of filling with an interpane gas during manufacture of a sealed insulating glass unit (IGU) is provided. In the method, a sealed IGU includes first and second sheets of glass material and at least one spacer frame between the first and second sheets and sealed to at least one of the first and second sheets. The sealed IGU defines an interpane space filled with an interpane gas. The method includes forming an unsealed IGU assembly defining an IGU passage for fluid communication between an interpane space and an ambient environment, translating the unsealed IGU assembly into a vacuum enclosure using a support structure located underneath the IGU assembly, sealing the vacuum enclosure around the unsealed IGU assembly, evacuating air from the vacuum enclosure, introducing a first gas into the interpane space through at least a portion of the IGU passage, introducing a second gas into the vacuum enclosure, wherein the second gas has a different composition than the first gas, and closing the IGU passage to seal the interpane space.

According to some implementations, the method can include one or more of the following:

wherein the vacuum enclosure includes a fixed portion and a moveable portion, wherein at least a portion of the support structure is attached to the fixed portion, the method further including moving the moveable portion to seal around and enclose the unsealed IGU and the portion of the support structure;

wherein introducing a first gas includes automatically actuating a filling device within a vacuum enclosure to be in fluid communication with the at least a portion of the IGU passage, wherein the first gas is introduced through a filling passage of the filling device; and wherein the spacer frame defines a spacer hole that is part of the at least a portion of the IGU passage, wherein, in the first position, the filling device is positioned between the first and second sheets of the unsealed IGU at a location outside of an external perimeter of the at least one spacer frame so that the filling passage is in fluid communication with the spacer hole.

This summary is an overview of some of the teachings of the present application and is not intended to be an exclusive or exhaustive treatment of the present subject matter. Further details are found in the detailed description and appended claims. Other aspects will be apparent to persons skilled in the art upon reading and understanding the following detailed description and viewing the drawings that form a part thereof, each of which is not to be taken in a limiting sense. The scope of the present application is defined by the appended claims and their legal equivalents.

BRIEF DESCRIPTION OF THE DRAWINGS

The technology may be more completely understood in connection with the following drawings, in which:

FIGS. 8-13 are views showing steps in assembling an unsealed insulating glass unit assembly within an enclosure, according to an embodiment.

FIG. 22 is a perspective view of the filling block illustrated in FIGS. 12-21, according to an embodiment.

FIGS. 23, 24 and 25 are views of an inlet side, a curved side, and a front, planar outlet side of the filling block of FIG. 22, respectively.

FIG. 26 is a cross-sectional view of the filling block of FIG. 22, taken through line A-A of FIG. 25.

FIG. 27 is an enlarged view of Detail B of the filling block as shown in FIG. 24.

FIG. 28 is a cross-sectional view of a portion of a wedge-sealed IGU, taken through an inlet of the filling block, according to an embodiment.

FIG. 29 is an enlarged view of the detail indicated in FIG. 28.

FIGS. 30-39 are views showing steps in assembling an insulating glass unit assembly within an enclosure, according to an embodiment.

FIG. 40 is a perspective view of the filling block illustrated in FIGS. 30-39, according to an embodiment.

FIGS. 41, 42, and 43 are views of an inlet side, curved side and front, planar outlet side of the filling block of FIG. 40, respectively.

FIG. 44 is a cross-sectional view of the filling block of FIG. 40, taken through line A-A of FIG. 42.

FIG. 45 is an enlarged view of Detail B of the filling block of FIG. 42.

FIGS. 46-55 are views showing steps in assembling an insulating glass unit assembly within an enclosure, according to an embodiment.

Figure 1:
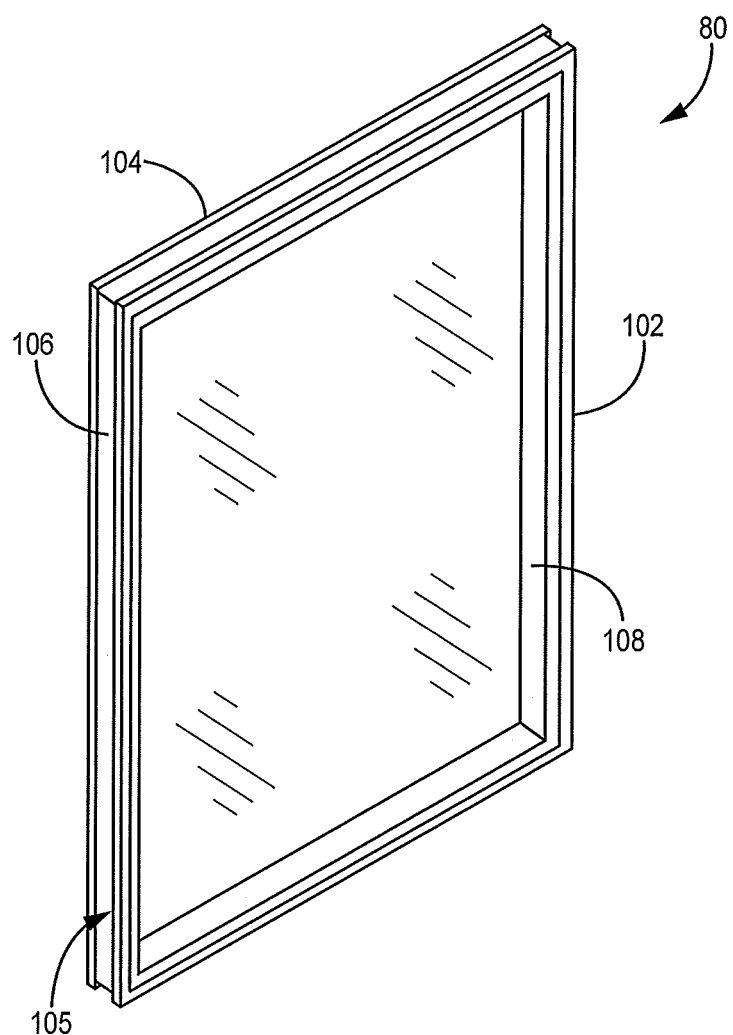
FIG. 1 is a perspective view of an insulating glass unit, according to an embodiment.

While the technology is susceptible to various modifications and alternative forms, specifics thereof have been shown by way of example and drawings, and will be described in detail. It should be understood, however, that the application is not limited to the particular embodiments described. On the contrary, the application is to cover modifications, equivalents, and alternatives falling within the spirit and scope of the technology.

DETAILED DESCRIPTION

The embodiments of the present technology described herein are not intended to be exhaustive or to limit the technology to the precise forms disclosed in the following detailed description. Rather, the embodiments are chosen and described so that others skilled in the art can appreciate and understand the principles and practices of the present technology.

All publications and patents mentioned herein are hereby incorporated by reference. The publications and patents disclosed herein are provided solely for their disclosure. Nothing herein is to be construed as an admission that the inventors are not entitled to antedate any publication and/or patent, including any publication and/or patent cited herein.

Windows that are installed in buildings and other structures frequently include an insulating glass unit surrounded by a frame. The insulating glass unit can include a first sheet of glass material and a second sheet of glass material. Some insulating glass units can further include a third sheet, such as a sheet of glass material. A spacer can separate the first sheet from the second sheet. The spacer can extend around the insulating glass unit near the perimeter of the insulating glass unit. The first sheet, second sheet, and spacer define an interpane space or volume that can be initially filled with air, such as air from the ambient environment of the manufacturing facility. In various embodiments, the air can be replaced with a different gas, such as to increase or affect the insulating properties of the window. Various different gases have different insulating properties. Some varieties of IGUs have a first sheet, second sheet, and an intermediate sheet between the first and second sheets, referred to as triple pane IGUs. In some examples, two portions of an interpane space of a triple pane IGU are in fluid communication with each other through an opening in the intermediate sheet.

In some examples, the gas used to fill the interpane space can be relatively expensive. As such, it can be desired to have a more efficient system and method for filling the interpane space with an insulating gas that minimizes waste of the insulating gas during the manufacturing process. In some examples, it can be desired to have a system and method for filling the interpane space with an insulating gas that minimizes the waste of a first gas. For example, a second gas can be used to surround the environment for filling with a first gas. In an example, a second gas can be used so that it is more likely that a second gas is wasted if waste occurs.

When large quantities of IGUs are being produced, a speed increase achieved during the process of filling each IGU can have a significant economic impact.

In an embodiment, an unsealed glass unit is positioned within an enclosure. The air within the enclosure and within the unsealed glass unit is evacuated to create a low pressure system or vacuum within the glass unit and enclosure. A first gas is introduced into the interpane space and a second gas is introduced into the enclosure. The first gas can be introduced simultaneously as the second gas, or one of the gases can be introduced shortly after the other gas, such as within 1 or 2 seconds.

In an embodiment, an interpane gas is provided during manufacture of a sealed insulating glass unit (IGU) by automatically actuating a filling device within a vacuum enclosure to be in fluid communication with an unsealed interpane space of an unsealed IGU assembly through an IGU passage of the unsealed IGU assembly and introducing a first gas through the filling device into the unsealed interpane space through the IGU passage and through a filling passage of the filling device.

Automation of movement of a filling device within a vacuum chamber provides a. time savings in the filling process in some examples. Even a relatively small time savings on the filling of each individual IGU is significant when large quantities of IGUs are being produced. In an example of the system described herein, a cycle time for evacuating, filling with a first gas and sealing an IGU is one minute or less per IGU. If a vacuum enclosure accommodates multiple IGUs, a cycle time of the vacuum enclosure for evacuating, filling with a first gas and sealing all enclosed IGUs is divided by the number of IGUs in the vacuum enclosure to obtain the cycle time per LOU. If a vacuum enclosure accommodates a single IGU, a cycle time of the vacuum enclosure for evacuating, filling with a first gas and sealing the enclosed IGU is the same as the cycle time per IGU. In one example, the system accommodates two IGUs and the vacuum enclosure has a cycle time of 40 seconds or less, so the cycle time per IGU is 20 seconds or less. In one example, the cycle time of the vacuum enclosure for evacuating, filling and sealing one or more enclosed IGUs is one minute or less.

FIG. 1 is a perspective view of a completed, sealed insulating glass unit, according to an embodiment. The insulating glass unit 80, also referred to herein as an "IGU" 80, can include a first sheet 102 and a second sheet 104. The IGU 80 can include a spacer 106 disposed between the first sheet 102 and the second sheet 104. In an embodiment, the spacer 106 is slightly inset from the perimeter of the first sheet 102 and the second sheet 104. FIG. 1 shows an example of the spacer 106 being inset from the perimeter of the first sheet 102 and the perimeter of the second sheet 104. In various examples, a frame will be added around the perimeter of the IGU 80 prior to the IGU 80 being installed in a building or home.

The first sheet 102 and the second sheet 104 can include a translucent, transparent, or semi-transparent material, such as to allow light to pass through the two sheets 102, 104 or to allow a person to see through the two sheets 102, 104. In various embodiments, the first sheet 102 and the second sheet 104 include a glass material or glass or plastic, such as a clear or translucent glass or plastic. In various embodiments, the first sheet 102 and the second sheet 104 can be similar, such that the two sheets 102, 104 have a substantially similar shape and/or size.

The spacer 106 can be coupled to the first sheet 102 and the second sheet 104. The spacer 106 can extend from the first sheet 102 to the second sheet 104, such as to define a volume or an interpane space 108. The interpane space 108 is defined between the first sheet 102 and the second sheet 104. The spacer 106 also forms a boundary of the interpane space 108.

The spacer 106 is formed into a spacer frame 105 that surrounds the interpane space 108. The spacer frame 105 has a shape that matches the outer perimeter shape of the IGU 80. For example, where the IGU 80 is rectangular as in FIG. 1, the spacer frame 105 is a rectangle. In some embodiments, the spacer frame 105 can be generally rectangular, such as a rectangular shape with rounded corners. In various embodiments, the spacer frame 105 can have rounded corners and the outer perimeter of the IGU can be rectangular with square corners.

In various embodiments, a completed IGU 80 can be sealed, such as to trap an interpane gas within the interpane space 108. The sealed IGU 80 can retain the interpane gas within the interpane space 108 and prevent external gasses from entering the interpane space 108.

Figure 2:
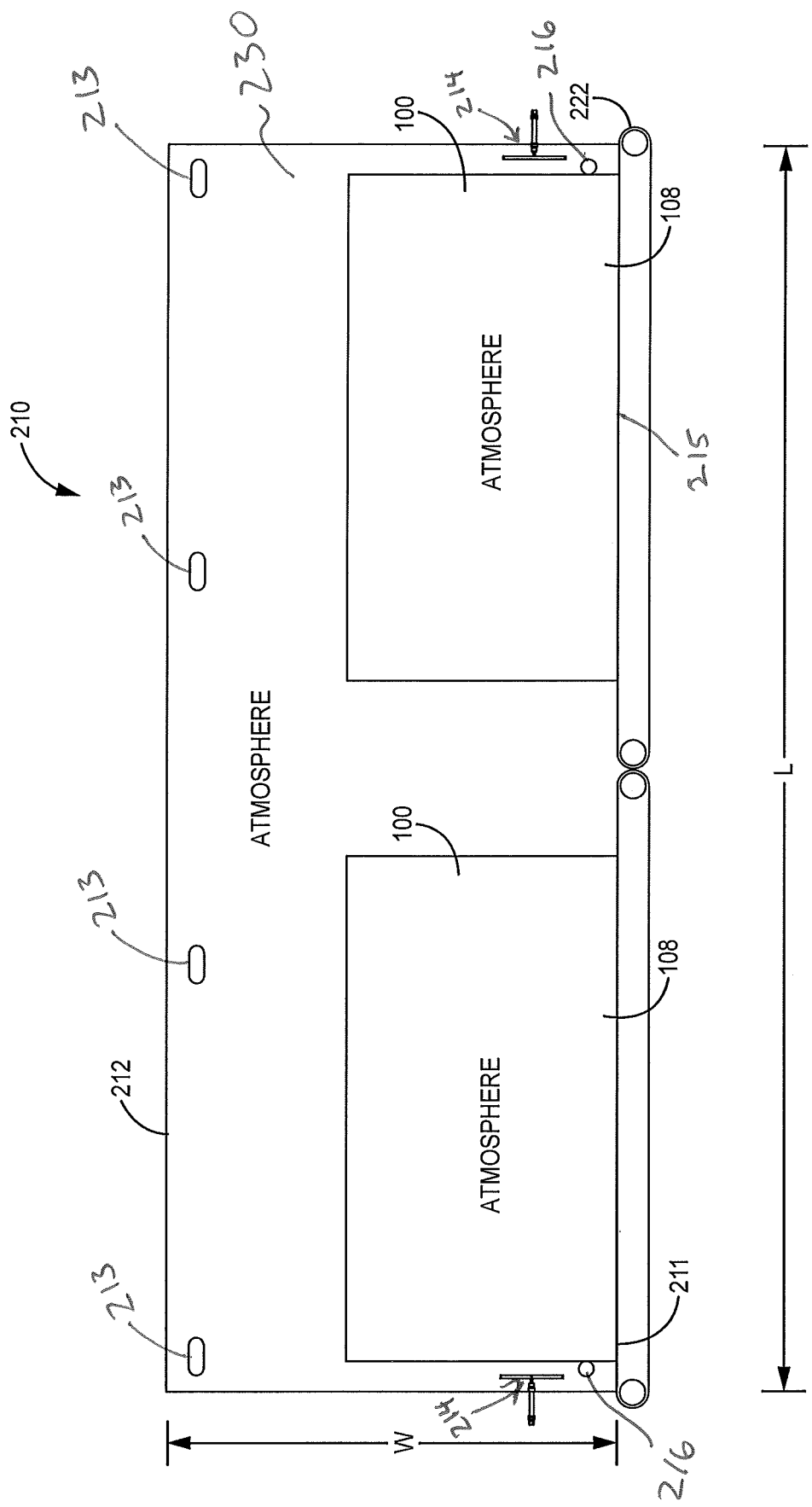
FIG. 2 is a front view of a first step of an example manufacturing process, where two unsealed insulating glass unit assemblies are positioned within an enclosure, according to an embodiment.
Figure 3:
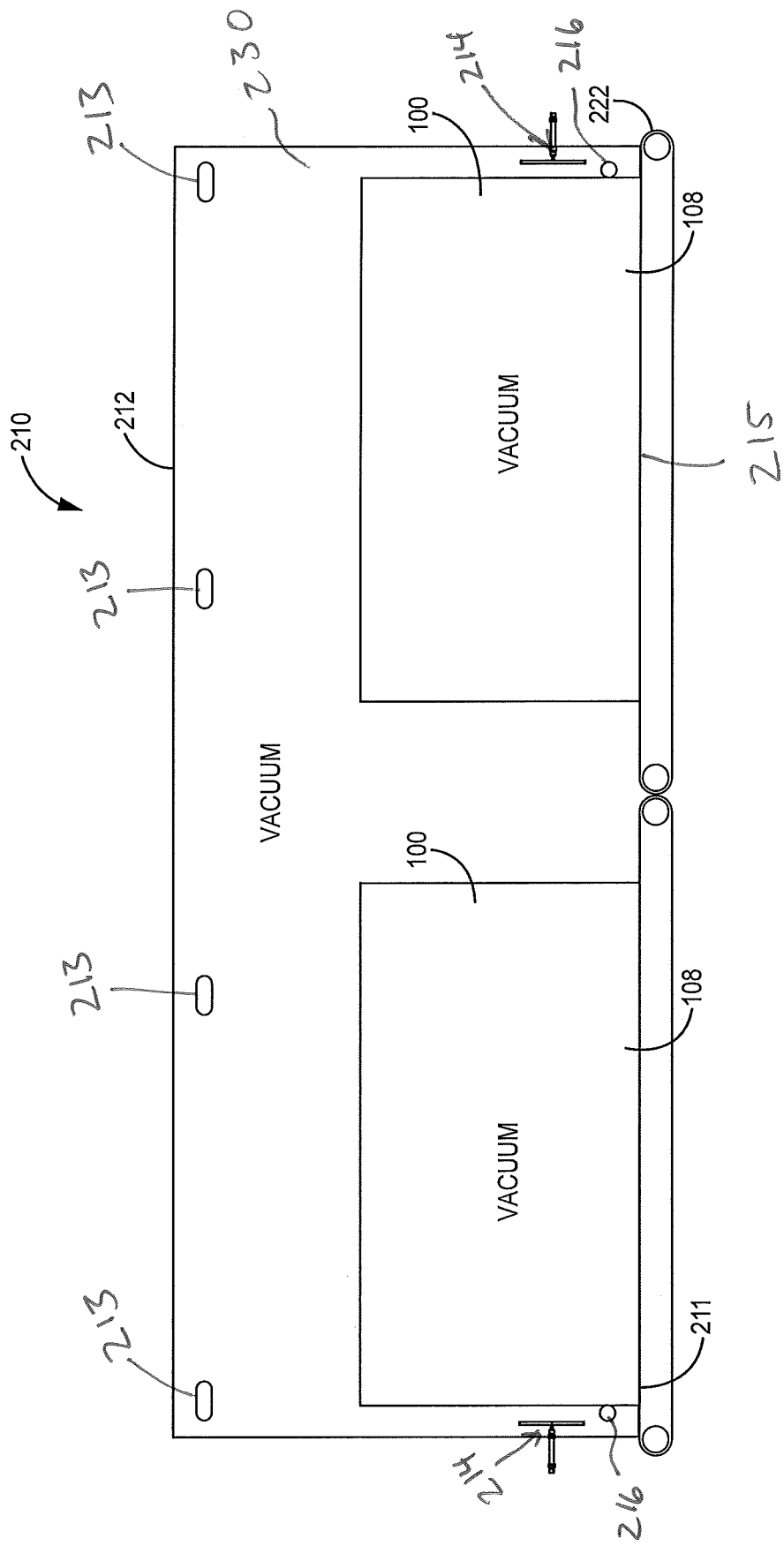
FIG. 3 is a front view of a further step of an example manufacturing process, where two unsealed insulating glass unit assemblies are positioned within an enclosure that has been evacuated of air, according to an embodiment.
Figure 4:
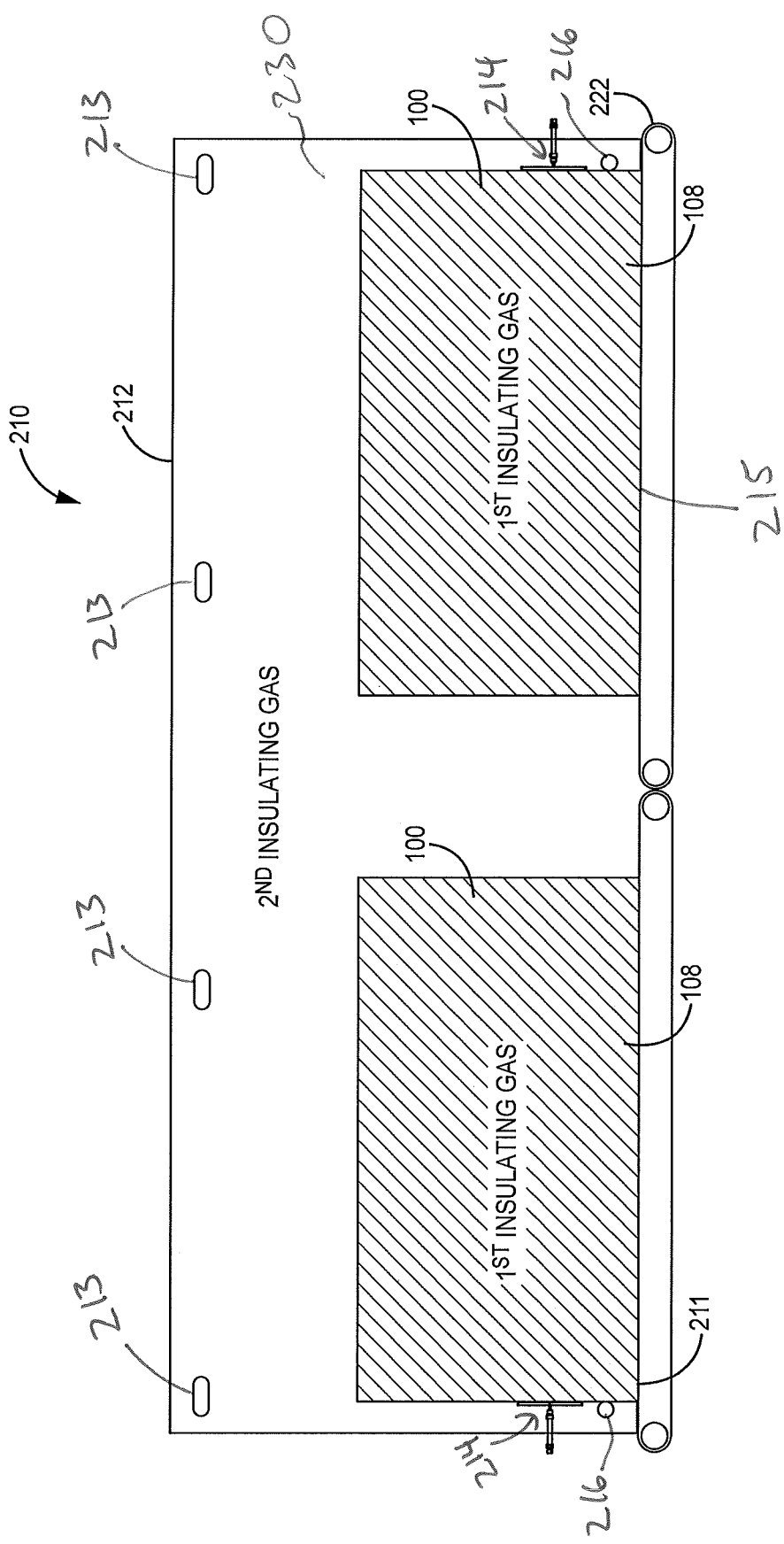
FIG. 4 is a front view of a still further step of an example manufacturing process where two unsealed insulating glass unit assemblies are positioned within an enclosure, according to an embodiment.

FIGS. 2-4 generally show various stages of a system 210 for replacing air with an interpane gas during the manufacturing of a sealed IGU, such as the IGU depicted in FIG. 1. The system 210 can include an enclosure 212. In an embodiment, the enclosure 212 can have a depth of about 2 inches.

In an embodiment, the enclosure 212 can have a depth that is about twice the depth of an IGU. In an embodiment, the enclosure 212 can have a width W of about 60 inches and a length L of about 170 inches.

The enclosure 212 can be configured to enclose one or more IGUs 100. In an embodiment, the enclosure 212 can enclose a single IGU, two or more IGUs, three or more IGUs, four or more IGUs, five or more IGUs, or six or more IGUs. FIGS. 2-4 show an enclosure with two IGUs 100. In an embodiment, the system 210 can include a support structure 222 to support the one or more IGUs 100 within the enclosure 212. In an embodiment, the support structure 222 can include one, two, or more conveyor belts. In the example shown in FIGS. 2-4, the support structure 222 includes a first conveyor belt 211 and a second conveyor belt 215. Various examples of an enclosure are illustrated and described with respect to FIGS. 8-11, 17-21, 30-34, 39, 47-50, 55, and 57-60.

FIG. 2 shows an initial stage of the manufacturing process where the unsealed IGU assemblies 100 are already positioned within the enclosure. IGUs can enter an enclosure in a variety of ways including, for example, positioning by hand or automatically advancing into the enclosure along a linear conveyor system. The IGUs are unsealed when they enter the enclosure 212 to be filled. An unsealed IGU assembly (also referred to as unsealed IGU) defines an IGU passage for fluid communication between an interpane space 108 and an environment external to the IGU. Examples of environments external to the IGU, include the environment immediately surrounding the IGU, an interior of a vacuum enclosure, or a first gas supply tank.

There are several options for defining the one or more fluid communication passages to the interpane space 108 in an unsealed IGU assembly. For example, the unsealed IGU assembly can be a partially assembled IGU that is unsealed along at least a portion of the spacer frame and at least one of the sheets, but sealed along the remaining portion of the spacer frame. An IGU passage to the interpane space of the partially assembled IGU is defined at the unsealed edge portion in these examples.

Figure 5:
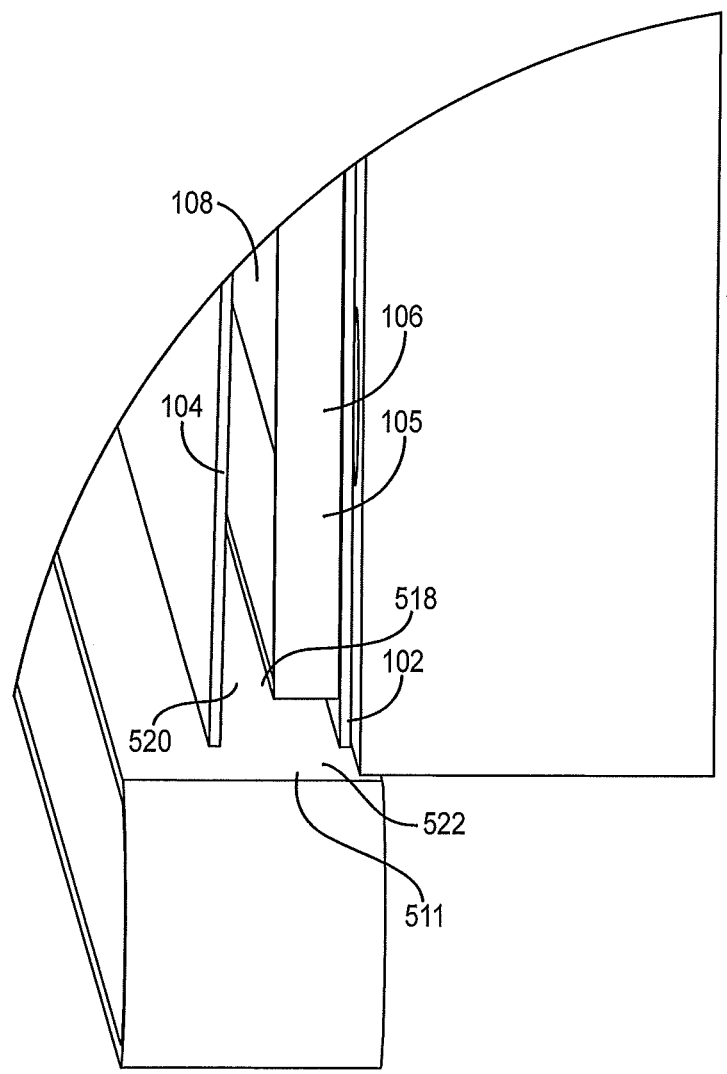
FIG. 5 is a perspective view of a portion of an unsealed insulating glass unit assembly within an enclosure, according to an embodiment.

For example, a partially assembled IGU can be a tented IGU that is unsealed along at least one edge of the spacer frame and sealed along at least one other edge of the spacer frame. The open edge or unsealed edge of a tented IGU can be a side, top or bottom edge and the sealed edge can also be either a side, top or bottom edge. A tented IGU defines an open edge IGU passage into the interpane space along the open edge. An example of a partially assembled IGU which is also a tented IGU is shown in FIG. 5 and described with respect to FIG. 5. The tented IGU of FIG. 5 has an open or unsealed edge along the bottom of the IGU and has a closed or sealed edge at the top of the IGU. In other examples of tented IGUs, one side edge is open while the opposite side edge is sealed.

In another example of an unsealed IGU assembly, an IGU passage to the interpane space is defined through an opening or hole in the spacer frame, where the sheets are both sealed to the spacer frame along a perimeter of the spacer frame. An example of such an IGU assembly is shown in FIGS. 47-56 and described with respect to FIGS. 47-56.

In yet another example of an unsealed IGU assembly, an IGU passage is defined through an opening or hole in the first or second sheet. The opening can be located close to an edge and/or corner of one of the first and second sheets.

In yet another example, the unsealed IGU assembly is a wedge-sealed IGU where a filling block is positioned between the glass sheets outside of a perimeter of the spacer frame. The filling block causes a wedge-passage to be defined between the spacer and one of the sheets. The filling block defines a filling block passage that is in fluid communication with the wedge-passage. One example of such an embodiment is shown in FIGS. 28-29 and described with respect to FIGS. 28-29. In various embodiments, including the embodiment of FIGS. 28-29, the filling block is pressed against the spacer frame during the manufacturing process along an unsealed portion of the spacer frame. Then, a press plate moves one of the sheets of glass into engagement with the filling block and most of the spacer frame. The filling block props open the wedge-passage, while the sheet conforms to the rest of the spacer frame and to the filling block surface.

When a tented IGU is pressed around a filling block positioned next to the spacer frame, the IGU passage changes from an open edge IGU passage to a wedge-passage. The wedge-passage is present in a small portion of the area of the former open edge IGU passage.

In some examples, the face of the filling block that contacts the spacer includes a foam layer or other compressible material to improve the seal formed between the filling block and the spacer. Other portions of the filling block can include a compressible material also.

FIGS. 22-26 illustrate one example of a filling device for forming a wedge-sealed IGU defining a wedge-passage. FIGS. 40-45 illustrate another example of a filling device for forming a wedge-sealed IGU defining a wedge-passage.

In still another embodiment, the unsealed IGU assembly includes a filling block positioned between a glass sheet and the spacer, causing a passage to be defined between the spacer and the glass sheet.

As shown in FIG. 2, when the unsealed IGUs first enter the enclosure 212, both the enclosure 212 and the unsealed IGUs 100 can be filled with ambient air from the atmosphere in which the system 210 is located, such as a manufacturing facility. The enclosure 212 can then be sealed, such as to prevent the unintended flow of gases from outside the enclosure 212 to the inside, or from inside the enclosure 212 to outside.

Figure 58:
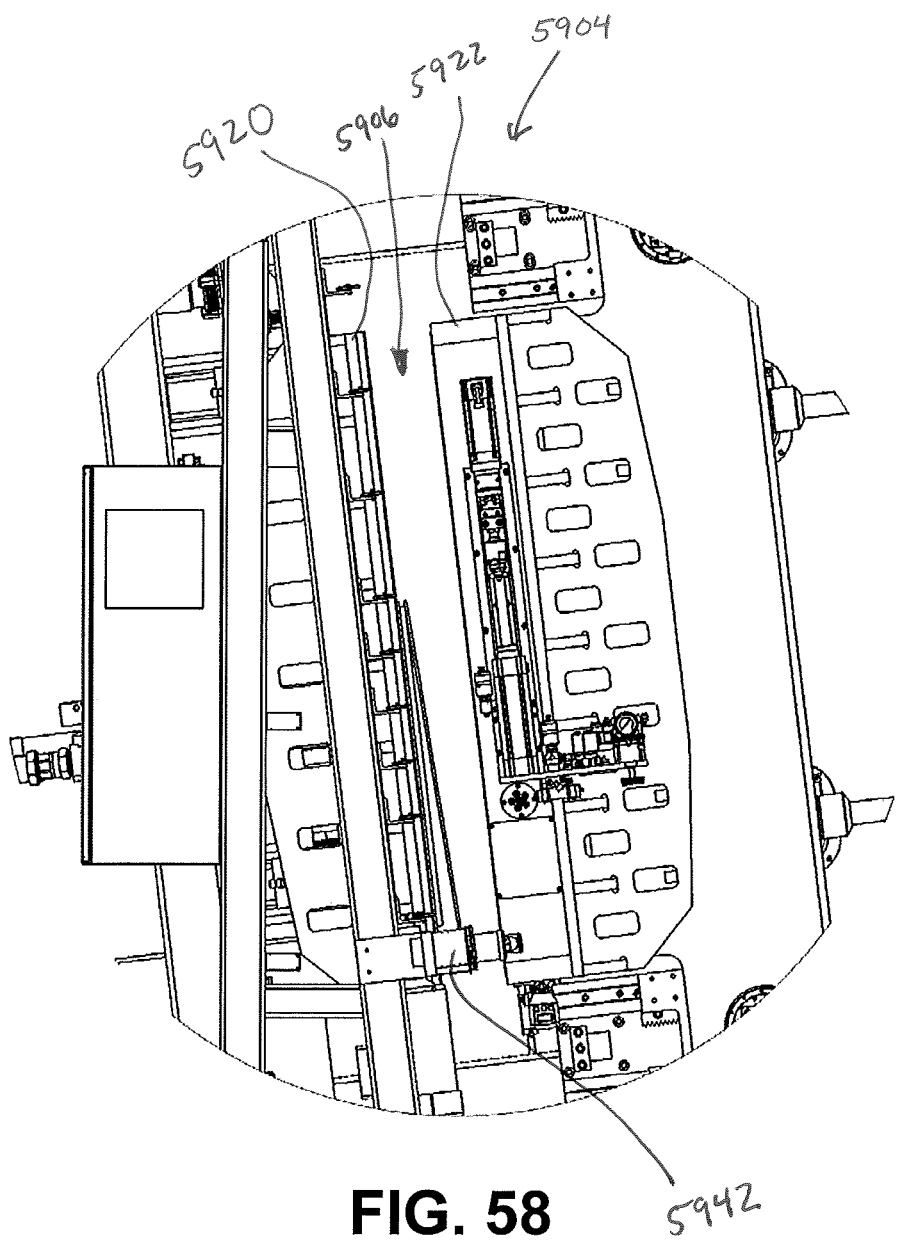
FIG. 58 is a left side view of the IGU gas filling system shown in FIG. 57, according to an embodiment.
Figure 59:
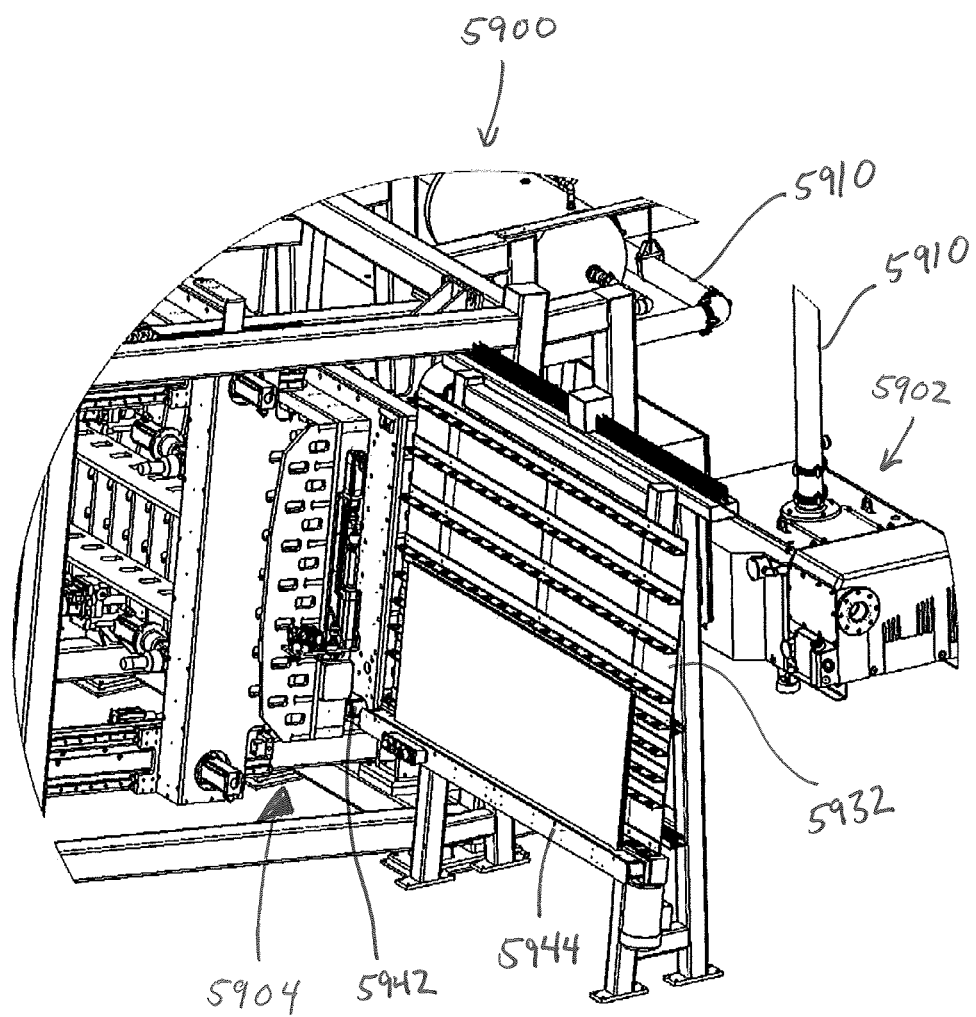
FIG. 59 is a right perspective view of the IGU gas filling system shown in FIG. 57, according to an embodiment.

According to an embodiment, the system 210 can further include a vacuum source configured to evacuate a large part of the existing gas or air from the interior of the enclosure 212. In the implementation shown in FIGS. 2-4, the enclosure includes a vacuum source that includes openings 213. Although not pictured, the vacuum source can also include a vacuum generator (e.g., a vacuum pump) that is in fluid communication with the openings 213. FIG. 59 depicts one example of a vacuum generator 5902 that is part of an IGU gas filling system 5900 depicted in FIGS. 57-59. The system 5900 includes a vacuum enclosure 5904 configured to receive unsealed IGUs, evacuate the IGUs, and then fill the interpane space of the IGUs with a gas. FIG. 59 includes a partial view of ducting 5910 that connects and provides selective fluid communication between the vacuum generator 5902 and vacuum openings (not shown) in the vacuum enclosure 5904.

Returning to FIGS. 2-4, the vacuum source can further evacuate the existing gas from the interpane space 108 of the unsealed IGUs 100, because the unsealed IGUs are within the enclosure. If an IGU assembly within the enclosure is unintentionally sealed rather than unsealed, the process of evacuating the chamber will cause such a sealed IGU to break its seal, such as by the glass sheets shattering, to equalize pressure between the interpane space and the enclosure.

In FIGS. 2-4, the enclosure 212 is shown as having four vacuum openings 213 for pulling a vacuum on the enclosure 212 and interpane space 108 of the IGUs 100 located inside the enclosure. The number of vacuum openings 213 can vary depending on the size and volume of the enclosure needing evacuation.

The vacuum openings 213 shown in FIGS. 2-4 are positioned in a back plate 230 of the enclosure 212, near the top of the enclosure 212. The relative location of the vacuum openings 213 can be selected so that the vacuum openings 213 are located away from IGUs positioned in the enclosure 212. As an example, the vacuum openings 213 may not be located directly adjacent to (e.g., in front of or behind) the flat sheet surfaces of the IGUs. This arrangement can avoid pulling a vacuum directly on the sheets of the IGU.

The vacuum source can be configured to reduce the absolute pressure of the existing gas in the enclosure 212 to about 0.1 pounds per square inch (psi). In various embodiments, the vacuum source can be configured to reduce the absolute pressure in the enclosure 212 to less than 0.1 psi, less than 0.2 psi, or less than 0.5 psi.

In one embodiment, the vacuum source is configured to pull a vacuum to at least about −7 pounds per square inch (PSI). In one embodiment, the vacuum source is configured to pull a vacuum to about −14 pounds per square inch (PSI). In one embodiment, the vacuum source is configured to pull a vacuum to about −14 pounds per square inch (PSI) in about 15 seconds or less.

The system 210 can include a source or supply 214 of a first gas. In an embodiment, the gas source can include a portion of a conveyor belt or other support structure which the unsealed IGU rests upon, such as through holes in a conveyor belt positioned below a bottom gap formed by an unsealed IGU assembly. In an embodiment, the gas supply can include a probe. In an embodiment, the source 214 can include a filling device, such as is shown in FIGS. 2-4. In an embodiment, the source 214 of the first gas is configured to introduce the first gas into the interpane space 108 at a pressure of about 1 to 1000 PSI. In an embodiment, the source 214 of the first gas is configured to introduce the first gas into the interpane space 108 at a pressure of about 1 to 100 PSI, or 10 to 80 PSI in another embodiment.

The supply or source 214 (e.g., including the filling device 214 shown in FIGS. 2-4) of first gas can be configured to introduce the first gas into the interpane space through an IGU passage for fluid communication (shown in FIG. 5). In various embodiments, the source 214 is configured to be positioned adjacent to the IGU passage, such that as gas is released from the source 214, the gas travels through the IGU passage and into the interpane space 108. In an embodiment, the first gas can include a noble gas. In an embodiment, the first gas can include krypton or xenon. In various embodiments, the first gas is a blend of krypton and argon, a blend of krypton and air, a blend of xenon and argon, a blend of krypton and xenon, a blend of xenon and air, or other gas blends.

The system 210 can include a supply or source 216 of a second gas. In some implementations, the source 216 can be an opening in the back plate 230 of the enclosure 212. The supply 216 can include one, two, or more openings in the enclosure back plate 230. The supply 216 of a second gas can be configured to introduce the second gas into the enclosure 212. In various embodiments, the second gas is introduced to the volume within the enclosure 212 at a location that is external to the interpane space 108 and is not adjacent to the IGU passage. As shown in FIGS. 2-4, the openings that form at least part of the source 216 of the second gas are located outside the perimeter of the IGUs. In some cases the openings are not located directly behind or in front of the IGUs to reduce the likelihood that the second gas will blow the IGUs off of the support structure 222 or otherwise disturb the IGUs. In an embodiment, the second gas can include a noble gas. In an embodiment, the second gas can include argon or ambient air. In various embodiments, the second gas is argon, an argon blend with other gasses, or an argon-air blend.

In various embodiments of the system 210, the source 214 can be configured to introduce the first gas into the interpane space 108 at a time overlapping in time with the source 216 introducing the second gas into the enclosure 212. In such an embodiment, the source 214 will be introducing the first gas into the interpane space 108 at the same time the source 216 is introducing the second gas into the enclosure 212. In an embodiment, the source 214 of the first gas is configured to begin introducing the first gas into the interpane space 108 within 2 seconds of the source 216 of the second gas beginning to introduce the second gas into the enclosure 212. In an embodiment, the source 216 begins introducing the second gas into the enclosure prior to the source 214 introducing the first gas into the interpane space 108. In an embodiment, the source 214 begins introducing the first gas into the interpane space 108 prior to the source 216 introducing the second gas into the enclosure 212. In an embodiment, the source 214 of the first gas is configured to introduce the first gas into the interpane space 108 simultaneously with the source 216 of the second gas introducing the second gas into the enclosure 212. In an embodiment, the source 214 of the first gas is configured to begin introducing the first gas into the interpane space 108 simultaneously with the source 216 of the second gas beginning to introduce the second gas into the enclosure 212. In various embodiments of the system 210, the source 214 and source 216 can introduce the desired amount of gases into the enclosure 212 and the interpane space 108 in 30 seconds or less, 15 seconds or less, or 10 seconds or less.

In an embodiment, the source 214 of the first gas is configured to introduce the first gas into the interpane space 108 at a first pressure and the source 216 of the second gas is configured to introduce the second gas into the enclosure 212 at a second pressure which is lower than the first pressure. In an embodiment, the second pressure can be about 14 psi and the first pressure can be 14 psi or slightly greater, such as 15 psi.

According to an embodiment, a filling device can be part of both a gas supply and a vacuum source. In this type of implementation, the filling device is configured introduce a gas into the interpane space of an unsealed IGU. In addition, the filling device can also be configured to evacuate the interpane space via the filling passage. In an embodiment such a filling device can be in selective fluid communication with both a gas supply and a vacuum source or generator. The system 210 can further include a sealing device configured to seal the one or more unsealed IGUs after the first gas has been introduced into the interpane space 108. The sealing device can seal the one or more unsealed IGUs by closing or sealing the one or more IGU passages. According to an embodiment, one type of sealing device is configured to seal the unsealed IGUs by filling the one or more IGU passages with a sealant. According to an embodiment, one type of sealing device is configured to seal the unsealed IGUs by plugging the one or more IGU passages with a rivet. According to an embodiment, one type of sealing device is configured to seal the unsealed IGUs by applying a patch or a piece of tape over the inlet(s) to the one or more IGU passages. According to an embodiment, the source of the first gas is a filling device in the form of a wedge filling block having a wedge passage that provides access to the IGU passage. In this case, the wedge filling block can be removed to seal the IGU passage. Some general steps and aspects of a system of various examples will now be described with reference to FIGS. 2-4. FIG. 2 shows a representation of two unsealed IGUs 100 within the enclosure 212. Initially, the enclosure 212 and the interpane space 108 can be occupied by ambient air, as noted in FIG. 2. The enclosure 212 is then sealed off from the ambient environment. The vacuum source 213 can be configured to remove the ambient air from the enclosure 212 and the interpane space 108, so that both the enclosure 212 interior and the interpane spaces 108 are at a vacuum, as noted in FIG. 3. Once the ambient air is removed from the enclosure 212 and the interpane space 108, the source 214 can introduce the first gas into the interpane space 108 and the source 216 can introduce the second gas into the enclosure 212, as shown in FIG. 4. In some embodiments, some of the second gas can travel into the interpane space 108. As a result, in some embodiments, the interpane space will be occupied by the first gas and a portion of the second gas.

After the interpane space 108 has been filled to the desired amount of gas, the IGU can be sealed, such as by sealing the IGU passage to stop the flow of gases into or out of the interpane space 108. In some embodiments, the interpane space 108 can be filled with 100% of the first gas after the IGU passage is sealed. In some embodiments, the interpane space 108 can be filled with 95% first gas and 5% second gas after the IGU passage is sealed. In some embodiments, the interpane space 108 can be filled with 90% first gas and 10% second gas after the IGU passage is sealed. In some embodiments, the interpane space 108 can be filled with 85% first gas and 15% second gas after the IGU passage is sealed. In some embodiments, the interpane space 108 can be filled with 80% first gas and 20% second gas after the IGU passage is sealed. In some embodiments, the interpane space 108 can be filled with 75% first gas and 25% second gas after the IGU passage is sealed. In some embodiments, the interpane space 108 can be filled with 70% first gas and 30% second gas after the IGU passage is sealed. In some embodiments, the interpane space 108 can be filled with 60% first gas and 40% second gas after the IGU passage is sealed. In some embodiments, the interpane space 108 can be filled with 50% first gas and 50% second gas after the IGU passage is sealed. Options for the filling percentage of the first gas in the interpane space include at least about 40%, at least about 50%, at least about 60%, at least about 70%, at least about 80%, at least about 90%, and at least about 95%.

FIG. 5 shows a perspective cut-away view of a portion of an unsealed IGU assembly 100 within an enclosure 212, according to an embodiment. FIG. 5 shows a bottom portion of the second sheet 104 positioned away from the spacer 106 to define an IGU passage 518.

In an embodiment, the unsealed IGU assembly includes the spacer frame 105 sealed to the first sheet 102. The IGU passage 518 can include a bottom gap 520 between the spacer 106 and the lower edge of the second sheet 104. The lower edge of the second sheet 104 can be spaced or located a distance away from the spacer 106 to define the bottom gap 520. In an embodiment, the bottom gap 520 extends along the entire length of the IGU 100. In an embodiment, the bottom gap 520 has a width from the edge of the spacer frame 105 to the second sheet 104 of at least 0.05 inches and not more than 1.0 inch. According to some embodiments, the IGU passage 518 can be configured to allow the first gas to be introduced into the interpane space 108.

The system 210 can further include a support structure 522 that can be configured to support, hold or otherwise secure the unsealed IGU in the enclosure 212, such as while the gases are introduced. In an embodiment, the support structure 522 can include a conveyor belt 511, shown in FIG. 5. The support structure 522 can also be configured to transport the one or more IGUs within the enclosure 212 and/or into or out of the enclosure 212. The support structure 522 is positioned entirely within the enclosure 212 in one embodiment.

The system 210 can further include a sealing device within the enclosure 212. The sealing device can be configured to seal or close the IGU passage after the interpane space 108 has been filled with the gas, such as to trap the gas within the interpane space 108. In an embodiment, the sealing device comprises a press. The press can be configured to press the second sheet on to the spacer 106, such as to close or seal the IGU passage 518.

Figure 6:
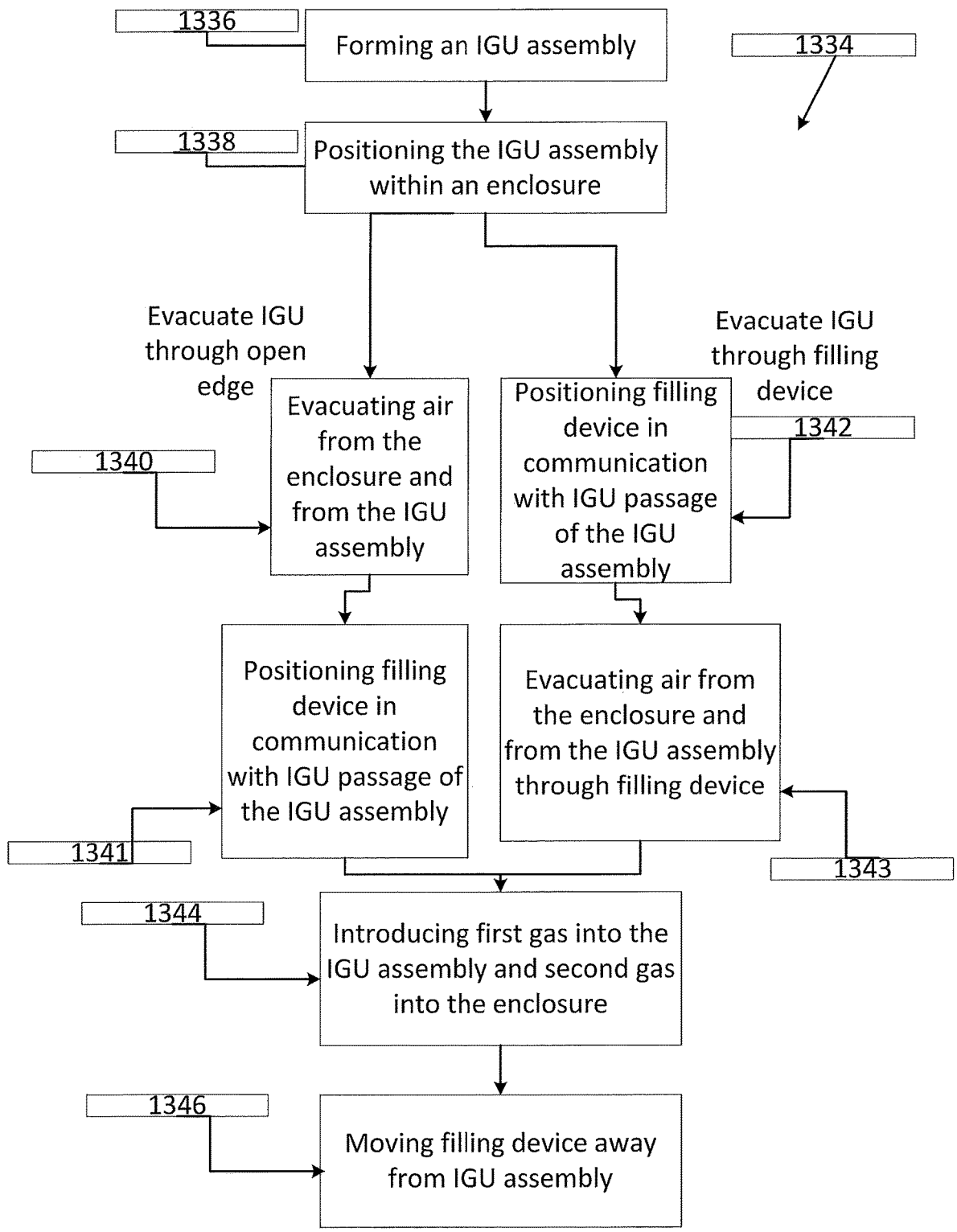
FIG. 6 is a flow chart depicting a method of filling an insulating glass unit with a gas, according to an embodiment.

FIG. 6 shows a flow chart depicting a method 1334 of replacing air with an interpane gas during the manufacture of a sealed IGU, according to an embodiment.

The method 1334 can include the step 1336 of forming an unsealed IGU assembly. Forming an unsealed IGU assembly can include securing or sealing a spacer frame to a first sheet of glass material. Forming the unsealed IGU assembly can further include partially securing the spacer frame to a second sheet of glass material. The unsealed IGU assembly can define an IGU passage between the interpane space and an ambient environment. In an embodiment, the IGU passage can be defined by positioning an edge of the second sheet a distance away from the spacer to provide a gap. In one embodiment, a lower edge of the second sheet is positioned a distance away from the spacer to provide a bottom gap. In another embodiment, an upper edge of the second sheet is positioned a distance away from the spacer to provide a top gap. In one embodiment, a side edge of the second sheet is positioned a distance away from the spacer to provide a side gap. In another embodiment, a lower edge of the second sheet is positioned a distance away from the spacer to provide a bottom gap and a resulting side gap along the side edge between the bottom and the top edges can define all or part of an IGU passage between the interpane space and an ambient environment.

In an embodiment, forming an unsealed IGU assembly includes sealing the spacer frame to the first sheet and second sheet, and creating an opening in the spacer frame to permit fluid communication with the interpane space, such that the IGU passage is defined within the spacer frame. In an embodiment, forming an unsealed IGU assembly includes sealing the spacer frame to the first sheet and second sheet, and creating an opening in the first or second sheet to permit fluid communication with the interpane space, such that the IGU passage is defined by the first sheet or the second sheet.

The method 1334 can include the step 1338 of positioning the unsealed IGU assembly within an enclosure. This step can be accomplished by moving unsealed IGU assemblies into the open enclosure space using a conveyor belt or other manufacturing equipment. For example, an unsealed IGU assembly can be formed in an assembly area and then placed on a conveyor leading to an enclosure. In an embodiment, the unsealed IGU assembly is formed on an assembly stage conveyor that precedes an enclosure. The conveyor can then automatically move the unsealed IGU assembly into the enclosure in a translating or linear fashion.

In an embodiment, the enclosure can be formed around the unsealed IGU assembly or assemblies. The enclosure can be sealed around the unsealed IGU assembly, such as to prevent air or other gasses from unintentionally entering or exiting the enclosure. An example of one vacuum enclosure is illustrated as part of the IGU gas filling system 5900 in FIGS. 57-59. According to this embodiment, the enclosure 5904 has a clamshell structure with a first portion 5920 and a second portion 5922. The enclosure 5904 includes an enclosure sealing structure, such as an O-ring in a channel, at or near an outer perimeter of the enclosure's interior. In this example, one or more unsealed IGU assemblies can be conveyed in a linear fashion from an initial assembly stage 5930 into an interior 5906 of the enclosure defined by the first and second portions. In an embodiment, the first portion 5920 is fixed and supports the IGU assemblies. The second enclosure portion 5922 then moves toward and seals with the first portion to create a sealed vacuum chamber or enclosure around the unsealed IGU assemblies.

Returning to FIG. 6, once the unsealed IGU assembly is positioned within the enclosure, the method 1334 can include the step of evacuating the air from the enclosure and from the unsealed IGU assembly. The order of steps depends on whether the unsealed IGU assembly will be evacuated through an open edge IGU passage. If yes, then evacuating the enclosure at step 1340 will also remove the air from within the interpane space of the unsealed IGU assembly. Evacuating the air from the enclosure can include removing the majority of the air from the enclosure, such that it can be replaced with a gas. In an embodiment where the unsealed IGU assembly defines an open edge IGU passage, evacuating the air from the enclosure also evacuates a majority of the air from within the interpane space of the unsealed IGU assembly in the enclosure. After evacuation in step 1340, a filling device is positioned in communication with the IGU passage of the IGU assembly. This may happen by positioning a filling block in the open edge IGU passage, and closing the filling block defining a filling passage so that the IGU assembly defines a wedge passage. Alternatively, this may happen by pressing the tented IGU to close the open edge IGU passage and positioning a filling block defining a filling passage next to a hole in the spacer or a hole in the sheet.

An alternative to step 1340 of evacuating the unsealed IGU through an open edge is step 1342, which is evacuating the IGU through a filling device. In this scenario, the filling block is in communication with a wedge-passage, a hole in the spacer or a hole in a sheet during evacuation. To form a wedge-passage, the filling block is positioned within an open edge IGU passage and a sheet is pressed against the IGU assembly and filling block. Step 1342 follows positioning the IGU assembly in the enclosure and precedes evacuating. Step 1342 is positioning a filling device in communication with the IGU passage at step 1342. Then, air is evacuated substantially simultaneously from the enclosure and from the IGU assembly through the filling device at step 1343.

The method 1334 can further include the step 1344 of introducing a first gas into the interpane space through the IGU passage and introducing a second gas into the enclosure. The second gas can have a different composition than the first gas. In some embodiments, the second gas is less expensive to obtain than the first gas. In some embodiments, the first gas provides more insulation than the second gas. In some embodiments, the first gas provides a lower U-value to the finished IGU than the second gas, such that the first gas is better at reducing heat transfer than the second gas.

In some embodiments, introducing the first gas can include positioning the IGU passage over the source of the first gas. In an embodiment, a support structure can support the unsealed IGU assembly in the enclosure and the support structure can define a fluid communication passage between the source of the first gas and the IGU passage. In some embodiments, the step of introducing the first gas into the interpane space includes positioning a probe within the IGU passage and delivering the first interpane gas through the probe. In another embodiment, introducing the first gas can include introducing the first gas through an IGU passage in a side of the unsealed IGU assembly. The IGU passage may be located at any point along an edge of the IGU assembly, along an entire one or more edges of the IGU assembly, within a spacer frame, and/or in the first or second sheets of the IGU assembly. The first gas may also be introduced into the IGU passage with a first gas source that includes a filling device such as a filling block or wedge block.

In some embodiments, beginning to introduce the first gas can occur simultaneously with beginning to introduce the second gas. In an embodiment, the step of introducing the first gas into the interpane space overlaps in time with the step of introducing a second gas into the enclosure. In an embodiment the beginning of the step of introducing the first gas into the interpane space occurs within 2 seconds of a beginning of the step of introducing a second gas into the enclosure. In an embodiment, the introduction of the first gas occurs at a first pressure and the introduction of the second gas occurs at a second pressure which is lower than the first pressure. In an embodiment, the second pressure can be about 14 psi and the first pressure can be 14 psi or slightly greater, such as 15 psi.

The filling device is moved away from the IGU assembly after the first gas is provided at step 1346. In some embodiments, the method 1334 can further include closing the IGU passage to seal the interpane space, such as to trap the gas within the interpane space. Where the IGU passage is a gap between the second sheet and the spacer, a press plate can push the second sheet against a sealant-laden side of the spacer to seal the interpane space in one embodiment. Where the IGU passage is an opening in the spacer frame or a sheet, a plug or other sealing material can be placed over or into the opening to seal the interpane space. According to an embodiment, one or more IGU passages can be filled with a sealant. According to another embodiment, a rivet can be pressed into the IGU passage to seal the interpane space. In other cases, a patch or a piece of tape can be placed over the IGU passage inlet. According to another embodiment, a filling device such as a filling wedge can be removed from between the first and second sheets and the second sheet can be pressed against the spacer frame to seal the IGU passage.

A further step is to open the enclosure in order to access the IGUs within the enclosure. The step of closing the IGU passage of the IGUs can take place inside the enclosure, before the enclosure is unsealed or opened to the environment, in various embodiments. In some embodiments, the step of closing the IGU passage of the IGUs can take place outside the enclosure, such as at a sealing station. In some cases the IGU passage may be closed after the IGU is conveyed out from the enclosure to a post-assembly stage area, such as a post-assembly conveyor.

Figure 7:
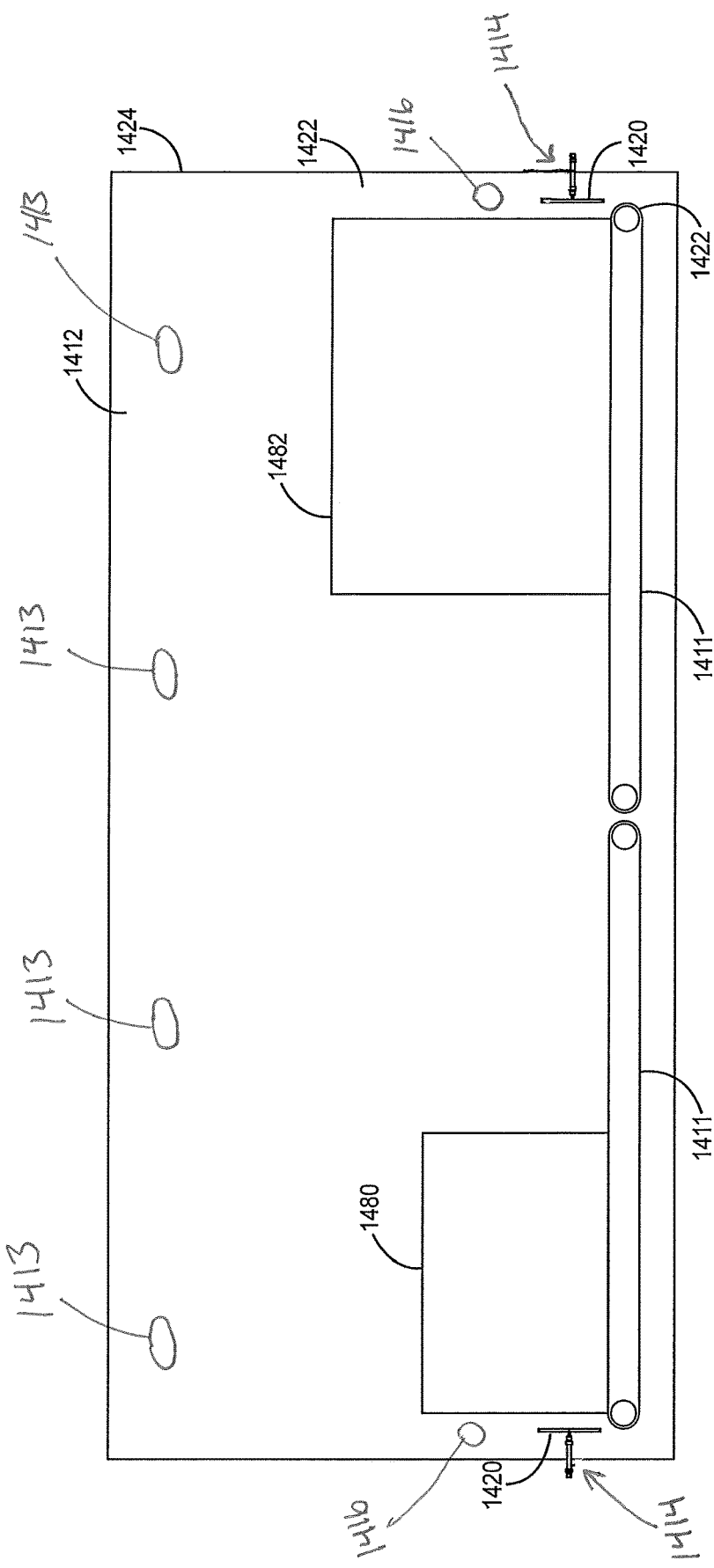
FIG. 7 is a front view of a step of an example manufacturing process, where two partially assembled IGUs are positioned within an enclosure and filling devices are positioned near the unsealed IGUs.

FIG. 7 shows a front view of a step of an example manufacturing process, where two partially assembled IGUs 1480, 1482 are positioned within an enclosure 1412 and filling blocks 1420 are positioned near the unsealed IGUs 1480, 1482.

In some embodiments, the manufacturing process or method can include loading one or more partially assembled IGUs 1480, 1482 into an open evacuation enclosure 1412, which can also be referred to as an open evacuation chamber, an evacuating chamber 1412, or for simplicity, a chamber 1412. In various embodiments, the loading of partially assembled IGUs can include loading multiple partially assembled IGUs into the chamber 1412. In some embodiments, the multiple IGUs can include IGUs of various size (as shown in FIG. 7). In some embodiments, the multiple IGUs can include IGUs of the same size. The partially assembled IGUs 1480, 1482 can include a first and second sheet of a glass material and a spacer structure formed into a frame between the first and second sheets.

In various embodiments, the chamber 1412 can include a support structure 1422. The support structure 1422 can support the IGUs 1480, 1482 while the IGUs 1480, 1482 are located within the chamber 1412, such as to support the IGUs 1480, 1482 in the desired position and/or configuration. In some embodiments, the support structure 1422 can include a conveyor belt 1411.

Figure 57:
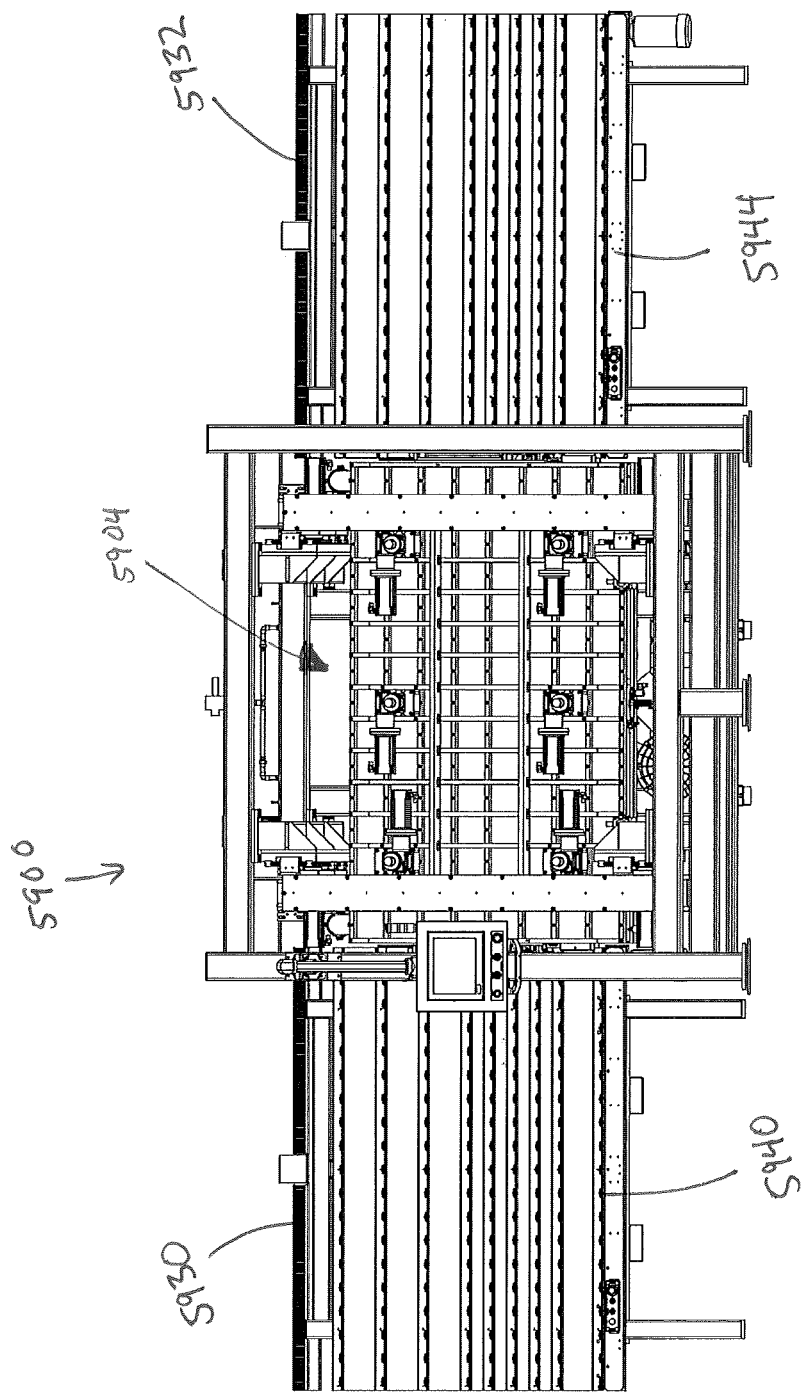
FIG. 57 is a front view of an IGU gas filling system, according to an embodiment.

The loading of multiple partially assembled IGUs can include conveying the multiple partially assembled IGUs into the chamber 1412 in a linear manner. In an embodiment, the multiple partially assembled IGUs are conveyed into the chamber 1412 using a conveyor belt 1411. As shown in FIGS. 57-59, in some embodiments multiple partially assembled IGUs can be transported into a vacuum chamber 5904 from a staging position on a pre-chamber support structure 5930. In an embodiment, a pre-chamber or pre-enclosure conveyor 5940 automatically moves partially assembled IGUs from the exterior of the chamber 5904 onto a support structure 5942 within an interior 5906 of the vacuum enclosure. According to some implementations, the support structure 5942 can be one or more conveyors, such as the conveyors 1411 located within the enclosure 1412, as shown in FIG. 7. The conveyors 1411 can then move the partially assembled IGUs to a final position within the chamber 1412. In some embodiments, various conveyors are used to automatically move the partially assembled IGUs into the chamber. In an embodiment, a pre-chamber conveyor moves the IGUs in a linear or translating movement into the chamber. In an embodiment, a post-chamber conveyor moves the IGUs in a linear or translating movement away from the chamber. For example, FIGS. 57 and 59 illustrate a support structure in the form of a conveyor 5944 that is part of a post-vacuum chamber support structure and staging area 5932.

The partially assembled IGUs 1480, 1482 can define an open passage between a portion of the spacer frame and one of the sheets. The partially assembled IGUs 1480, 1482 can have a tent-like configuration, such that the sheet is angled away from or separated from the spacer along an edge, such as to provide a wider base that defines the open passage. FIG. 5 shows a tent-like configuration of an IGU.

The manufacturing process or method can include moving (e.g., positioning, transporting, and/or translating) the partially assembled IGU to a calculated position. The calculated position can ensure the open passage mates with a position of a filling device 1414 that is part of a supply or source of an interpane gas. The filling device 1414 can be external, such that the filling device 1414 can be located at least partially outside of the chamber 1412. In some embodiments, the external filling device 1414 can be located within the chamber 1412 and be in fluid communication with a source external to the chamber 1412. In some embodiments the filling device 1414 can include a filling probe or a filling block. The filling device 1414 can also include one or more actuators (e.g., linear actuators) to move the filling device into position, and to retract the filling device at the appropriate time. For example, a linear actuator may remove a filling block from between the glass sheets at the appropriate time.

The manufacturing process or method can include closing the chamber 1412 and evacuating the chamber to substantially remove all of the atmosphere from the chamber 1412 and the partially assembled IGU 1480, 1482. The chamber 1412 can be evacuated through a vacuum source 1413, such as through one or more openings in the back plate of the enclosure, such as discussed above.

The manufacturing process or method can include positioning a filling device 1414, which includes a filling block 1420, in the open passage between the first sheet and the second sheet of the partially assembled IGU at a location outside of an external perimeter of the spacer frame.

The manufacturing process or method can include closing the partially assembled IGU to close the open passage to create a wedge-sealed IGU with the filling block 1420 wedged between the first sheet and the second sheet. A wedge-sealed IGU can be a completely sealed IGU except with a wedge passage between one of the sheets and the spacer. The wedge passage can be a result of the filling block 1420 preventing the sheet from being sealed to the spacer, such as shown in FIGS. 28 and 29.

Turning to FIGS. 28 and 29, a filling block 1420 can define a filling block passage 2304. The filling block passage 2304 can allow the interior of the IGU to be in fluid communication with a source of gas connected to the filling block. The filling block passage can be aligned with the wedge passage 2302 to enable filling the wedge sealed IGU from the filling device, such as the filling probe. According to an embodiment, the filling device 1414 includes the filling block 1420. In an embodiment the filling device 1414 includes the filling block 1420 and a filling probe that provides the gas to the filling block. In an embodiment, a gas source or supply is considered to include the filling device, which in this case includes a filling block. In an embodiment the gas supply also includes a gas storage and/or delivery system that contains and delivers the gas to, e.g., a filling device such as a filling block.

The manufacturing process or method can include filling the wedge sealed IGU with a first gas from a source of first gas including the filling device 1414 (as discussed above) while simultaneously filling the chamber 1412 with a second gas from a source or supply 1416 for the second gas (as discussed above), such as air or argon to a near atmospheric pressure. The manufacturing process or method can further include retracting or removing the filling device 1414, such as the filling block 1420, from between the two sheets and then pressing the IGU, such as to create or form a hermetically sealed fully assembled IGU. The manufacturing process or method can finally include opening the chamber 1412 and unloading or removing the fully assembled IGU. As described above, unloading or removing the fully assembled IGU can include translating or linearly transporting the IGU away from the chamber 1412 with a post-chamber conveyor.

In some embodiments that include multiple partially assembled IGUs within the chamber 1412, different first gases can be introduced to the interpane space of different IGUs 1480, 1482. The multiple different filling devices 1414 can each deliver a different first gas to a different IGU 1480, 1482. For example, the first partially assembled IGU 1480 could be filled with Argon via a first filling device 1414 and the second partially assembled IGU 1482 could be filled with Krypton via a second filling device 1414.

The method can include delivering a calculated amount of first gas to the interpane space of an IGU. In some embodiments, prior to introducing the first gas into the interpane space, the amount of gas that will be delivered can be calculated, such as to prevent overfilling or waste. In some embodiments, the amount of gas delivered to the interpane space is determined by the volume of the interpane space. In some embodiments, the amount of gas delivered is equivalent to the volume of the interpane space. In some embodiments, the amount of gas delivered is equivalent to the volume of the interpane space and an additional volume of gas as a safety factor to ensure complete filling of the interpane space. In various embodiments, only the calculated or predetermined volume of gas is discharged from the filling probe.

In an embodiment, a method of assembling and filling an IGU includes assessing the pressure in the interpane space after introducing some of the first gas, such as a predetermined volume of gas, to the interpane space at a near-final-fill time. The method can also include determining whether to add more of the first gas or release some of the first gas from the interpane space. In an embodiment, the interpane space can be filled with a predetermined volume of a gas and/or brought up to a predetermined pressure. In some cases the pressure is tracked closely in order to bring the gas pressure up to atmosphere. Upon reaching the predetermined pressure, the IGU passage is sealed.

In some cases, a method includes determining whether a fill pressure is desirable based on the size of the sealed IGU. For example, it may be determined that a fill pressure above, equal to, or below atmosphere is desirable based on the size of the sealed IGU.

In some examples, a method includes filling at a fill pressure of the IGU that is within about 1 PSI or within about 2 PSI of the fill pressure of the interior of the vacuum enclosure. In some examples, a method includes filling at a fill pressure of the IGU that is greater than the fill pressure of the interior of the vacuum enclosure. In some examples, the pressure of the IGU is about 1 PSI greater or about 2 PSI greater than the pressure in the interior of the vacuum enclosure throughout the filling step. If the pressure in the IGU is lower than the pressure in the interior of the vacuum chamber, the second gas from the vacuum enclosure interior is more likely to come into the IGU's interpane space during the filling process.

Turning now to FIGS. 8-21, various views related to a system and method for assembling and filling an unsealed IGU are illustrated. The system and method can be useful for manufacturing sealed IGUs that are filled with an interpane gas.

Figure 20:
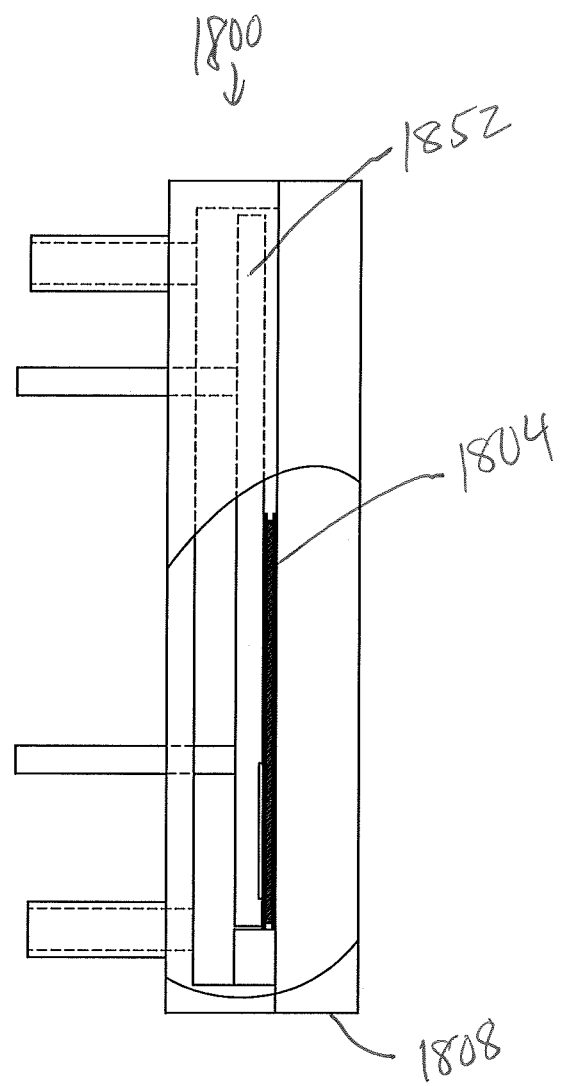
FIG. 20 is a side view of the enclosure of FIGS. 8-13 depicting an unsealed IGU assembly supported within the enclosure, according to an embodiment.
Figure 21:
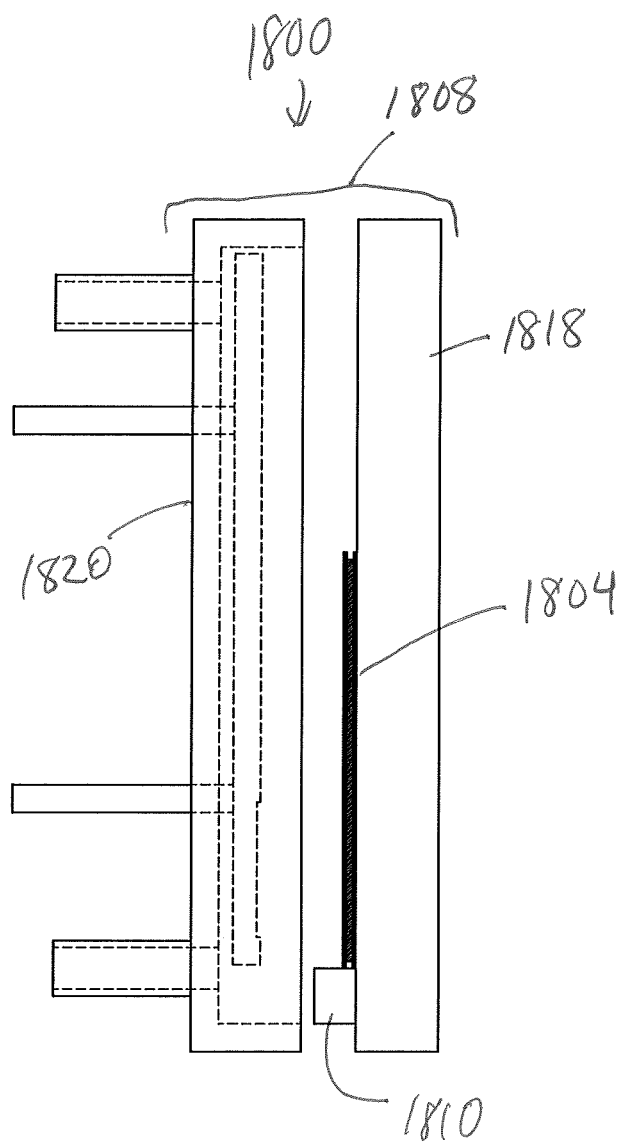
FIG. 21 is a side view of the enclosure of FIGS. 8-13 and 20 with the enclosure open and an IGU ready to exit the enclosure, according to an embodiment.

FIGS. 8-13 are views showing steps in assembling an unsealed IGU assembly within a vacuum enclosure, according to an embodiment. FIGS. 20-21 are views showing the formation of a sealed IGU from the unsealed IGU assembly. As shown in FIGS. 8-13 and 20-21, in this example a system 1800 for manufacturing a sealed insulating glass unit (IGU) 1804 can include a vacuum enclosure 1808 and a support structure 1810 for supporting an IGU as it is assembled and filled with an interpane gas inside the vacuum enclosure.

Figure 9:
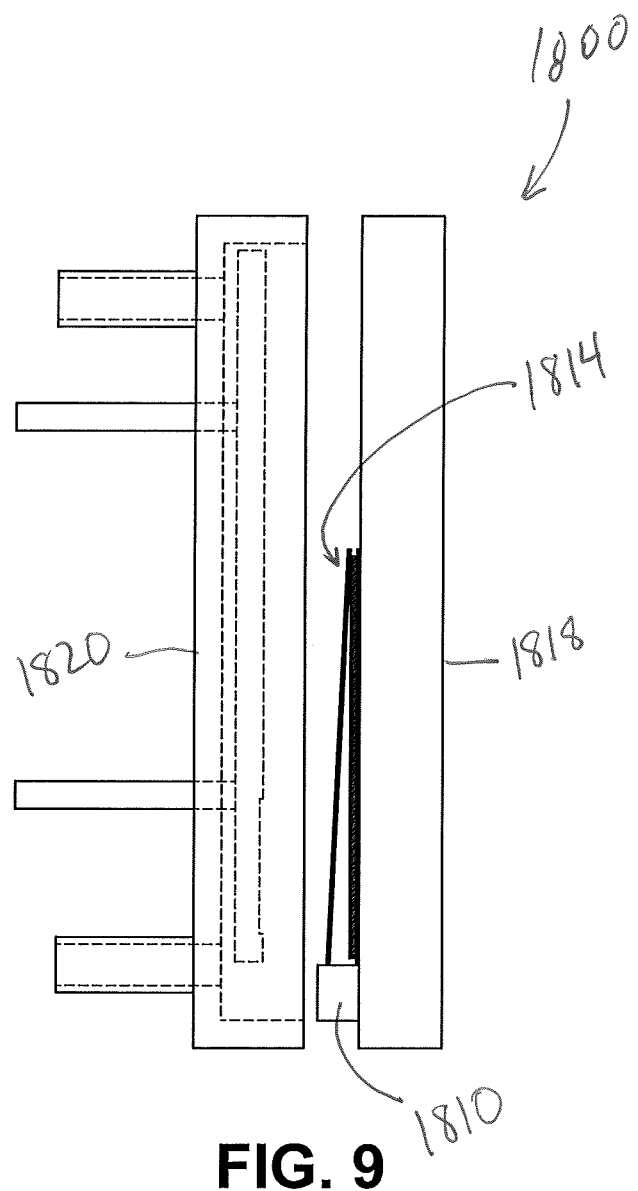

In an embodiment, the vacuum enclosure 1808 is configured for receiving an unsealed IGU assembly 1814 as shown in FIG. 9. In this example the vacuum enclosure includes a first portion 1818 and a second portion 1820 that are configured to seal together around the unsealed IGU assembly 1814. In an embodiment, the first portion 1818 is a fixed portion and the second portion 1820 is a movable portion. The support structure 1810 can be attached to the first portion 1818 and is configured to support the unsealed IGU assembly 1814.

As an example, the vacuum enclosure illustrated in FIGS. 57-59 has a clamshell structure with a first portion and a second portion. In this example, one or more unsealed IGU assemblies can be conveyed in a linear fashion from an initial assembly stage into an interior of the enclosure defined by the first and second portions. In an embodiment, one enclosure portion is fixed and supports the IGU assemblies with a support structure. The other enclosure portion then moves toward and seals with the first portion to create a sealed vacuum chamber or enclosure around the unsealed IGU assemblies.

Returning to FIG. 9, in this example the enclosure 1808 receives the unsealed IGU assembly 1814 as a partially assembled IGU that has a tent configuration. For example, as shown in FIGS. 9-11, the partially assembled IGU has a first sheet 1830 that is sealed to a spacer frame 1832, and a second sheet 1834 that leans against the first sheet and spacer frame. The bottom edge of the second sheet is spaced apart from the bottom of the spacer frame and first sheet by a distance that creates a gap or opening 1836 along the bottom edges and, to a decreasing extent, along the side edges, between the second sheet and the spacer frame/first sheet. According to some embodiments, the gap or opening 1836 is an IGU passage located between the second sheet 1834 and the spacer frame 1832.

According to an embodiment, the gap or opening 1836 in the partially assembled IGU 1814 allows the partially assembled IGU to be evacuated along with the vacuum enclosure. For example, a vacuum can be pulled on the closed and sealed enclosure shown in FIGS. 10-11 while the unsealed IGU assembly remains supported on the support structure 1810. Pulling a vacuum on the enclosure can also cause exhausting of gas through the gap or passage between the spacer frame 1832 and the second sheet 1834.

Figure 16:
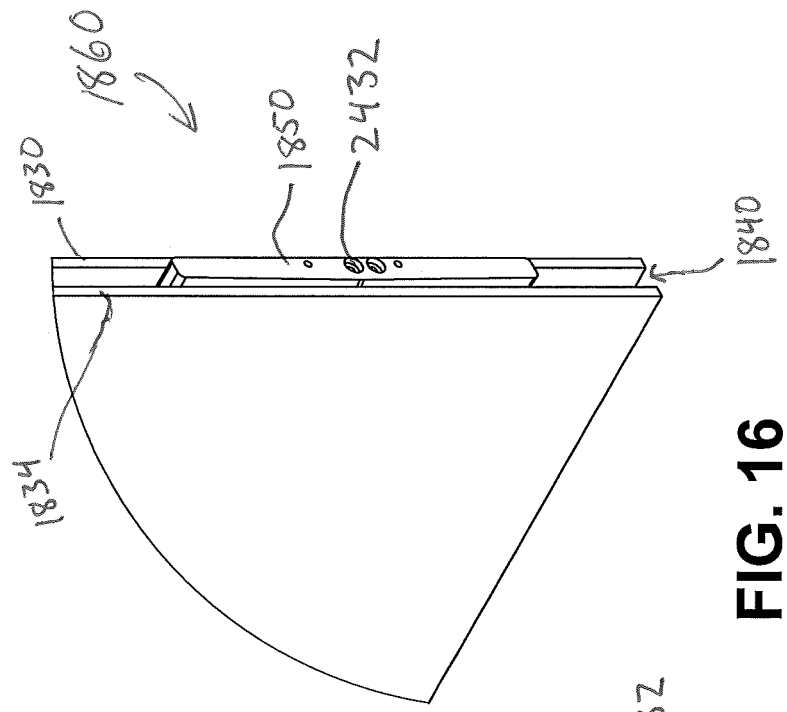
FIGS. 14-16 are partial top, side, and perspective views of a filling device positioned between sheets of a wedge-sealed IGU, according to an embodiment.
Figure 15:
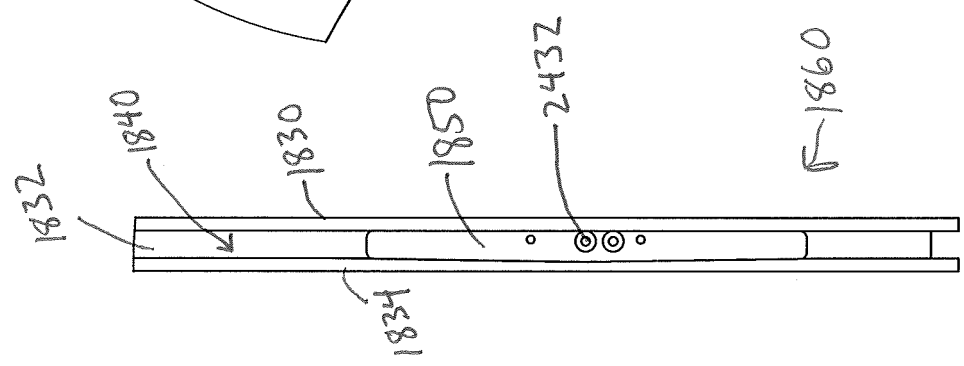
Figure 14:
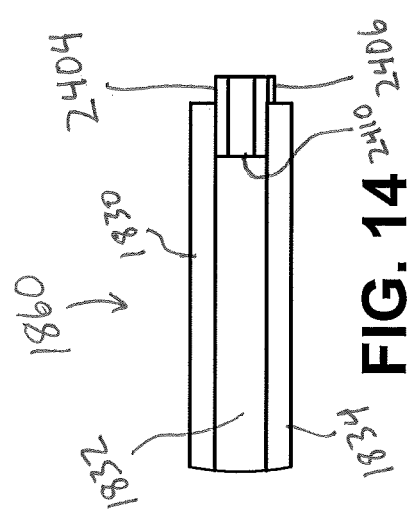

FIGS. 12 and 13 depict a filling device 1850 positioned between the first and second sheets 1830, 1834. FIGS. 14-16 are partial top, side, and perspective views, respectively, of the filling device 1850 positioned between the first and second sheets 1830, 1834. In this embodiment, the filling device 1850 is located within a channel 1840 defined by the first and second sheets and the spacer frame. As shown in the top view of FIG. 14, in this embodiment, the filling device 1850 is located outside of the external perimeter of the spacer frame 1832.

The first and the second sheets 1830, 1834 are pressed together around the filling device 1850. According to some embodiments, the system 1800 includes a press plate 1852, shown in FIGS. 12-13. The press plate 1852 can press the partially assembled IGU shown in FIGS. 9-11 against the first portion 1818 of the enclosure 1818 and/or the support structure 1810 to seal the first sheet with the second sheet and the spacer frame. In an embodiment, the press plate is configured to press the second sheet 1834 against the spacer frame 1832.

According to an embodiment, the filling device 1850 (e.g., filling block) has a planar side 2404 that is adjacent the first sheet 1830 and a curved side 2406 that is adjacent to the second sheet 1834. In an embodiment, the filling device thus has a changing width with respect to the curved side 2406. In an embodiment, the greatest width is near the center of the filling device 1850, though other locations are also contemplated.

At least some portions of the filling device can have a width that is slightly greater than the width of the spacer frame 1832. As an example, the center portion of the filling device 1850 has a width that is greater than the width of the spacer frame 1832. This difference in width causes the center portion of the curved side 2406 to extend slightly past the edge of the spacer frame 1382.

According to an embodiment, the second sheet 1835 is sealed against both the spacer frame 1832 and at least a portion of the curved side 2406 of the wedge block filling device 1850. The curved nature of the side 2406 of the filling device facing the second sheet can in some cases help alleviate any stresses in the sheet due to the greater width of the filling device. In some cases this configuration can be referred to as a wedge-sealed IGU 1860.

In one example, the wedge-sealed IGU is sufficiently sealed to maintain a pressure differential between the interpane space and the vacuum enclosure interior of at least about 1 PSI or at least about 2 PSI.

Once the second sheet is pressed and sealed against the spacer frame and wedge block filling device, the extension of the filling device 1850 past the width of the spacer frame 1832 can create a wedge-passage (not shown in FIGS. 12-16) between the spacer frame 1832 and the second sheet 1834. FIGS. 28-29 illustrate one example of a filling device in the form of a filling block 1420 that creates a wedge-passage 2302 between the spacer frame 2206 and a sheet second sheet 1404. The glass of the second sheet flexes away from the spacer frame and away from the location of the outlet on the curved side of the filling block to accommodate the wider center portion of the filling device, establishing a wedge-passage between the second sheet and spacer frame. The glass of the second sheet flexes and conforms to the filling block. The filling block is somewhat conformable, and the pressure of the glass will shape the curved surface and outlet of the filling block so that the gas is output at a highest point of the curved glass.

The curved portion of the filling block is described herein as contacting the second sheet, which is the sheet closer to the press plate. However, the curved portion could contact either sheet. If the curved portion contacts the back, inner, first sheet, then the fixed portion of the vacuum enclosure has a cut out area in some examples to accommodate the curved portion of the glass, similar to how the press plate is described as having a cut out area.

According to an embodiment, the wedge-passage is in fluid communication with a passage 2432 extending through the filling device 1850. Accordingly, the IGU 1860 may also be referred to as an unsealed IGU assembly because the filling passage and wedge-passage provide fluid communication between the interpane space and an exterior of the IGU. The filling device passage 2432 can thus be used in combination with the wedge-passage for filling the interpane space of the wedge-sealed IGU with an interpane gas. In an embodiment, the filling block passage and wedge passage can alternatively be used to evacuate air from the interpane space of a wedge-sealed IGU. For example, in some cases the filling device is moved into fluid communication with the interpane space and the partially assembled IGU is sealed around the filling device before pulling vacuum within the enclosure. A first vacuum can then be pulled on the enclosure and a second vacuum can be pulled separately and substantially simultaneously on the interpane space of the wedge-sealed IGU through the wedge-passage and filling device passage.

Figure 17:
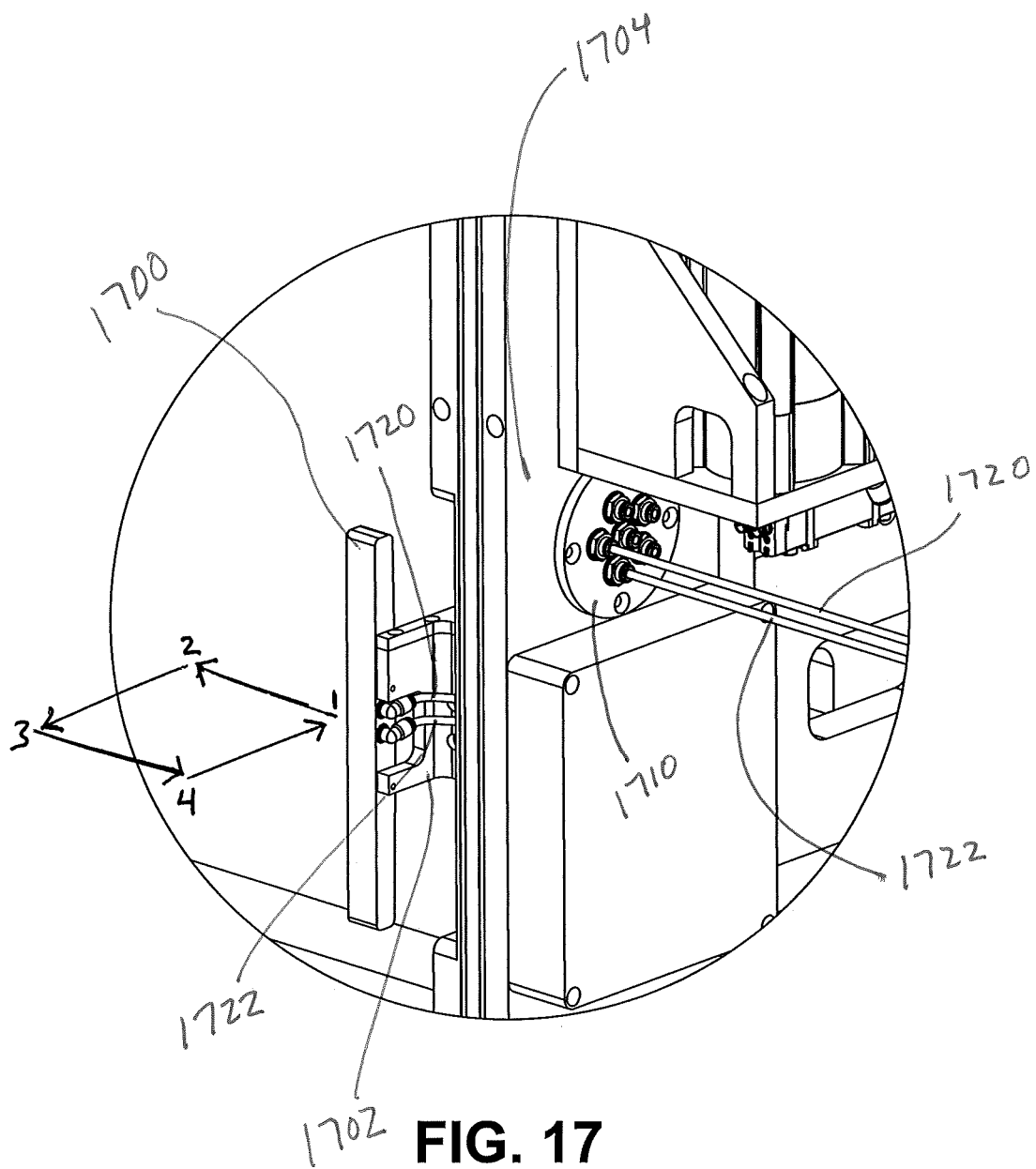
FIG. 17 is a perspective view of a filling block for use in assembling an unsealed insulating glass unit assembly within an enclosure, according to an embodiment.

FIG. 17 is a perspective view of a portion of a vacuum enclosure, including a filling device 1700 and an actuator 1702 depicted in part according to an embodiment. The filling device 1700 can in some cases be the same filling device 1850 depicted in FIGS. 12-16 and discussed elsewhere herein. The filling device 1700 is mounted to the actuator 1702, which in turn is mounted to a side wall 1704 of the vacuum enclosure.

The actuator 1702 can include any suitable system of mechanical actuating components. In some cases, the actuator 1702 is a two-stage linear actuator that includes motors for moving the actuator and attached filling device in two perpendicular directions. According to an embodiment, the actuator includes one, two, or more pneumatic actuators that drive the movement of the filling device 1700. In an embodiment, the actuator 1702 can include one or more compact air cylinders, such as the Square Pancake II Cylinder sold by Fabco-Air, Inc., Gainesville, Fla.

According to an embodiment, the side wall 1704 is part of a movable portion of a vacuum enclosure like those discussed with respect to other figures herein. In some embodiments, the actuator and filling device may instead be mounted to a side wall of a fixed portion of a vacuum enclosure. In another embodiment, multiple filling devices and corresponding actuators can be mounted at various locations, including to one or both of the movable and fixed portions of a vacuum enclosure.

As shown in FIG. 17, a manifold 1710 in the side wall 1704 of the enclosure receives at least two hoses that are routed through the side wall to the filling device 1700. According to an embodiment, a first hose 1720 provides a supply of a gas for filling an unsealed IGU assembly. The hose 1720 is coupled to the filling device 1700 within the enclosure. As discussed elsewhere, the filling device 1700 can include a filling device passage configured to introduce the gas from the first hose 1720 into an IGU passage of an unsealed IGU assembly. Another end of the hose 1720 not shown in FIG. 17 can be connected to a stored interpane gas. In some cases, the gas store, the first hose 1720, the actuator 1702, and the filling device 1700 are referred to as a gas supply or gas source for the IGU.

FIG. 17 also depicts a second hose 1722 that is routed through the enclosure wall and coupled to another passage of the filling device 1700 at a first end. According to an embodiment, the second end of the hose 1722 can be connected to an air pressure transducer, located outside of the enclosure, for measuring the pressure of the interpane gas being introduced through the device's other passage. In another embodiment, the pressure transducer may be located within the other passage of the filling device and the hose 1722 may be a conduit for an electrical sensor wire or may be a cable connecting the in-chamber transducer to a controller outside the chamber. According to another embodiment, the second hose 1722 can be connected to a vacuum source. In this implementation, the second hose 1722 can be used to pull a vacuum on the interpane space of an IGU when the filling device 1700 is sealed to the IGU passage.

Referring again to FIG. 17, in some embodiments the actuating device can follow a pre-programmed movement cycle 1730 represented by arrows in FIG. 17. According to the depicted embodiment, the filling device 1700 is a wedge block filling device designed to be sealed against a spacer frame between the first and second sheets of a partially assembled IGU. In some implementations the partially assembled IGU can have a tent configuration in which the bottom edge of the second, front sheet is spaced away from the bottom edge of the first, back sheet. According to this embodiment, the actuator 1702 is mounted to a movable portion of a vacuum enclosure. Before moving the filling device into position next to the IGU passage, the actuator can be in a resting position 1. After the movable portion of the enclosure seals with a fixed portion of the enclosure, the filling device 1700 is aligned with a side opening of the tented IGU. As shown with the movement cycle 1730, the actuator in this implementation moves the filling device toward the IGU to a position 2 that is within the side opening of the tented IGU. In some cases this movement toward the IGU also aligns the filling device with the outward-facing surface of the IGU spacer frame.

The actuator then moves the filling device to a position 3. The movement toward position 3 involves moving the filling device simultaneously toward the fixed portion of the vacuum enclosure and the first or back sheet of the IGU. In some cases this movement can be a registration of the filling device to the IGU's back sheet. The actuator then maintains the filling device in the position 3 while a press plate presses the IGU's front or second sheet against the spacer frame and also against the filling device. The sealing of the second sheet to the spacer frame and filling device forms a wedge sealed IGU according to some embodiments. The wedge-sealed IGU is also an unsealed IGU in some cases.

After the wedge-sealed IGU is formed, the filling device 1700 can be used to introduce a desired amount of gas into the interpane space of the IGU. According to some embodiments, a pressure of the gas may be read with the filling device using the second hose 1722. After use of the filling device 1700 is complete, the actuator 1702 can move the filling device away from the IGU to position 4, and then back to the starting position 1.

When the filling device 1700 is removed by the actuator 1702, the wedge-passage will close because of the tension caused by the flexibility of the outer sheet. That tension will be sufficient to seal the spacer frame to the sheet in various embodiments. In another embodiment, a press plate can be activated to press down on the IGU to ensure the seal. If the press plate has a depression to accommodate a widest portion of the filling device, then the conveyor belt is activated to move the IGUs to a different position with respect to the depression before activating the press plate, so that the press plate will sufficiently seal the IGUs, according to an embodiment.

It should be appreciated that the movement cycle 1730 depicted in FIG. 17 and described above is only one example of a possible sequence of actuations and that many variations and other movement cycles can be employed for the filling device and actuator. As just one example, the filling device and actuator can be mounted to a vacuum enclosure's back or fixed portion, which could change the desired movements of the actuator.

Figure 19:
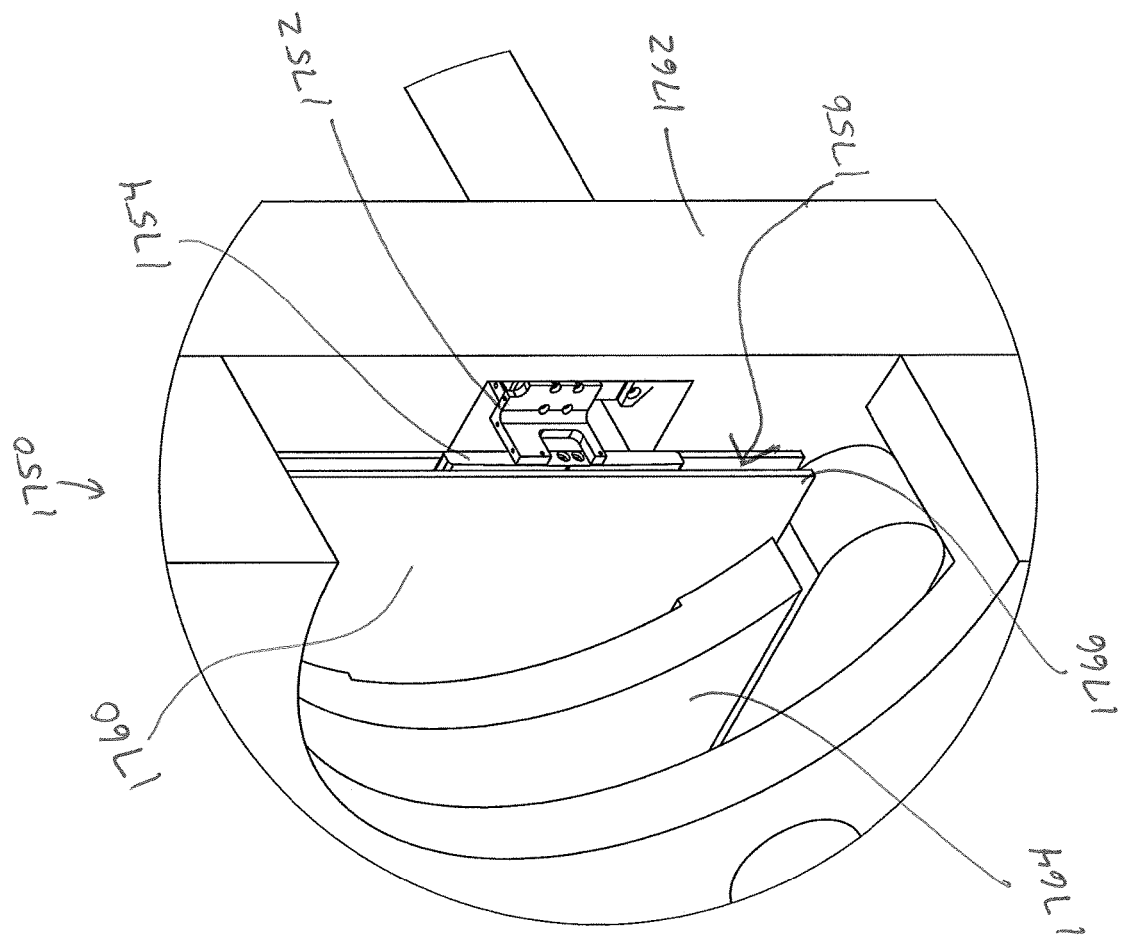
FIGS. 18-19 are cut away perspective views of an enclosure showing an actuator and connected filling device inserted into an unsealed IGU assembly, according to an embodiment.
Figure 18:
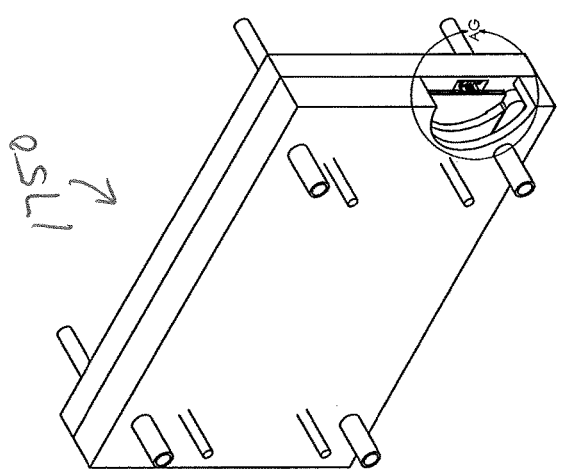

FIGS. 18-19 are cut away perspective views of a vacuum enclosure 1750 showing an actuator 1752 with a connected filling device 1754 positioned within a channel 1756 of an unsealed IGU assembly 1760. In this embodiment the actuator and filling device are mounted to a back plate 1762 or fixed portion of the vacuum enclosure 1750. A press plate 1764 has already pressed an outer sheet 1766 against the IGU's spacer frame and the filling device 1754 to form a wedge-sealed IGU. A gas supply or source (not shown) connected to the filling device would be used in conjunction with the filling device to fill the interpane space of the IGU with a desired gas. Afterward, the actuator 1752 would pull the filling device out from the IGU's channel 1756 so that the outer sheet 1766 could be completely sealed to the spacer frame, creating a sealed IGU, according to an embodiment.

FIG. 20 is a side view of the enclosure 1808 of FIGS. 8-13 depicting the unsealed IGU assembly 1814 inside the enclosure 1808, according to an embodiment. The system 1800 is shown with the first and second portions of the vacuum enclosure 1808 closed and sealed. The unsealed IGU assembly 1814 is no longer partially sealed in an embodiment. As illustrated, the press plate 1852 has pressed the second sheet, the spacer frame, and the first sheet against the first portion 1818 of the enclosure, thus sealing off the interpane space of the IGU except for the wedge-passage (not shown) and the filling block passage extending through the filling device 1850. Accordingly, a source or supply of gas that includes the filling device 1850 can be used to introduce the gas through the passages into the interpane space.

FIG. 21 is a side view of the enclosure 1808 with the assembling and filling process complete. The enclosure 1808 is in an open or unsealed configuration, with the first and second portions 1818, 1820 moved apart. In addition, the press plate 1852 has been moved away from the now-filled IGU that is supported by the support structure 1810. The IGU can exit the enclosure 1808, e.g., by conveyor or another means.

In some cases the IGU passage is sealed while the IGU remains within the vacuum enclosure. In an embodiment, the IGU passage is sealed before the enclosure 1808 opens. In another embodiment, the IGU passage remains unsealed after the enclosure 1808 is opened. An additional step can involve sealing the IGU while the IGU remains in the opened vacuum chamber. Alternatively, an unsealed IGU may first be moved (e.g., positioned, transported, translated) out of the vacuum enclosure. For example, the unsealed IGU may be conveyed from the interior of the vacuum enclosure to a staging area using a post-chamber conveyor.

When terms of orientation are used throughout the description, such as top and bottom, the drawings provide a reference for such understanding such terms. It should be understood that the concepts described herein can be practiced in alternative orientations to those described. For example, a gap in an unsealed IGU assembly is described as being a bottom gap in one example, but could be a side gap or top gap in alternative embodiments. The drawings illustrate support devices for the unsealed IGU assemblies including a conveyor belt and a nearly-vertical support surface adjacent to the conveyor belt, so that the unsealed IGU assemblies are held in a nearly vertical position. It is also possible to use different conveyor devices for the unsealed IGU assemblies that hold the assemblies at different orientations, such as horizontal or vertical. It is also possible to use support devices that include a conveyor attached to an angled or tilted support surface or plate. As an example, the enclosure 5904 shown in FIGS. 57-60 includes a first fixed portion in the form of an angled back plate. According to an embodiment, the angle of the back plate is between about 5 degrees and about 10 degrees from vertical. In an embodiment, the angle is about 6 degrees, about 7 degrees, or about 6.5 degrees. Other suitable angles are also possible.

FIG. 22 shows a perspective view of one embodiment of a filling device 2402. The filling device 2402 can include a first end 2412 and a second end 2414. The filling device 2402 can include a planar side 2404, a curved non-planar side 2406, an inlet side 2408, and a side 2410. The spacer side 2410 will be next to the spacer and the interpane space when the filling device is positioned in the open channel of the partially assembled IGU. In some embodiments, the spacer side 2410 can define an outlet 2411 of the filling device passage (as shown in FIGS. 22 and 23). In some embodiments, the curved non-planar side 2406 can define the outlet 2411 (as shown in FIGS. 22 and 24). In some embodiments, the curved non-planar side 2406 and the spacer side 2410 can both define the outlet 2411.

In an embodiment, the curved non-planar side 2406 can result in a portion of the filling device 2402 having a greater width than the remainder of the filling device 2402, such as a middle portion 2424. In an alternative embodiment, the filling device does not include a curved side and has a uniform width sufficient to define the wedge-passage.

In various embodiments, the filling device 2402 can be a generally rectangular prism, such as having four planar sides and non-planar ends 2412, 2414. In other embodiments, the filling device 2402 can be rectangular prism, such as having six planar sides.

FIGS. 23, 24 and 25 are views of an inlet side 2408, curved side 2406 and spacer side 2410 of the filling device of FIG. 22, respectively. The filling device 2402 can be wider in the middle than at the ends, such as shown in FIG. 25.

FIG. 26 is a cross-sectional view of the filling device 2402 of FIG. 14, taken through line A-A of FIG. 25. In various embodiments, the filling device passage includes a first inlet 2430 defined by a first side (inlet side 2408) of the filling device 2402 and a first outlet 2411 defined by the filling device 2402 at an edge of a second side (spacer side 2410) of the filling device 2402. In some embodiments, the first outlet is positioned at the widest middle part of the filling device. In some embodiments, the first side can be opposite from the second side of the filling device 2402. In other embodiments, the first side (inlet side 2408) can define a first inlet 2430 and the second side (curved non-planar side 2406) can define the first outlet 2411. In some embodiments, the first side and second side can be adjacent and/or perpendicular. The filling device defines a filling passage 2432 extending between the first inlet 2430 and the first outlet 2411. In one embodiment, the filling passage 2432 includes an inlet cavity 2440 and a diagonal passage 2442. In one embodiment, the first outlet 2411 has an elongate shape and is positioned at the corner edge defined by the intersection of the curved side and the spacer side of the filling device. The filling device can also be a filling block or a wedge in some embodiments. In one embodiment the filling passage is used to provide a gas to an interpane space of an IGU through an IGU passage.

The filling device can also define a second inlet 2416 and a second outlet 2418, and a second passage 2420 extending between the second inlet and second outlet. In one embodiment, the second passage contains a pressure transducer. The second passage and the pressure transducer are in fluid communication with the interpane space when the filling device is positioned in a first position to fill the interpane space with a first gas. In some embodiments, the filling device defines attachment openings 2446 for attaching the filling device to an actuator.

Now referring to FIGS. 22-27, in one embodiment, the filling device 2402 has a length L ranging from about 3 inches to about 12 inches. In one embodiment, the length L is about 8 inches. In various embodiment, the length L is at least 7 inches and at most 9 inches. In various embodiment, the length L is at least 6 inches and at most 10 inches. In various embodiment, the length L is at least 4 inches and at most 12 inches. In various embodiments, the length L is at least 3 inches, at least 4 inches, at least 5 inches, at least 6 inches, at least 7 inches, at least 8 inches and at least 9 inches. In various embodiment, the length L is at most 12 inches, at most 11 inches, at most 10 inches, at most 9 inches, at most 8 inches, at most 7 inches and at most 6 inches.

The width W of the filling device is selected so that it will create a wedge-passage for passage of a filling gas between a sheet and a sealant-laden spacer in a wedge-sealed IGU. In one embodiment, the width W is at least 1% larger than a width of the spacer. In various embodiments, the width W is at least 2%, 3%, 4%, 5%, 6%, 7%, 10%, 12%, and 13% larger than a width of the spacer. In various embodiments, the width W is at most 10%, 15%, 20%, 25%, 30% and 35% larger than a width of the spacer. In one embodiment, the width W is at least 1% larger and at most 15% larger than a width of the spacer. In one example, the width W is at least 5% larger and at most 25% larger than a width of the spacer. In one example, the width W is at least 10% larger and at most 20% larger than a width of the spacer. In one embodiment, the width W is about 5%, 10%, 15%, 20% and 25% larger than a width of the spacer.

In one embodiment, the filling device has a width W at the widest middle portion 2424 of about 0.6 inches or 0.587 inches. The filling device is narrower at its ends. The slope of the surface from middle portion 2424 to each end is 0.86 to 1 degree from a line tangent to the surface at the middle portion 2424. The thickness T of the filling device is 0.375 inches. The length P of the outlet 2411 of the filling device passage is about 0.8 inch or about 0.765 inch.

The width D of the outlet 2411 of the filling device passage 2304, shown in FIG. 26, is about 0.030 inch. The filling device passage 2304 includes an inlet cavity 2440 adjacent to the inlet 2430, shown in the cross-section of FIG. 26. A diagonal passage 2442 leads from an inlet cavity 2440 to the outlet 2411 which is shown in the cross-section of FIG. 26. The angle b of the diagonal passage 2442 compared to a line parallel to side 2404 is about 45 degrees.

In various embodiments, the filling devices, such as the filling devices of FIGS. 22-27. FIGS. 40-45, FIGS. 48-49, and other filling devices described herein, can include a polymer, such as polyethylene terephthalate, polystyrene, polyvinyl chloride, polytetrafluoroethylene, nylon, or polyoxymethylene. In other embodiments, the filling device can include a core and a covering. The core can include a metal, such as aluminum. The covering can include a polymer, such as those listed above. In additional embodiments, the filling device can include one or more surfaces that include a protective layer, such as a foam layer, to protect the first or second sheet from damage as the filling device is inserted or removed from between the sheets.

FIG. 28 is a cross-sectional view of a portion of a wedge-sealed IGU, taken through an inlet of the filling device 1420, according to an embodiment. FIG. 29 is an enlarged view of the detail indicated in FIG. 28. As depicted in FIGS. 28 and 29, the filling device 1420 includes a planar side 1502 and a curved non-planar side 1504. The filling device 1420 also includes an inlet side 1506 and a spacer side 1508. The filling device 1420 further includes a filling block passage 2304 ending with an outlet 1510.

FIG. 28 shows a spacer 2206 disposed between a first sheet 1402 and a second sheet 1404. Although not shown, a first sealant bead is disposed between the spacer 2206 and the first sheet 1402, such as to seal the spacer 2206 with the first sheet 1402. FIG. 28 further shows a second sealant bead 2210. The second sealant bead 2210 is disposed between the spacer 2206 and the second sheet 1404, such as to seal the spacer 2206 with the second sheet 1404. In FIG. 28, the first sealant bead is sealing the spacer to the first sheet 1402. In contrast, the second sealant bead 2210 is not sealing the spacer 2206 to the second sheet 1404 in order to allow space for the wedge passage between the second sheet 1404 and the spacer 2206. The wedge passage 2302 (shown in FIG. 29) can allow fluid communication between the filling device passage 2304 and the interpane space, such as to allow the first gas to be introduced into the interpane space.

FIGS. 30-39 show steps in assembling an IGU using a system 3000 including a vacuum enclosure 1808, according to an embodiment where the unsealed IGU assembly enters the enclosure as a partially assembled IGU with a tent configuration.

Figure 8:
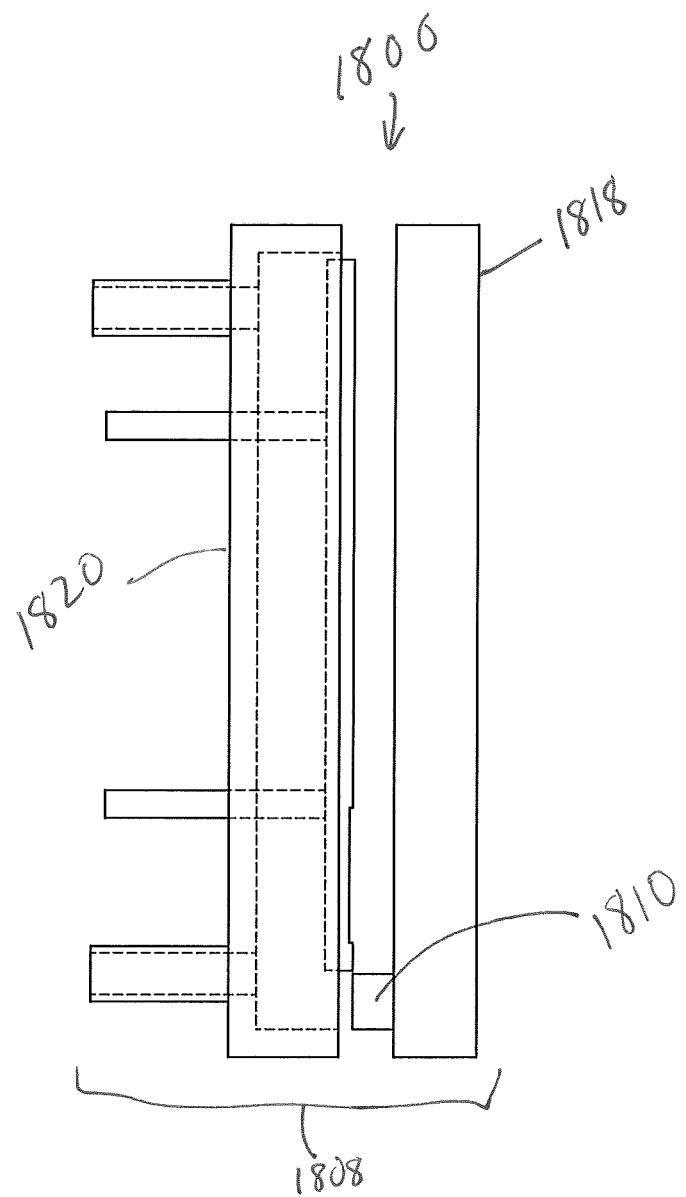

At an early stage of a filling process, an open, empty vacuum enclosure 1808 is provided, as shown in FIG. 8, including the first portion 1818, second portion 1820 and support structure 1810. The vacuum enclosure 1808 shown in FIGS. 46-55 is also similar to the vacuum enclosure 1808 illustrated in FIG. 8 and other FIGS. The vacuum enclosure 1808 shown in FIGS. 30-39 is also similar to the vacuum enclosure 1808 illustrated in FIG. 8, FIGS. 46-55, and other FIGS. and the description and its alternatives provided herein also apply to the vacuum enclosure 1808 of FIGS. 30-39.

Figure 30:
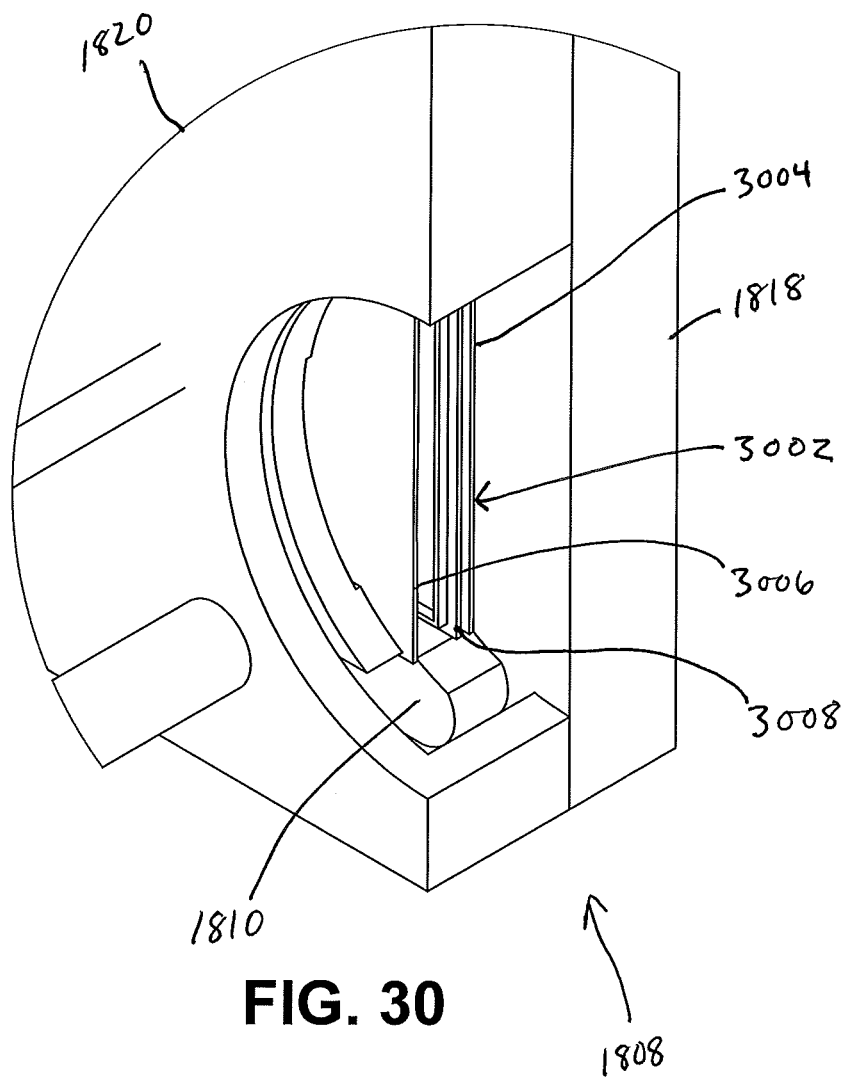
Figure 33:
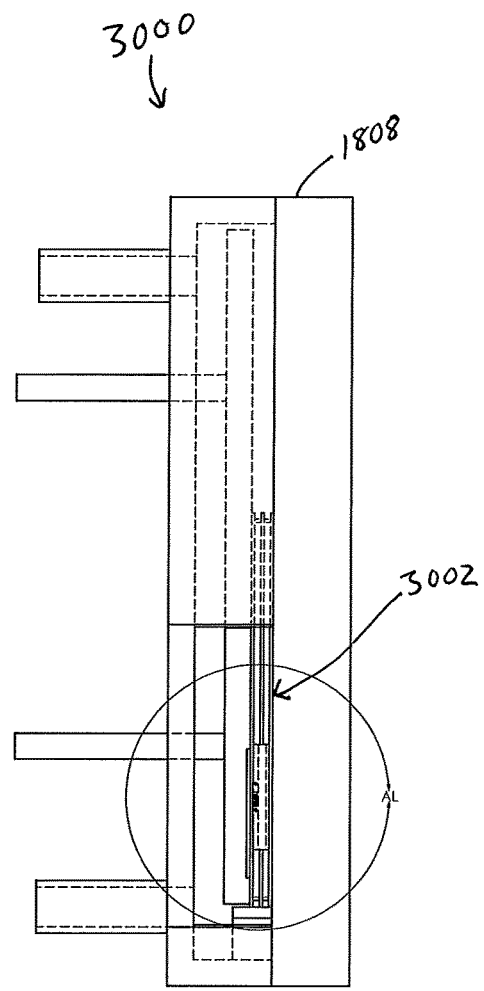
Figure 34:
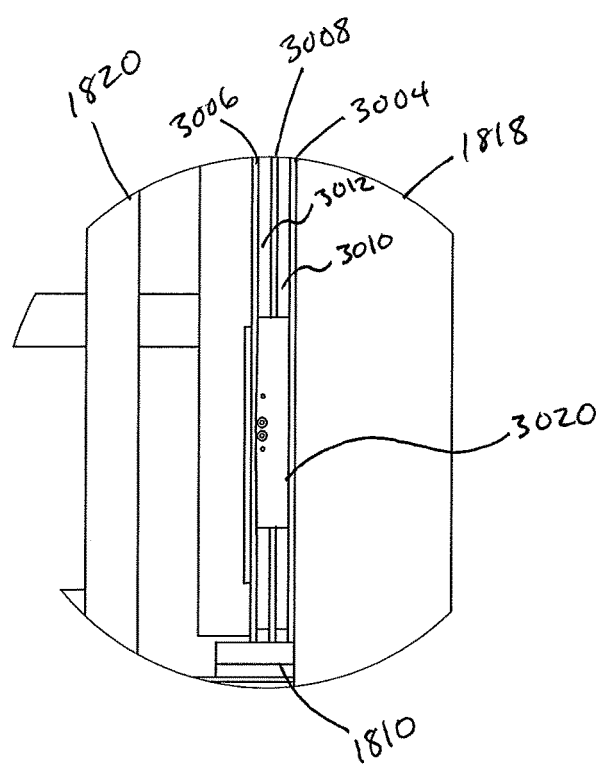

At an early stage of the filling process, a vacuum enclosure 1808 that is open and empty, as shown in FIG. 8, can receive an unsealed IGU 3002 in the vacuum enclosure interior and can close around the unsealed IGU 3002 to form a sealed interior, as shown in FIG. 30. As with the example described with respect to FIGS. 8-11, the vacuum enclosure 1808 as shown in FIG. 30 receives the unsealed IGU assembly 3002 as a partially assembled IGU that has a tent configuration.

In the example described with respect to FIG. 9, the enclosure receives one type of partially assembled IGU 1814 that has a first sheet sealed to a spacer frame, and a second sheet that leans against the first sheet and spacer frame to create a tent-like configuration. According to the embodiment depicted in FIG. 30, the enclosure 1808 receives another type of partially assembled IGU 3002 having a tent configuration, referred to herein as a triple pane IGU. The partially assembled triple pane IGU 3002 generally includes a first sheet 3004, a second sheet 3006, and an intermediate sheet 3008 between the first and second sheets. The intermediate sheet defines an opening (not shown) to allow fluid communication between two portions of an interpane space. A first portion of the interpane space is adjacent to the first sheet 3004 and a second portion of the interpane space is adjacent to the second sheet 3006 according to an embodiment. The IGU 3002 also includes a first spacer frame 3010 and a second spacer frame 3012.

In accordance with some embodiments, the methods and mechanisms for assembling, evacuating, filling, and sealing a triple pane IGU—whether partially assembled and unsealed, assembled and unsealed with an IGU passage, or other configurations—are similar or the same as the methods and mechanisms described herein with respect to other embodiments. As an example, evacuating the partially assembled triple pane IGU 3002 can be similar to evacuating the partially assembled IGU 1814 depicted in and described with respect to FIGS. 8-21, with the modifications that the intermediate sheet 3008 takes the place of the first sheet 1830 of IGU 1814, and the triple pane IGU includes an additional spacer frame 3010 and sheet 3004 when compared to IGU 1814.

As another example, the triple pane IGU 3002 can include a triple pane filling device 3020 as shown in FIGS. 33-38. The filling device 3020 has the form of a wedge filling block similar in some respects to the filling device 1850 described with respect to FIGS. 12 and 13. The filling device 3020 is also similar to the filling device 4402 described with respect to FIGS. 40-45. The descriptions of those embodiments also describe similar features of the filling device 3020 as applicable.

According to an embodiment, the filling device 1850 from the example in FIGS. 8-21 can also be used to fill the triple pane IGU 3002 as an alternative to the filling device 3020 and other filling devices and options. For example, the intermediate sheet 3008 and the second sheet 3006 shown in FIGS. 12 and 13 can be pressed together around the filling device 1850 in the same manner as the first and second sheets of IGU 1814 are pressed together around the filling device 1850.

According to some embodiments, filling and/or sealing the triple pane IGU 3002 can be similar in some respects to filling and/or sealing the double pane IGU 1814 of FIGS. 8-21 and the double pane IGU 4602 shown in and described with respect to FIGS. 46-55. For example, an actuator 3030 can be attached to the filling device 3002 as shown in FIGS. 35-38 for positioning the filling device 3002 relative to the IGU. In some cases the actuator 3030 can be similar to the actuator 1702 described with respect to FIGS. 17-19, and also the actuator 4642 described with respect to FIGS. 50-54. The descriptions and examples of these similar actuators also apply to aspects of the actuator 3030 that are similar. As just one example, in one embodiment the actuator 3030 is an automatic actuator similar to actuator 4642. Similarly, a control system for the actuator 3030 can also include one or more of a processor, a motor and machine-readable instructions.

Figure 39:
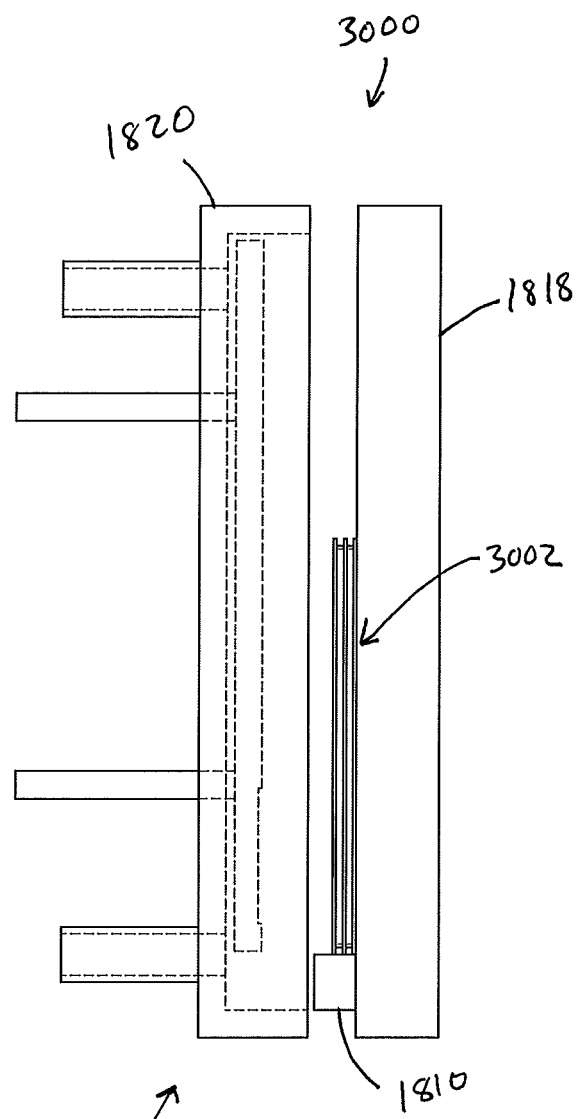

Turning to FIG. 39, the vacuum enclosure 3000 is shown in an open configuration with the triple pane IGU 3002 ready to exit the chamber according to an embodiment.

FIG. 40 shows a perspective view of one embodiment of a filling device 4402 for use with assembling a triple pane IGU, having a first sheet, second sheet and intermediate sheet between the first and second sheet, which defines a notch 4403 to accommodate the intermediate pane of a triple pane IGU.

In one embodiment, the filling block of FIGS. 22-27 is used to fill a triple pane IGU with a first gas.

The filling device 4402 can include a first end 4412 and a second end 4414. The filling device 4402 can include a planar side 4404, a curved non-planar side 4406, an inlet side 4408, and a spacer side 4410. The spacer side 4410 will be next to the spacer and the interpane space when the filling device is positioned in the open channel of the partially assembled IGU.

In some embodiments, the curved non-planar side 4406 can define the outlet 4411 (as shown in FIGS. 40, 42, 44 and 45). In some embodiments, the spacer side 4410 can define a portion of an outlet 4411 of the filling device passage (not shown). In some embodiments, the curved non-planar side 4406 and the spacer side 4410 can both define the outlet 4411, as shown in FIG. 44, similar to the outlet 2411 of the filling device of FIGS. 22-27.

In an embodiment, the curved non-planar side 4406 can result in a portion of the filling device 4402 having a greater width than the remainder of the filling device 4402, such as a middle portion 4424. In an alternative embodiment, the filling device does not include a curved side and has a uniform width sufficient to define the wedge-passage.

In various embodiments, the filling device 4402 can be a generally rectangular prism, such as having four planar sides and non-planar ends 4412, 4414. In other embodiments, the filling device 4402 can be rectangular prism, such as having six planar sides.

FIGS. 41, 42 and 43 are views of an inlet side 4408, curved side 4406 and spacer side 4410 of the filling device of FIG. 40, respectively. The filling device 4402 can be wider in the middle than at the ends, such as shown in FIG. 43.

FIG. 44 is a cross-sectional view of the filling device 4402 of FIG. 40, taken through line A-A of FIG. 42. In various embodiments, the filling device passage includes a first inlet 4430 defined by a first side (inlet side 4408) of the filling device 4402 and a first outlet 4411. In some embodiments, the first outlet is positioned at the widest middle part of the filling device. In some embodiments, the first side can be opposite from the second side of the filling device 4402. In other embodiments, the first side (inlet side 4408) can define a first inlet 4430 and the second side (curved non-planar side 4406) can define the first outlet 4411. In some embodiments, the first side and second side can be adjacent and/or perpendicular. The filling device defines a filling passage 4432 extending between the first inlet 4430 and the first outlet 4411. In one embodiment, the filling passage 4432 includes an inlet cavity 4440 and a diagonal passage 4442. In one embodiment, the first outlet 4411 has an elongate shape and is positioned at the corner edge defined by the intersection of the curved side and the spacer side of the filling device. The filling device can also be a filling block or a wedge in some embodiments. In one embodiment the filling passage is used to provide a gas to an interpane space of an IGU through an IGU passage.

The filling device can also define a second inlet 4416 and a second outlet 4418, and a second passage 4420 extending between the second inlet and second outlet. In one embodiment, the second passage contains a pressure transducer. The second passage and the pressure transducer are in fluid communication with the interpane space when the filling device is positioned in a first position to fill the interpane space with a first gas. In some embodiments, the filling device defines attachment openings 4446 for attaching the filling device to an actuator.

A notch 4403 for accommodating an intermediate pane of a triple pane IGU is defined between a first leg 4405 and a second leg 4407. The first leg 4405 includes the planar side that will rest against an inner sheet during the assembly process. The second leg 4407 includes the curved side that will rest against an outer sheet during the assembly process.

Now referring to FIGS. 40-45, in one embodiment, the filling device 4402 has a length M ranging from about 3 inches to about 12 inches. In one embodiment, the length M is about 8 inches. In various embodiment, the length M is at least 7 inches and at most 9 inches. In various embodiment, the length M is at least 6 inches and at most 10 inches. In various embodiment, the length M is at least 4 inches and at most 12 inches. In various embodiments, the length M is at least 3 inches, at least 4 inches, at least 5 inches, at least 6 inches, at least 7 inches, at least 8 inches and at least 9 inches. In various embodiment, the length M is at most 12 inches, at most 11 inches, at most 10 inches, at most 9 inches, at most 8 inches, at most 7 inches and at most 6 inches.

The width V of the filling device is selected so that it will create a wedge-passage for passage of filling gas between a sheet and a sealant-laden spacer in a wedge-sealed IGU. In one embodiment, the width V is at least 1% larger than a width of the spacer. In various embodiments, the width V is at least 2%, 3%, 3%, 5%, 6% and 7% larger than a width of the spacer. In various embodiments, the width V is at most 10% and at most 15% larger than a width of the spacer. In one embodiment, the width V is at least 1% larger and at most 15% larger than a width of the spacer.

In one embodiment, the filling device has a width V at the widest middle portion 4444 of about 0.6 inches or 0.587 inches. The filling device is narrower at its ends. The slope c of the surface from middle portion 4424 to each end is 0.86 to 1 degree from a line tangent to the surface at the middle portion 4424. The thickness from the inlet side to the spacer side of the filling device is 0.375 inches. The length Q of the outlet 4411 of the filling device passage is about 0.8 inch or about 0.765 inch.

The width E of the outlet 4411 of the filling device passage 2304, shown in FIG. 44, is about 0.030 inch. The filling device passage 2304 includes an inlet cavity 4440 adjacent to the inlet 4430, shown in the cross-section of FIG. 44. A diagonal passage 4442 leads from an inlet cavity 4440 to the outlet 4411 which is shown in the cross-section of FIG. 44. The angle d of the diagonal passage 4442 compared to a line parallel to side 4404 is about 45 degrees.

FIGS. 46-55 show steps in assembling an IGU using a system 4600 including a vacuum enclosure 1808, according to an embodiment where an unsealed IGU defines an IGU passage through a hole in a spacer frame.

At an early stage of a filling process, an open, empty vacuum enclosure 1808 is provided, as shown in FIG. 8, including the first portion 1818, second portion 1820 and support structure 1810. The vacuum enclosure 1808 shown in FIGS. 46-55 is similar to the vacuum enclosure 1808 illustrated in FIG. 8 and other FIGS, and the description and its alternatives provided herein also apply to the vacuum enclosure 1808 of FIGS. 46-55. At an early stage of the filling process, a vacuum enclosure 1808 that is open and empty, as shown in FIG. 8, can receive an unsealed IGU 4602 in the vacuum enclosure interior and can close around the unsealed IGU to form a sealed interior, as shown in FIGS. 46 and 47. FIG. 46 is a side view of the system 4600 with a part of the vacuum enclosure second portion 1820 cut away. FIG. 47 is a side perspective close-up view, also with part of the second portion 1820 cut away. The unsealed IGU 4602 is positioned on the support structure 1810 within the closed vacuum enclosure in FIGS. 46-47. In the example of the FIGS, the unsealed IGU 4602 includes a first sheet 4632, a second sheet 4634, and a spacer frame 4635 positioned between the first and second sheets. The unsealed IGU defines an IGU passage to the interpane space of the IGU, through a hole 4636 in the spacer frame 4635, shown in FIG. 46. When the hole 4636 is referred to in the description of the FIGS., it is understood that the term IGU passage can be substituted for hole. The IGU assembly 4602 defines an open channel 4638 formed between the first and second sheets and next to spacer frame 4635.

There are several different ways of providing the unsealed IGU 4602 on the support structure within the vacuum enclosure 1808 as shown in FIGS. 46 and 47. The hole 4636 can be created in a spacer structure before or after it is formed into a spacer frame. The hole could be created before or after the spacer frame is attached to the first sheet. The hole could be created before or after the first and second sheets are sealed to the spacer frame. For each of these different points in the process of forming the unsealed IGU assembly, the hole could be created within the vacuum enclosure, before the unsealed IGU assembly enters the vacuum enclosure, before or after the vacuum enclosure is closed, and before or after the vacuum enclosure is evacuated. The hole 4636 could be created with a drill, saw, knife, press or other implement.

In some examples, the hole 4636 has a diameter of at least about 0.040 inch, at least about 0.060 inch, at most about 0.25 inch, at most about 0.50, ranging from 0.060 to 0.25 inch, or about 0.125 inch.

In one example, a partially assembled, tented IGU like shown in FIG. 11 is translated into the vacuum chamber, with the spacer frame attached to the first sheet and to a portion of the second sheet, and with a hole already provided in the spacer frame. The vacuum enclosure is closed around the partially assembled IGU. The vacuum enclosure is then evacuated. Because the partially assembled IGU defines an open bottom portion between the first and second sheets, the air in the interpane space is also evacuated. Then the press plate 1852 is actuated to press the second sheet against the spacer frame to form an unsealed IGU as shown in FIGS. 46-47.

In another example, the interpane space is evacuated through the hole in the spacer frame 4635 after the second sheet is sealed to the spacer frame. In one embodiment, to reduce the risk of the IGU exploding due to a pressure differential with the vacuum enclosure, the vacuum enclosure and the interpane space are be evacuated substantially simultaneously, so that the pressures in each are within 1 pound per square inch.

In the embodiments illustrated in FIGS. 46-56, while the unsealed IGU is within the vacuum chamber, the interpane space is filled with a first gas, while a gas is also introduced substantially simultaneously into the vacuum enclosure's interior. In one embodiment described in detail elsewhere herein, a first gas is introduced to the interpane space while a second gas is introduced to the vacuum chamber. In another embodiment, the same gas is introduced into both spaces.

FIGS. 48-54 illustrate a filling device that is used to provide a gas to the interpane space. FIG. 48 is a side perspective view of an IGU 4602 within a vacuum chamber 1808, and FIG. 49 is a close-up view of a portion of FIG. 48. FIGS. 48-49 illustrate a filling device 4640 defining a filling passage 4641 that can be positioned in the open channel 4638 so that the filling passage 4641 mates with the IGU passage 4636. In some examples, the filling device is substantially block-shaped. In some examples, the filling device is cylindrical in shape. In some embodiments, the filling device includes a planar sealing surface that defines an outlet of the filling passage, so that the planar sealing surface will contact the spacer frame surface when the filling device is in a first position to provide gas to the interpane space. In some examples, the filling device includes a nozzle structure or conical structure that presses up to or into the hole 4636.

Figure 50:
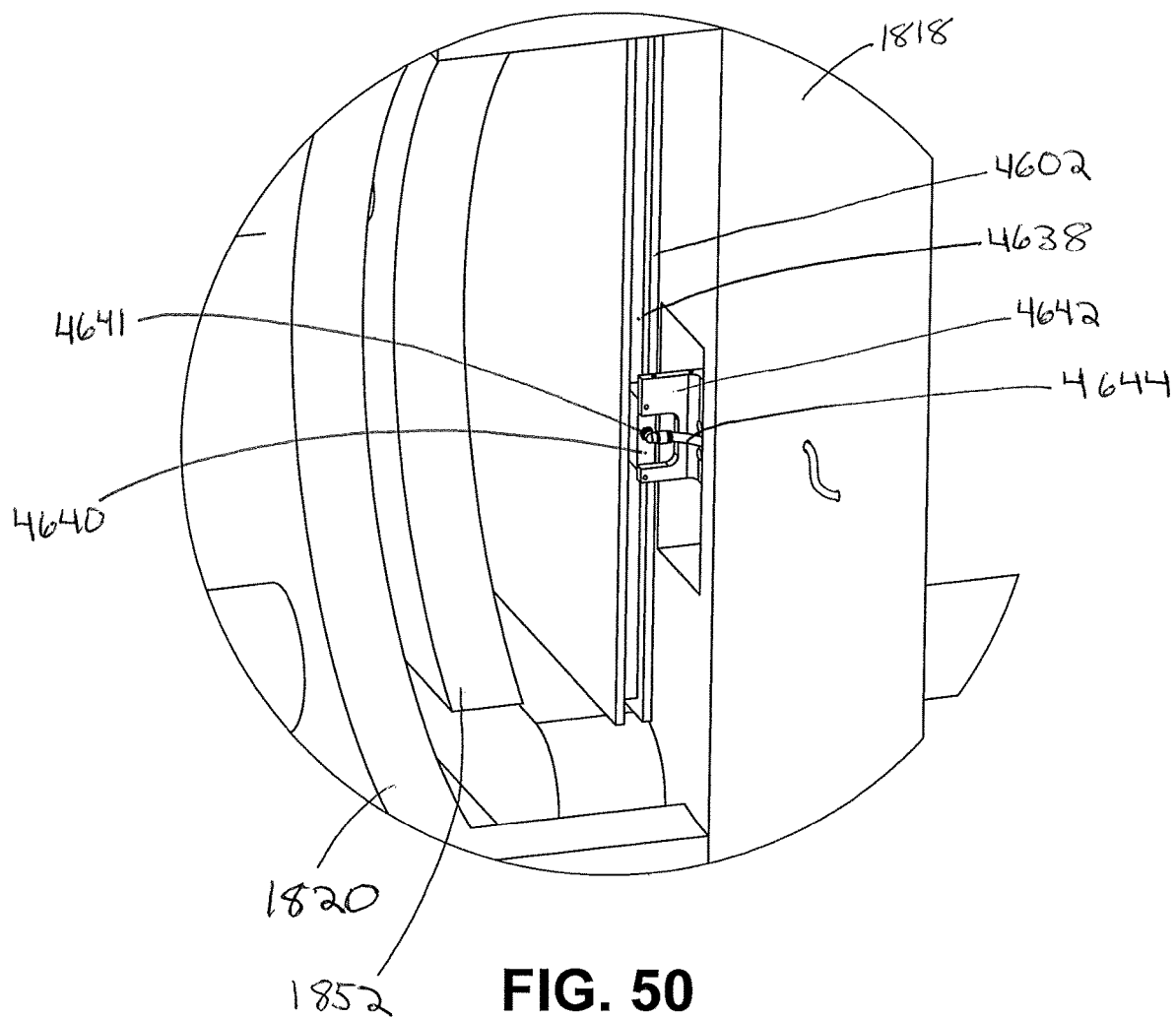

FIG. 50 shows a side perspective close-up view of the IGU within the vacuum chamber, and the filling device 4640 is positioned within the open channel, so that the filling passage is in fluid communication with the IGU passage. The filling device 4640 is held by an actuator 4642 and is attached to a gas supply conduit 4644. The gas supply conduit 4644 is in fluid communication with a gas tank or other supply system of a first gas for filling the interpane space. In one embodiment, the actuator is attached to the first, fixed portion of the vacuum enclosure. In another embodiment, the filling device and actuator are attached to a second, moveable portion of the vacuum enclosure.

Figure 52:
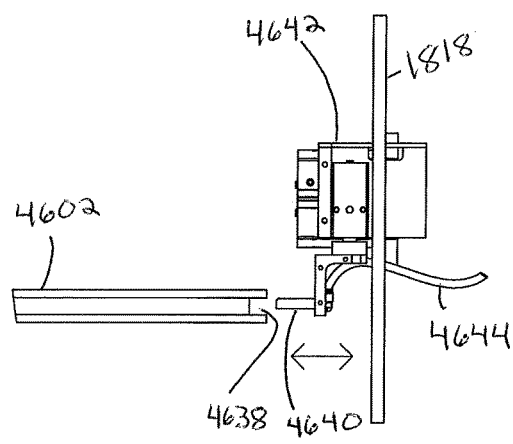
Figure 54:
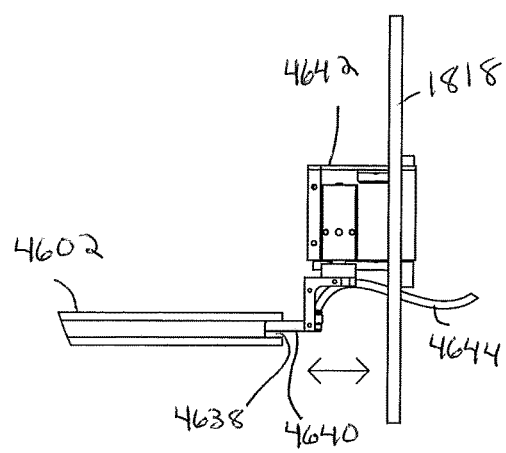
Figure 51:
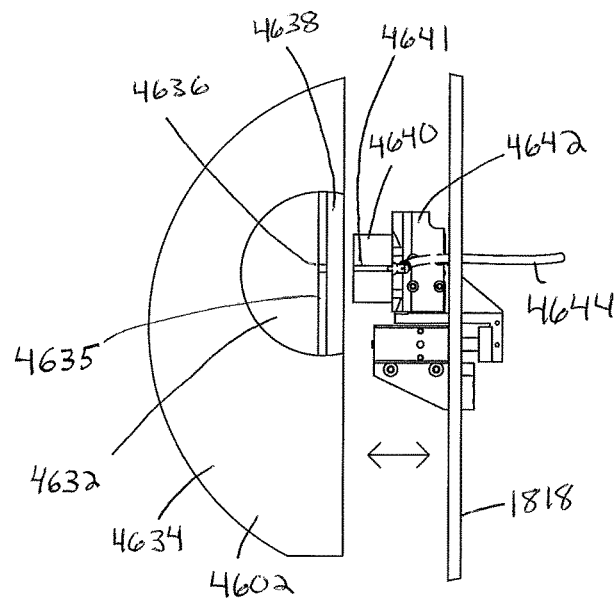
Figure 53:
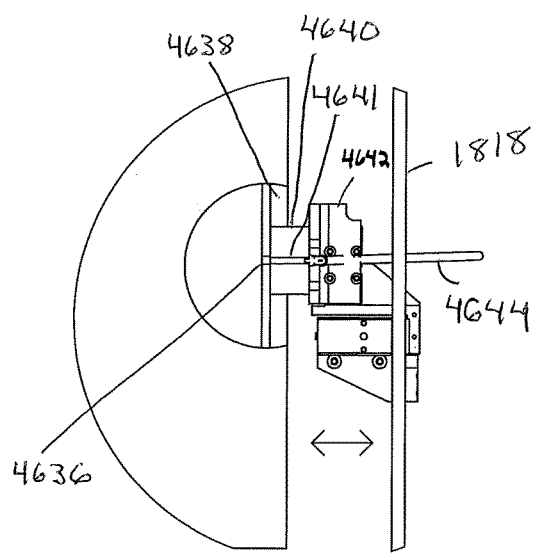

FIGS. 51-52 show the filling device 4640, actuator 4642, IGU 4602, and a side part of a first portion 1818 of the vacuum enclosure, with the filling device positioned away from engagement with the IGU passage or hole in spacer frame. FIGS. 53-54 show the same components but with the filling device contacting the spacer frame, so that the filling passage is in fluid communication with the hole in the spacer frame. The arrows indicate that the filling device can be moved by the actuator toward or away from the IGU to bring the filling device close to the hole in the spacer frame. FIGS. 51 and 53 are front views, looking at the system 4600 from the left side as shown in FIG. 46, with the second portion of the vacuum chamber removed from the drawing for improved clarity, looking toward the first portion 1818 of the vacuum enclosure. The actuator 4642 is attached at a side of the first portion 1818 of the vacuum enclosure. A portion of the second sheet 4634 is cut away in FIGS. 51 and 53 to reveal the second sheet 4634, a cross-section of the spacer frame 4635, and the hole 4636 in the spacer frame 4635. A cross-section of the filling device 4640 is also shown in FIGS. 51 and 53, showing the filling passage 4641. FIGS. 52 and 54 are top views looking down at the IGU, filling device and linear actuator.

In one embodiment, the actuator 4642 is an automatic actuator. In one embodiment, a control system for the actuator includes one or more of a processor, a motor and machine-readable instructions.

In one embodiment, the filling device includes a pressure transducer that measures the pressure in the interpane space when the filling device is in contact with the spacer frame and when the filling passage is in fluid communication with the IGU passage. The pressure transducer can be located within the filling passage. In one embodiment, the filling device defines a sensor passage, separate from the filling passage, which can be brought into communication the IGU passage and can hold a pressure transducer or other sensor.

In various embodiments, the system 4600 can introduce the desired amount of gases into the vacuum enclosure interior and into the interpane space in 30 seconds or less, 15 seconds or less, or 10 seconds or less.

After the interpane space is filled with the first gas, the hole 4636 is sealed. The step of sealing the hole in the spacer frame happen in a number of different ways, times and locations in different examples. In one example, the hole is sealed within the vacuum chamber while the vacuum chamber is still closed. In one embodiment, the vacuum chamber is opened, and the hole 4636 is sealed while the IGU is still present in the open vacuum enclosure. In one embodiment, the vacuum chamber is opened, the IGU is moved out of the vacuum enclosure, and the IGU is moved to a sealing station where the sealing happens.

Figure 55:
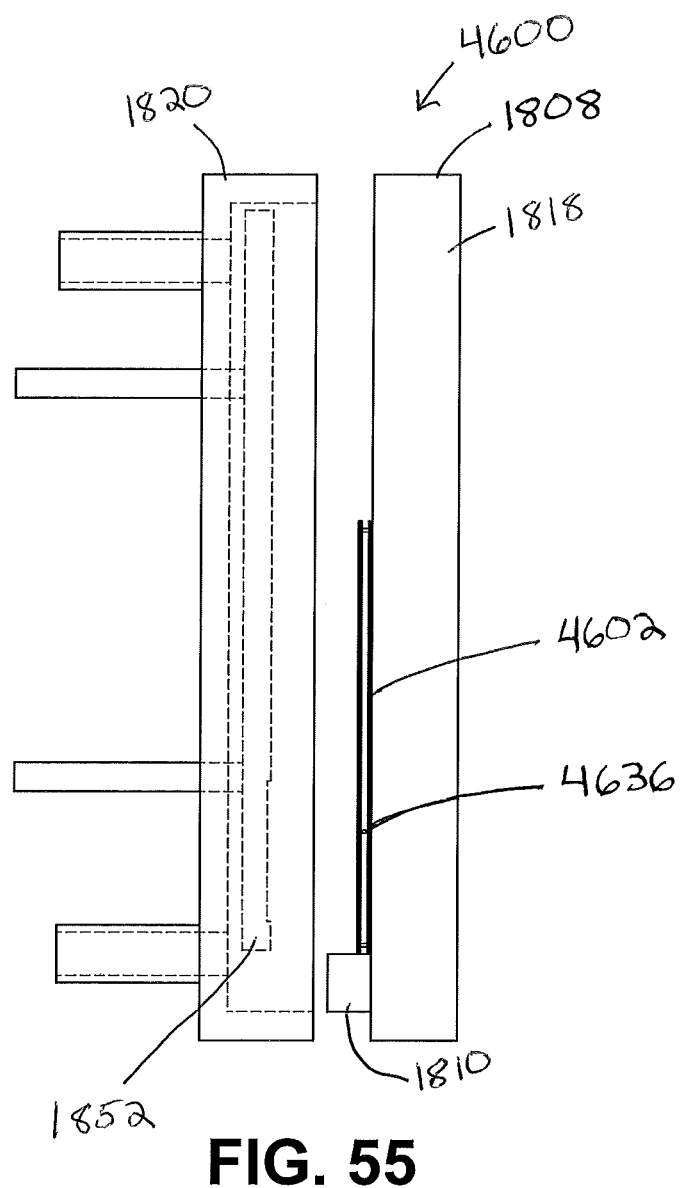

FIG. 55 is a side view of an open vacuum enclosure 1808, with the IGU 4602 present on the support structure 1810. The hole 4636 and IGU 4602 can be sealed or may not be sealed at the time that the vacuum enclosure is open and the IGU is present in the open vacuum enclosure interior. The reference number 4602 will be used to label the IGU where it is an unsealed IGU or could be a sealed IGU.

Figure 56:
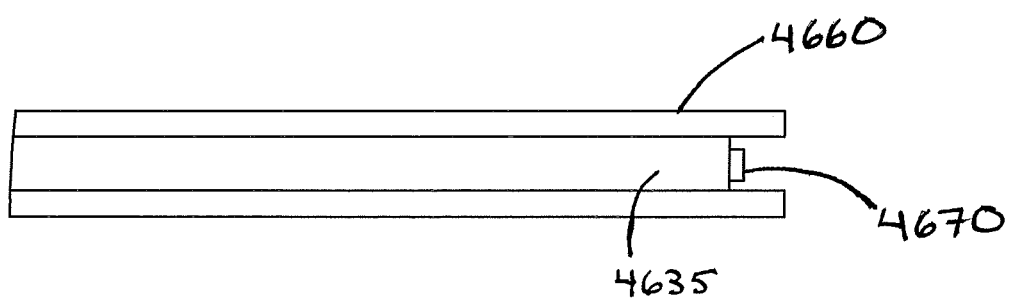
FIG. 56 is a top partial view of an insulating glass unit including a rivet for sealing the IGU, according to an embodiment.

FIG. 56 is a top view of a sealed IGU 4660, including a first sheet, a second sheet, a spacer frame, and a rivet 4670 plugging a hole in the spacer frame. As shown in FIG. 56, in one embodiment, the hole in the spacer frame is sealed by providing a rivet in the hole. In one embodiment, a rim of the rivet is provided with a sealant material to seal to the surrounding surface of the spacer frame. In another embodiment, the hole is sealed by providing a sealant material in the IGU passage that blocks fluid communication between the interpane space and the surrounding environment. Examples of sealant materials include polyisobutylene (PIB), butyl, curable PIB, hot melt silicon, acrylic adhesive, acrylic sealant, and other Dual Seal Equivalent (DSE) type materials. Other examples include other materials. In another embodiment, the hole in the spacer frame is sealed by covering the hole with tape or a patch.

In one example, the filling device defines a sealing conduit that is configured to provide a structure or material to seal the IGU passage, such as sealant material, a patch, a rivet, or a piece of tape. After filling the interpane space, the filling device can automatically move so that the sealing conduit is in fluid communication with the IGU passage, and then provide the sealing structure or material to seal the IGU passage. In another example, the filling device is moved away from the IGU passage after filling the interpane space, and a seal head including a sealing conduit is moved into communication with the IGU passage to provide a sealing structure or material. In one embodiment, the sealing conduit is a rigid conduit for moving a rivet into the IGU passage.

Other aspects and alternatives for filling the interpane space with a first gas are discussed herein, such as filling pressure, matching the pressures in the interpane space with the pressure in the vacuum enclosure, measuring the pressure. These aspects and alternatives apply to the provision of gas through a hole in the spacer frame as described with respect to FIGS. 46-55.

In FIGS. 46-56, a double pane IGU is shown as an example. It is also possible to use these same method steps to translate, gas fill, and seal a triple pane IGU, which includes a first sheet, second sheet, and an intermediate sheet between the first and second sheet, where the intermediate sheet defines an opening to allow fluid communication between the two portions of the interpane space. In some embodiments, a triple pane IGU include two spacer frames: a first spacer frame between the first sheet and intermediate sheet and a second spacer frame between the second sheet and intermediate sheet. A hole for an IGU passage can be defined in either the first spacer frame or the second spacer frame to allow for filling according to the methods described herein.

In another example, a triple pane IGU includes a single spacer frame spanning a gap between the first and second sheets, where a perimeter of the intermediate sheet is located within the perimeter of the single spacer frame. Examples of such single spacer frames for triple pane IGUs are shown in U.S. Published Applications 2012/0151857 and 2014/0109499, which are hereby incorporated by reference in their entireties. A hole for an IGU passage can be defined through such a single spacer frame structure, such as close to the first sheet, close to the second sheet, to allow for filling according to the methods and systems described herein.

In FIGS. 46-56, a method and system of filling is illustrated that uses a hole in the spacer to create the IGU passage. The method steps and system of FIGS. 46-56 can also be adapted to use a hole in one of the sheets to fill the IGU. In some hole-in-glass filling system examples, the hole is defined in the second sheet, the filling device is attached to the second portion of the vacuum enclosure and is brought into contact with the hole. The IGU passage, including the hole in the glass, is in fluid communication with the filling passage of the filling device when the filling device contacts the glass. The second portion of the vacuum enclosure, which is a moveable portion of the vacuum enclosure, includes a press plate which has a cut-out area to accommodate the filling device, so that the press plate can move without contacting the filling device. In one example, the press plate includes foam around the filling device.

In some examples, a method can include of selecting a particular filling device from a plurality of available filling devices and a system can include a device for selecting a particular filling device. The plurality of available filling devices can be different in size, such as to fit different sizes of IGUs, for example, different widths of IGUs. The plurality of available filling devices can be different in type, such as filling devices to form a wedge passage in an unsealed double pane IGU or triple pane IGU. In some examples, the plurality of available filling devices are provided and are picked up automatically as appropriate for a particular IGU. In some examples, the plurality of available filling devices are provided on a carousel and are automatically rotated into position as appropriate for a particular IGU. In some examples, the plurality of available filling devices are provided outside of the vacuum enclosure, and the particular filling device is selected when the vacuum enclosure is open.

In some examples, a method can include adjusting a dimension of a filling device and a system can include a filling device having an adjustable dimension. In some examples, the dimension of the filling device is adjusted by an adjustment device including one of a group consisting of a shim, a plurality of shims, and a screw.

As mentioned elsewhere in this disclosure, FIGS. 57-60 depict various components of an IGU gas filling system 5900 according to an embodiment. FIG. 57 is a front view of the system, which illustrates the spatial arrangement of some components. In an embodiment, the system includes a vacuum chamber or vacuum enclosure 5904, which is positioned between a pre-chamber staging or assembly area and structure 5930 and a post-chamber structure 5932 that serves as a post-filling area.

Each of the pre- and post-chamber areas includes mechanical means for moving IGU assemblies into and out of the vacuum enclosure 5904. According to an embodiment, the unsealed (e.g., partially assembled) IGUs are placed on the pre-chamber structure 5930, supported by an actuating mechanism 5940 that is configured to automatically move the IGUs into an interior 5906 of the enclosure. In an embodiment, the actuating mechanism is a conveyor 5940, such as a belt conveyor. The IGUs are moved within the enclosure using another support structure 5942, which is fully contained within the enclosure and in the depicted embodiment also includes one, two, or more linear conveyors 5942. After the IGUs are evacuated and filled with a gas within the chamber, the IGUs are then moved out of the enclosure to the post-chamber structure 5932 using another movable support structure 5944, which in this embodiment is also a conveyor.

FIG. 58 is a left side view of the vacuum enclosure 5904, depicting a first portion 5920 and a second portion 5922 that define an interior 5906 of the chamber 5904, according to an embodiment. In the embodiment shown in FIG. 58, the first portion 5920 is a fixed portion that includes a back plate and the movable support structure 5942 (e.g., conveyor) attached thereto. Correspondingly, the second portion 5922 is a movable portion configured to move toward and seal with the first fixed portion 5920 to create a sealed space in the interior 5906 of the enclosure for evacuating air from the enclosure and an interpane space of the IGUs, as well as for filling the interpane spaces with one or more gases.

Figure 60:
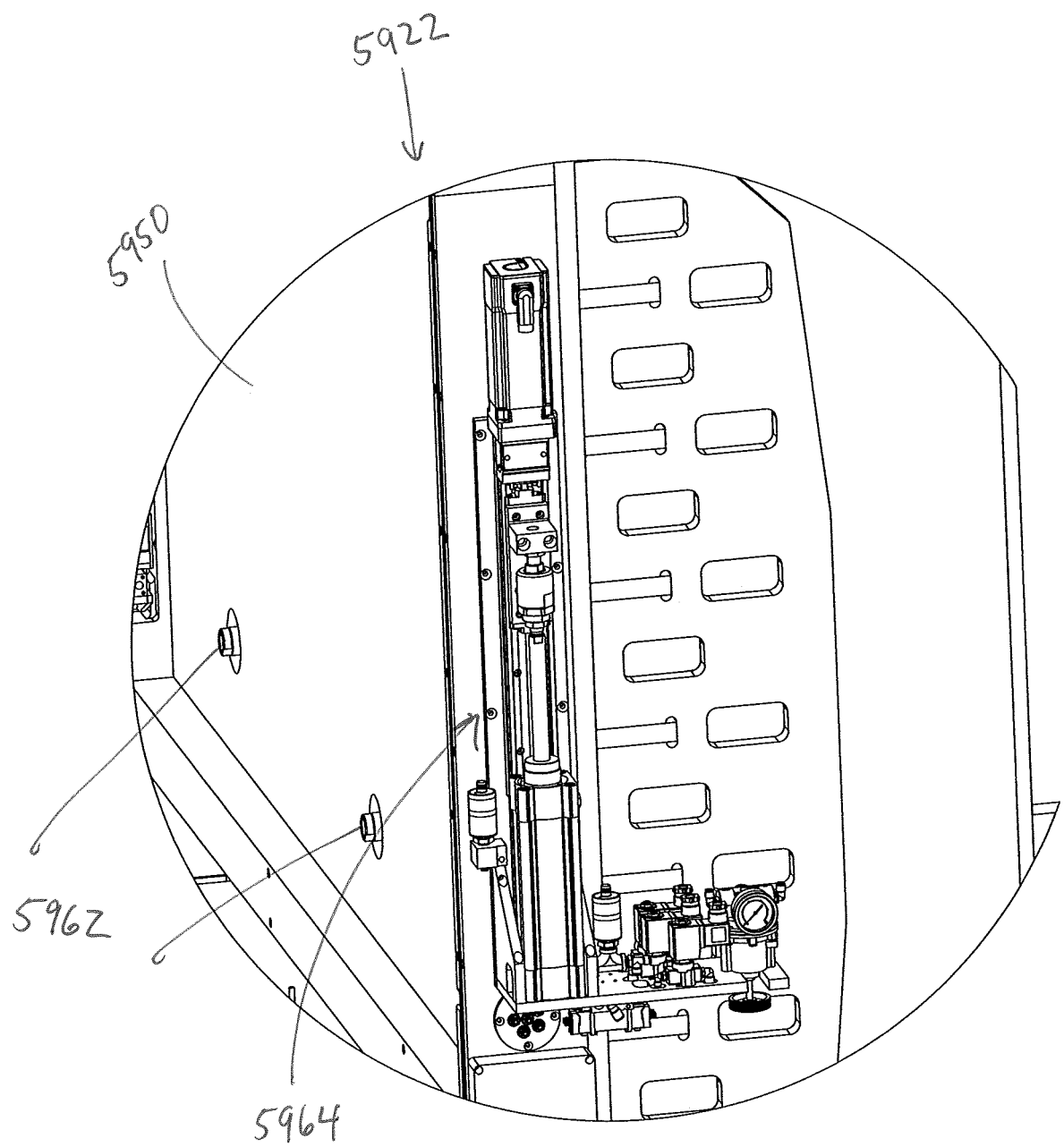
FIG. 60 is a perspective view of a gas filling ram, according to an embodiment.

As shown in FIG. 60, the movable second portion 5922 includes a press plate 5950 that is configured to move toward and press a partially assembled IGU together as discussed elsewhere herein. According to an embodiment, the movable portion also includes openings 5962 and a gas supply apparatus 5964 that form part of a gas supply or gas source for the system. The gas supply apparatus includes a gas ram, which in some cases includes a volumetric actuator such as an actuating cylinder. According to an embodiment, the cylinder draws in a desired volume of gas and then pushes it through a fluid connection line into the interpane spaces of unsealed IGUs. In some example methods, the cylinder actuates multiple times to draw a volume or gas and push it through to the IGU interpane space, until the desired volume, pressure or both volume and pressure are achieved in the interpane space. In one embodiment, a center area of the IGU assembly is checked at a near-final-fill time to see if the two sheets are parallel, bulging or bowed. Adjustments are then made by further filling with gas or releasing gas from the interpane space to achieve the desired fill level. According to embodiments, the fluid connection line can include a filling device as described elsewhere herein.

FIG. 59 is a right perspective view of the IGU gas filling system 5900, showing the post-chamber support structure 5932, which is configured to receive filled, and optionally sealed, IGU assemblies from the interior of the enclosure 5904.

FIG. 60 is an enlarged view of the left side (from the orientation of FIG. 57) of the moveable second portion 5922 and the gas supply apparatus 5964. The gas supply apparatus 5964 is mounted on the moveable second portion 5922 as seen in FIG. 60. In other examples, the gas supply apparatus 5964 is mounted on the first portion of the vacuum enclosure instead or on other equipment.

Throughout the drawings and description, like reference numbers are used to refer to similar or identical parts.

It should be noted that, as used in this specification and the appended claims, the singular forms "a," "an," and "the" include plural referents unless the content clearly dictates otherwise. Thus, for example, reference to a composition containing "a compound" includes a mixture of two or more compounds. It should also be noted that the term "or" is generally employed in its sense including "and/or" unless the content clearly dictates otherwise.

It should also be noted that, as used in this specification and the appended claims, the phrase "configured" describes a system, apparatus, or other structure that is constructed or configured to perform a particular task or adopt a particular configuration to. The phrase "configured" can be used interchangeably with other similar phrases such as arranged and configured, constructed and arranged, constructed, manufactured and arranged, and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

The technology has been described with reference to various specific and preferred embodiments and techniques. However, it should be understood that many variations and modifications may be made while remaining within the spirit and scope of the technology.

The invention claimed is:

1. A method of filling with an interpane gas during manufacture of a sealed insulating glass unit (IGU), wherein a sealed IGU comprises first and second sheets of glass material and at least one spacer forming a spacer frame between the first and second sheets, wherein the sealed IGU defines an interpane space filled with an interpane gas, comprising:

loading a partially assembled IGU into an open vacuum chamber, wherein the partially assembled IGU defines an open passage between a portion of the spacer frame and at least one of the sheets;

positioning the partially assembled IGU to a calculated position so that the open passage mates with a position of an external filling device that is at least partially located outside of the chamber;

closing the chamber and then evacuating the chamber to substantially remove all atmosphere from the chamber and the partially assembled IGU;

positioning a filling block in the open passage between the sheets of the partially assembled IGU at a location outside of an external perimeter of the spacer frame;

closing the partially assembled IGU to close the open passage, creating a wedge-sealed IGU with the filling block wedged between the sheets, the filling block causing a wedge-passage to be defined between the spacer and one of the sheets, the filling block defining a filling block passage aligned with the wedge-passage to enable filling the wedge-sealed IGU from the external filling device;

filling the wedge-sealed IGU with a first gas through the filling block and filling the chamber with a second gas to atmospheric pressure from another source; and retracting the filling block from between the sheets.

2. The method of claim 1 further comprising:

evacuating air from the vacuum chamber and substantially simultaneously evacuating air from the partially assembled IGU while the partially assembled IGU is positioned within the vacuum chamber, wherein evacuating the air occurs before actuating the filling device to be in fluid communication with an unsealed interpane space.

3. The method of claim 1, wherein the filling device is further configured to evacuate the interpane space when it is in fluid communication with the interpane space, further comprising:

after actuating the filling block to be in fluid communication with the interpane space, evacuating air from the vacuum chamber and substantially simultaneously evacuating air from the partially assembled IGU using the filling device while the partially assembled IGU is positioned within the vacuum chamber.

4. The method of claim 1 further comprising, after introducing the first gas, automatically actuating the filling block within the vacuum chamber to move away from the IGU.

5. The method of claim 1 further comprising closing the open passage after the vacuum chamber is brought up to atmosphere.

6. The method of claim 1, where the sealed IGU further comprises an intermediate pane of transparent or translucent material located between the first and second sheets, wherein the intermediate pane defines an opening to permit fluid communication between a first portion of the interpane space adjacent to the first sheet and a second portion of the interpane space adjacent to the second sheet.

7. The method of claim 1, wherein the filling block comprises one planar side and one curved side, wherein the curved side is opposite from the planar side, wherein the planar side is adjacent to the first sheet and the curved side is adjacent to the second sheet.

8. The method of claim 7, wherein closing the partially assembled IGU to close the open passage comprises sealing the second sheet to a portion of the spacer frame and the curved side of the filling block.

9. The method of claim 1, wherein a width of the filling block is greater than a width of the spacer.

10. The method of claim 9, wherein the width of the filling block is greatest at a center of the filling block.

* * * * *